(12) United States Patent
Madhusudhan et al.

(10) Patent No.: US 12,374,325 B2
(45) Date of Patent: Jul. 29, 2025

(54) DOMAIN-AWARE VECTOR ENCODING (DAVE) SYSTEM FOR A NATURAL LANGUAGE UNDERSTANDING (NLU) FRAMEWORK

(71) Applicant: ServiceNow, Inc., Santa Clara, CA (US)

(72) Inventors: Sathwik Tejaswi Madhusudhan, Santa Clara, CA (US); Edwin Sapugay, Foster City, CA (US); Srinivas SatyaSai Sunkara, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 608 days.

(21) Appl. No.: 17/579,052

(22) Filed: Jan. 19, 2022

(65) Prior Publication Data
US 2022/0238103 A1    Jul. 28, 2022

Related U.S. Application Data

(60) Provisional application No. 63/140,098, filed on Jan. 21, 2021.

(51) Int. Cl.
*G10L 15/18*    (2013.01)
*G10L 15/06*    (2013.01)
(Continued)

(52) U.S. Cl.
CPC ........ *G10L 15/1815* (2013.01); *G10L 15/063* (2013.01); *G10L 15/16* (2013.01); *G10L 15/1822* (2013.01); *G10L 15/30* (2013.01)

(58) Field of Classification Search
CPC ... G10L 15/1815; G10L 15/063; G10L 15/16; G10L 15/1822; G10L 15/30
See application file for complete search history.

(56) References Cited

U.S. PATENT DOCUMENTS

| 6,609,122 B1 | 8/2003 | Ensor |
| 7,020,706 B2 | 3/2006 | Cates |

(Continued)

OTHER PUBLICATIONS

U.S. Appl. No. 16/682,992, filed Nov. 13, 2019, Edwin Sapugay.
U.S. Appl. No. 17/451,405, filed Oct. 19, 2021, Edwin Sapugay.
U.S. Appl. No. 17/453,446, filed Nov. 3, 2021, Edwin Sapugay.

*Primary Examiner* — Sonia L Gay
(74) *Attorney, Agent, or Firm* — FLETCHER YODER PC

(57) ABSTRACT

A natural language understanding (NLU) framework includes a domain-aware vector encoding (DAVE) framework. The DAVE framework enables a designer to create a DAVE system having a domain-agnostic semantic (DAS) model and a corresponding trained vector translator (VT) model. The DAVE system uses the DAS model to generate domain-agnostic semantic vectors for portions of a user utterance, and then uses the VT model to translate the domain-agnostic semantic vectors into a domain-aware semantic vectors to be used by a NLU system of the NLU framework during a meaning search operation. The VT model is also designed to provide predicted intent classifications for the portions the user utterance. Both the NLU system and the DAVE system of the NLU framework are highly configurable and refer to various NLU constraints during operation, including performance constraints and resource constraints provided by a designer or user of the NLU framework.

20 Claims, 38 Drawing Sheets

(51) Int. Cl.
*G10L 15/16* (2006.01)
*G10L 15/30* (2013.01)

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,683 B2 | 6/2015 | Ding |
| 9,122,552 B2 | 9/2015 | Whitney |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 10,497,366 B2 | 12/2019 | Sapugay et al. |
| 10,515,625 B1 * | 12/2019 | Metallinou .......... G10L 15/1822 |
| 10,713,441 B2 | 7/2020 | Sapugay et al. |
| 10,740,566 B2 | 8/2020 | Sapugay et al. |
| 10,956,683 B2 | 3/2021 | Sapugay et al. |
| 10,970,487 B2 | 4/2021 | Sapugay et al. |
| 11,087,090 B2 | 8/2021 | Sapugay et al. |
| 11,157,693 B2 * | 10/2021 | Srinivasan ............ G06F 40/166 |
| 11,196,687 B1 * | 12/2021 | Mall ....................... G06F 40/20 |
| 11,205,052 B2 | 12/2021 | Sapugay et al. |
| 11,935,539 B1 * | 3/2024 | Ryabov ................ G10L 15/1822 |
| 2018/0341698 A1 * | 11/2018 | Wang ....................... G06N 5/02 |
| 2019/0294676 A1 | 9/2019 | Sapugay et al. |
| 2020/0302014 A1 * | 9/2020 | Fox ........................ G06F 40/157 |
| 2020/0327284 A1 | 10/2020 | Sapugay et al. |
| 2020/0349325 A1 | 11/2020 | Sapugay et al. |
| 2021/0004442 A1 | 1/2021 | Sapugay et al. |
| 2021/0004443 A1 | 1/2021 | Sapugay et al. |
| 2021/0004537 A1 | 1/2021 | Sapugay et al. |
| 2021/0200960 A1 | 7/2021 | Sapugay et al. |
| 2021/0224485 A1 | 7/2021 | Sapugay et al. |
| 2021/0256966 A1 * | 8/2021 | Chatterjee ................ G06N 3/04 |
| 2021/0342547 A1 | 11/2021 | Sapugay et al. |

\* cited by examiner

DOMAIN-AWARE VECTOR ENCODING (DAVE) SYSTEM FOR A NATURAL LANGUAGE UNDERSTANDING (NLU) FRAMEWORK

CROSS-REFERENCE

This application claims priority from and the benefit of U.S. Provisional Patent Application No. 63/140,098, entitled "DOMAIN-AWARE VECTOR ENCODING (DAVE) SYSTEM FOR A NATURAL LANGUAGE UNDERSTANDING (NLU) FRAMEWORK," filed Jan. 21, 2021, which is herein incorporated by reference in its entirety for all purposes.

BACKGROUND

The present disclosure relates generally to the fields of natural language understanding (NLU) and artificial intelligence (AI), and more specifically, to a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

As such, it is presently recognized that there is a need to improve the ability of virtual agents to apply NLU techniques to properly derive meaning from complex natural language utterances. For example, it may be advantageous to create a virtual agent capable of comprehending complex language and executing contextually relevant requests, which could afford substantial advantages in terms of reduced operational cost and increased responsiveness to client issues. Additionally, it is recognized that it is advantageous for virtual agents to be customizable and adaptable to various communication channels and styles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

NLU systems are used by a wide variety of clients for various domains, such as Information Technology Management (ITSM), Customer Service Management (CSM), Human Resource Management (HRM), Finance, and so forth. However, in certain embodiments, a NLU system may utilize one or more machine learning (ML)-based word vector distribution models (also referred to herein as semantic models or neural language models) that are trained based on a domain-agnostic corpus, such as an encyclopedia, a dictionary, a newspaper, to generate semantic vectors (also referred to as encodings or embeddings) for portions of utterances, including tokens of utterances, phrases of utterances, and/or entire utterances. It is presently recognized that, while this enables large, existing vector spaces to be leveraged that capture important relationships between many words and phrases (e.g., frequently used terms) within a given language, these domain-agnostic semantic models can fail to provide suitable semantic vectors for domain-specific terminology. For example, a term that is rarely or never used outside of a particular domain (e.g., a domain-specific term) may not be sufficiently represented within the domain-agnostic corpus to enable the domain-agnostic semantic model to learn a high-quality semantic vector that suitably represents the meaning of the term relative to other terms of the generic corpus represented within the vector space. Additionally, it may be desirable to leverage an existing semantic model that generates semantic vectors in a vector space having a different number of dimensions than the vector space(s) utilized by the NLU system.

With this in mind, the disclosed NLU framework includes a domain-aware vector encoding (DAVE) framework. The DAVE framework enables a designer to create a DAVE system having a domain-agnostic semantic (DAS) model and a corresponding trained vector translator (VT) model. The DAVE system uses the DAS model to generate a domain-agnostic semantic vector for a user utterance or a portion of a NLU-processed user utterance, and then uses the VT model to translate the domain-agnostic semantic vector into a domain-aware semantic vector to be used by a NLU system of the NLU framework during a meaning search operation. The VT model is also designed to provide one or more predicted intent classifications for the user utterance or the portion of a NLU-processed user utterance. Both the NLU system and the DAVE system of the NLU framework are highly configurable and refer to various NLU constraints during operation, including performance constraints and resource constraints provided by a designer or user of the NLU framework. As such, the disclosed designs ensure the NLU framework provides the desired level of performance (e.g., desired prediction latency, desired precision, desired recall, desired operational explainability) without exceeding a desired level of computational resource usage (e.g., processing time, memory usage, storage usage). The disclosed DAVE system enhances the performance (e.g., precision and/or recall) of the NLU system within the specific domain of the client, improves the quality of predictions of the NLU system for various tasks, such as intent recognition, entity recognition, and so forth. Additionally, since the DAVE system enables the use of existing DAS models in the NLU framework regardless of dimensionality, the disclosed DAVE system gives the designer freedom in selecting and immediately leveraging best-of-breed DAS models as they become available.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
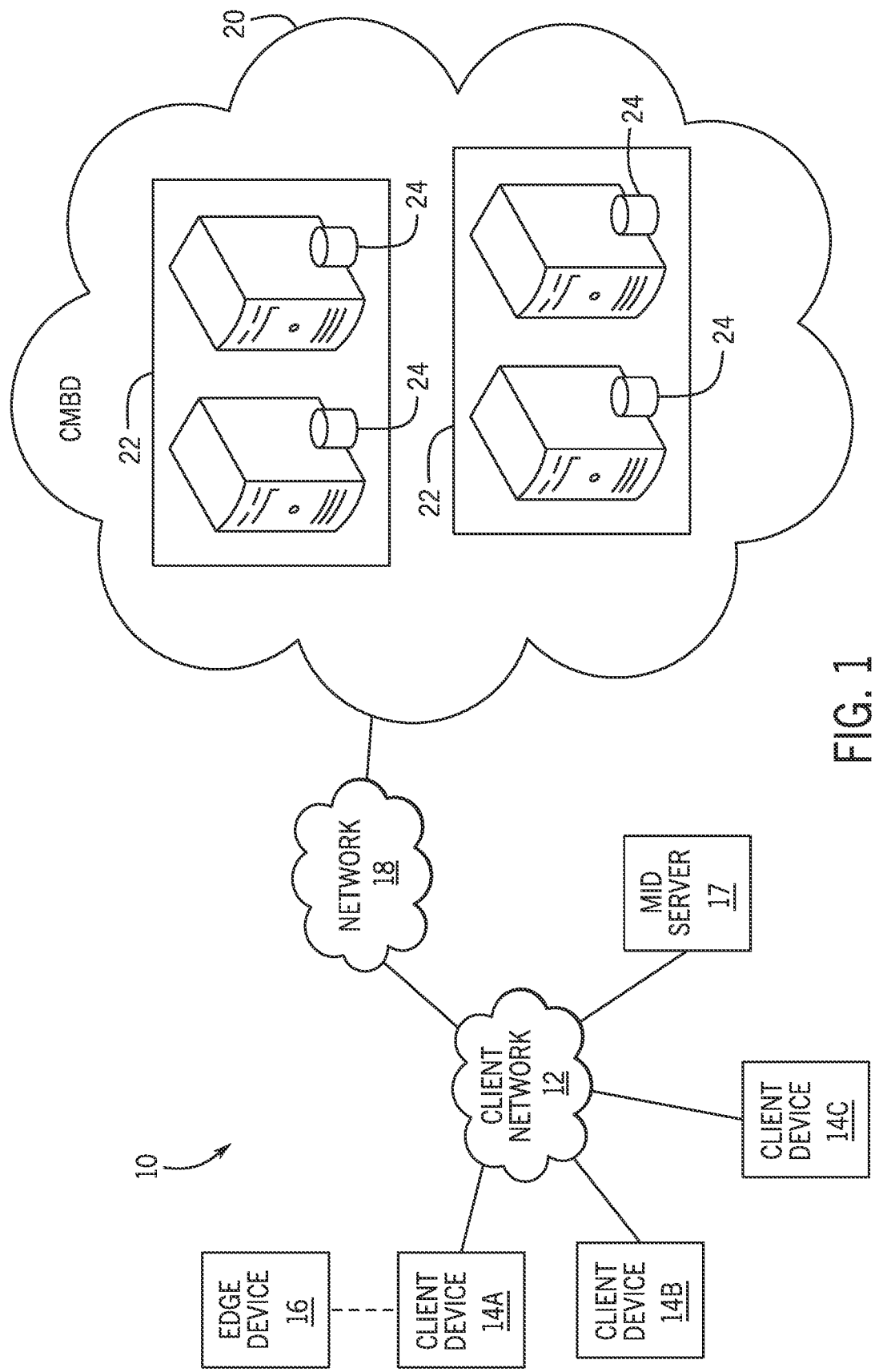
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the terms "application", "engine", "program", or "plugin" refers to one or more sets of computer software instructions (e.g., computer programs and/or scripts) executable by one or more processors of a computing system to provide particular functionality. Computer software instructions can be written in any suitable programming languages, such as C, C++, C #, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities, artifacts) from natural language utterances using one or more machine-learning (ML) components and one or more rule-based components. As used herein, a "behavior engine" or "BE," also known as a reasoning agent or RA/BE, refers to a rule-based agent, such as a virtual agent, designed to interact with users based on a conversation model. For example, a "virtual agent" may refer to a particular example of a BE that is designed to interact with users via natural language requests in a particular conversational or communication channel. With this in mind, the terms "virtual agent" and "BE" are used interchangeably herein. By way of specific examples, a virtual agent may be or include a chat agent that interacts with users via natural language requests and responses in a chat room environment, or that provides recommended answers to requests or queries made in a search text box. Other examples of virtual agents may include an email agent, a forum agent, a ticketing agent, a telephone call agent, a search agent, a genius search result agent, and so forth, which interact with users in the context of email, forum posts, search queries, autoreplies to service tickets, phone calls, and so forth.

As used herein, an "intent" refers to a desire or goal of a user which may relate to an underlying purpose of a communication, such as an utterance. As used herein, an "entity" refers to an object, subject, or some other parameterization of an intent. It is noted that, for present embodiments, certain entities are treated as parameters of a corresponding intent within an intent-entity model. More specifically, certain entities (e.g., time and location) may be globally recognized and extracted for all intents, while other entities are intent-specific (e.g., merchandise entities associated with purchase intents) and are generally extracted only when found within the intents that define them. As used herein, "artifact" collectively refers to both intents and entities of an utterance. As used herein, an "understanding model" is a collection of models used by the NLU framework to infer meaning of natural language utterances. An understanding model may include a vocabulary model that associates certain tokens (e.g., words or phrases) with particular word vectors, an intent-entity model, an intent model, an entity model, a taxonomy model, other models, or a combination thereof. As used herein an "intent-entity model" refers to a model that associates particular intents with particular entities and particular sample utterances, wherein entities associated with the intent may be encoded as a parameter of the intent within the sample utterances of the model. As used herein, the term "agents" may refer to computer-generated personas (e.g. chat agents or other virtual agents) that interact with human users within a conversational channel. As used herein, a "corpus" may refer to a captured body of source data that can include interactions between various users and virtual agents, wherein the interactions include communications or conversations within one or more suitable types of media (e.g., a help line, a chat room or message string, an email string). As used herein, an "utterance tree" refers to a data structure that stores a representation of the meaning of an utterance. As discussed, an utterance tree has a tree structure (e.g., a dependency parse tree structure) that represents the syntactic structure of the utterance, wherein nodes of the tree structure store vectors (e.g., word vectors, subtree vectors) that encode the semantic meaning of the utterance.

As used herein, an "utterance" refers to a single natural language statement made by a user that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML-based techniques may be implemented using an artificial neural network (ANN) (e.g., a deep neural network (DNN), a recurrent neural network (RNN), a recursive neural network, a feedforward neural network). In contrast, "rules-based" methods and techniques refer to the use of rule-sets and ontologies (e.g., manually-crafted ontologies, statistically-derived ontologies) that enable precise adjudication of linguistic structure and semantic understanding to derive meaning representations from utterances. As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity, a token) of an utterance. As used herein, "domain specificity" refers to how attuned a system is to correctly extracting intents and entities expressed in actual conversations in a given domain and/or conversational channel (e.g., a human resources domain, an information technology domain). As used herein, an "understanding" of an utterance refers to an interpretation or a construction of the utterance by the NLU framework. As such, it may be appreciated that different understandings of an utterance may be associated with different meaning representations having different parse structures (e.g., different nodes, different relationships between nodes), different part-of-speech taggings, and so forth.

Agent Automation Framework

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

The disclosed NLU framework is also capable of detecting and addressing errors in an annotated utterance tree before the meaning representation is generated. For example, the meaning extraction subsystem can include a rule-based augmentation error detection subsystem that can cooperate with the vocabulary, structure subsystem, and prosody subsystems to iteratively parse and correct an utterance before meaning representations are generated for improved domain specificity. Additionally, present embodiments support entrenchment, whereby the NLU framework can continue to learn or infer meaning of new syntactic structures in new natural language utterance based on previous examples of similar syntactic structures. For example, components of the NLU framework (e.g., the structure subsystem or the vocabulary subsystem of the meaning extraction subsystem) may be continuously updated based on new utterances, such as exchanges between users and a virtual agent, to enhance the adaptability of the NLU framework to changes in the use of certain terms and phrases over time.

The meaning search subsystem of the disclosed NLU framework is designed to compare a meaning representation generated for a received user utterance to the set of meaning representations generated for the sample utterances of the intent/entity model based on the compilation model template. For example, the compilation model template defines one or more tree model comparison algorithms designed to determine a similarity score for two subtree vectors based on class compatibility rules and class-level scoring coefficients stored in the compilation model template. The class compatibility rules define which classes of subtree vectors can be compared to one another (e.g., verb subtree vectors are compared to one another, subject subtree vectors are compared to one another) to determine vector distances between the subtrees of the meaning representations. The class-level scoring coefficients define different relative weights that determine how much the different classes of subtree vectors contribute to an overall vector generated by the substructure vectorization algorithm for a given subtree (e.g., verb subtree vectors and/or direct object subtree vectors may be weighted higher and contribute more than subject subtree vectors or modifier subtree vectors). Using these algorithms, rules, and coefficients of the compilation model template, the meaning search subsystem determines similarity scores between portions of the meaning representation of the user utterance and portions of the meaning representations of the sample utterances of the intent/entity model. Based on these similarity scores, intents/entities defined within the intent/entity model are extracted from the user utterance and passed to a reasoning agent/behavior engine (RA/BE), such as a virtual agent, to take appropriate action based on the extracted intents/entities of the user utterance.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. In this manner, present embodiments extract intents/entities from the user utterance, such that a virtual agent can suitably respond to these intent/entities. As such, present embodiments generally address the hard NLU problem by transforming it into a more manageable search problem.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as a local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
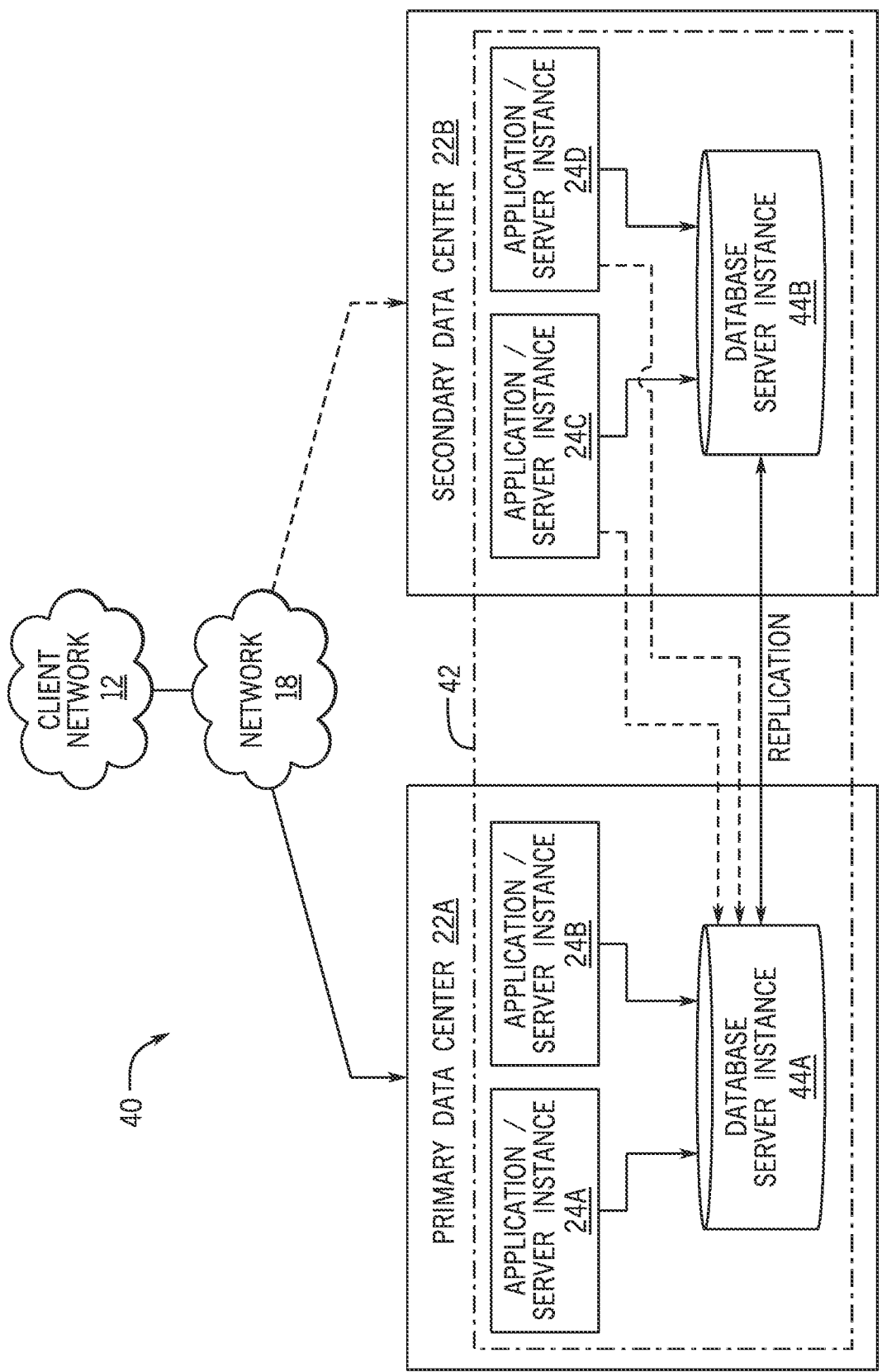
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data centers could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the secondary data center 22B during a failure and/or maintenance scenario. Using FIG. 2 as an example, if the virtual servers 24A and 24B and/or primary virtual database server instance 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
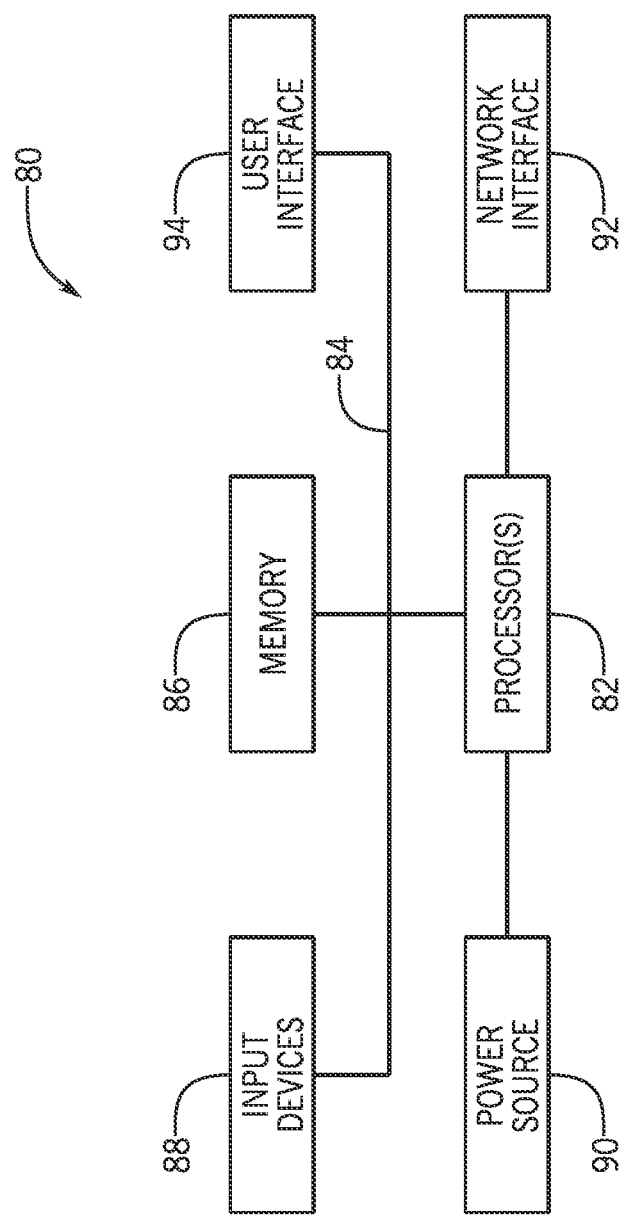
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 3, the memory 86 can be implemented using multiple physical units of the same or different types in one or more physical locations. The input devices 88 correspond to structures to input data and/or commands to the one or more processors 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
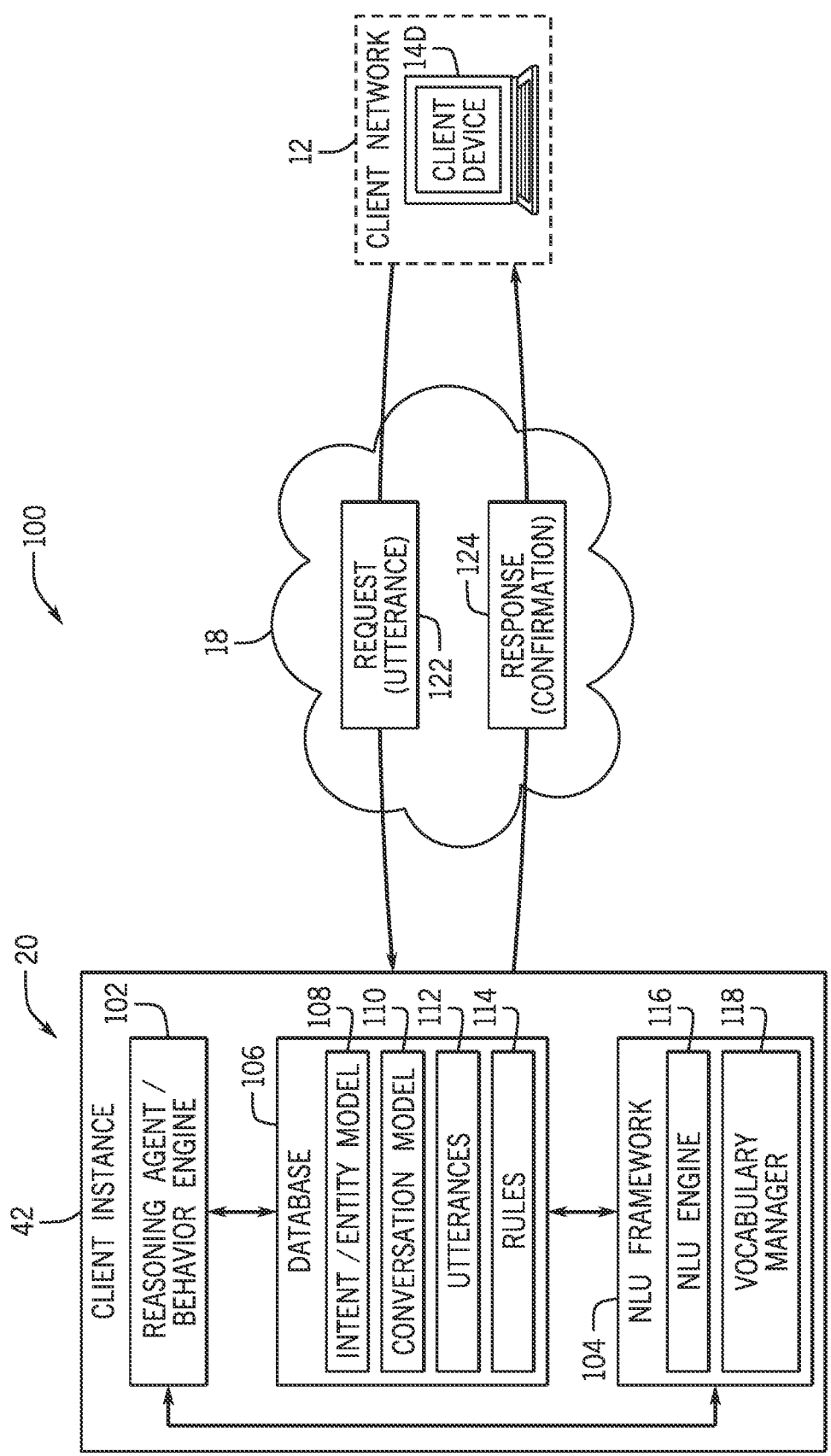
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124 or agent confirmations 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address the request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework 104 discussed below, processes the utterance 122 based on the intent/entity model 108 to derive intents/entities within the utterance 122. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework discussed below may be hosted by a separate instance (e.g., an enterprise instance) that is communicatively coupled to the client instance 42, as well as other client instances, to enable semantic intent mining and generation of the intent/entity model 108.

Figure 4B:
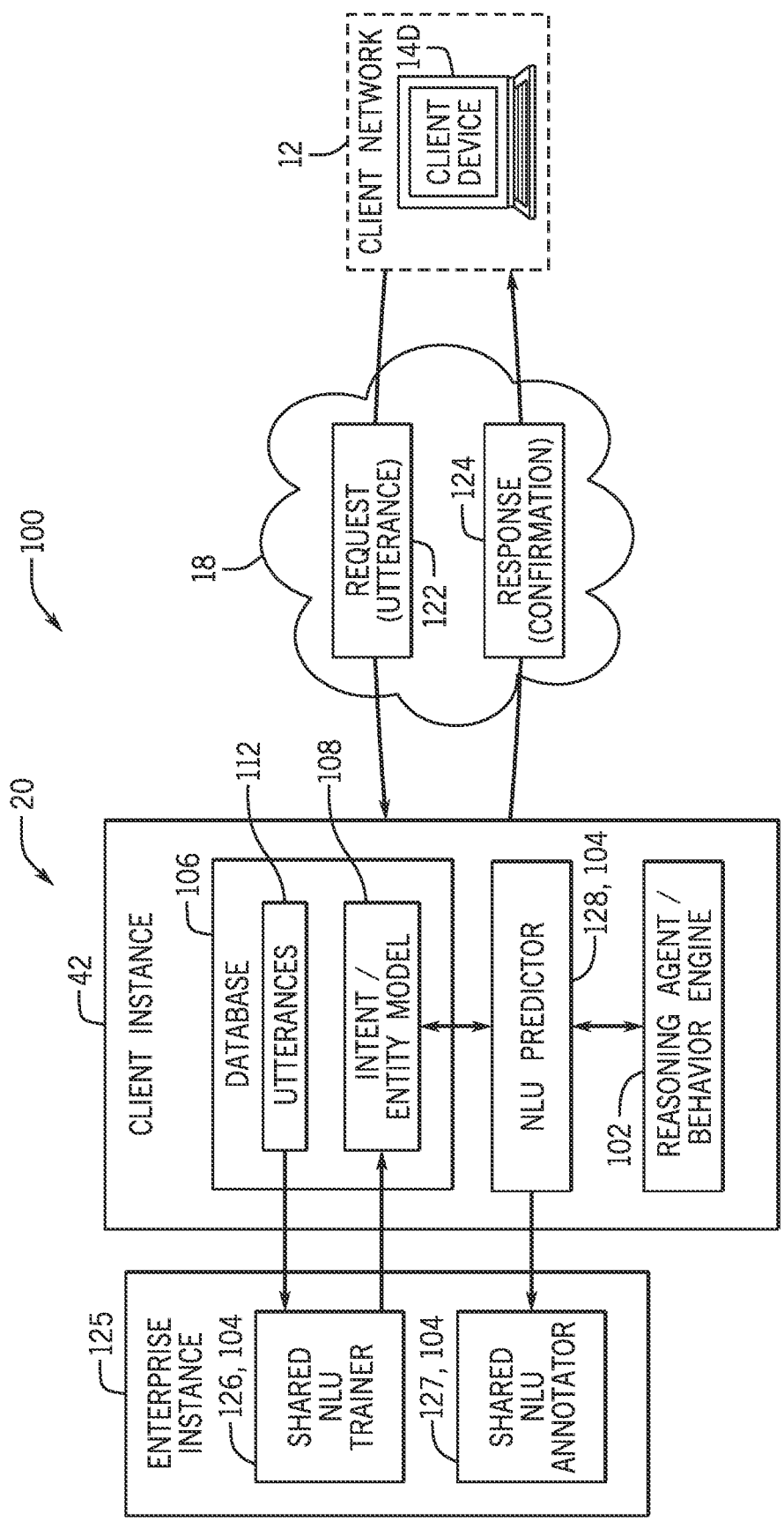
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud-based platform system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework 104 as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem, and the NLU predictor may correspond to the meaning search subsystem, of the NLU framework 104, as discussed below.

Figure 5:
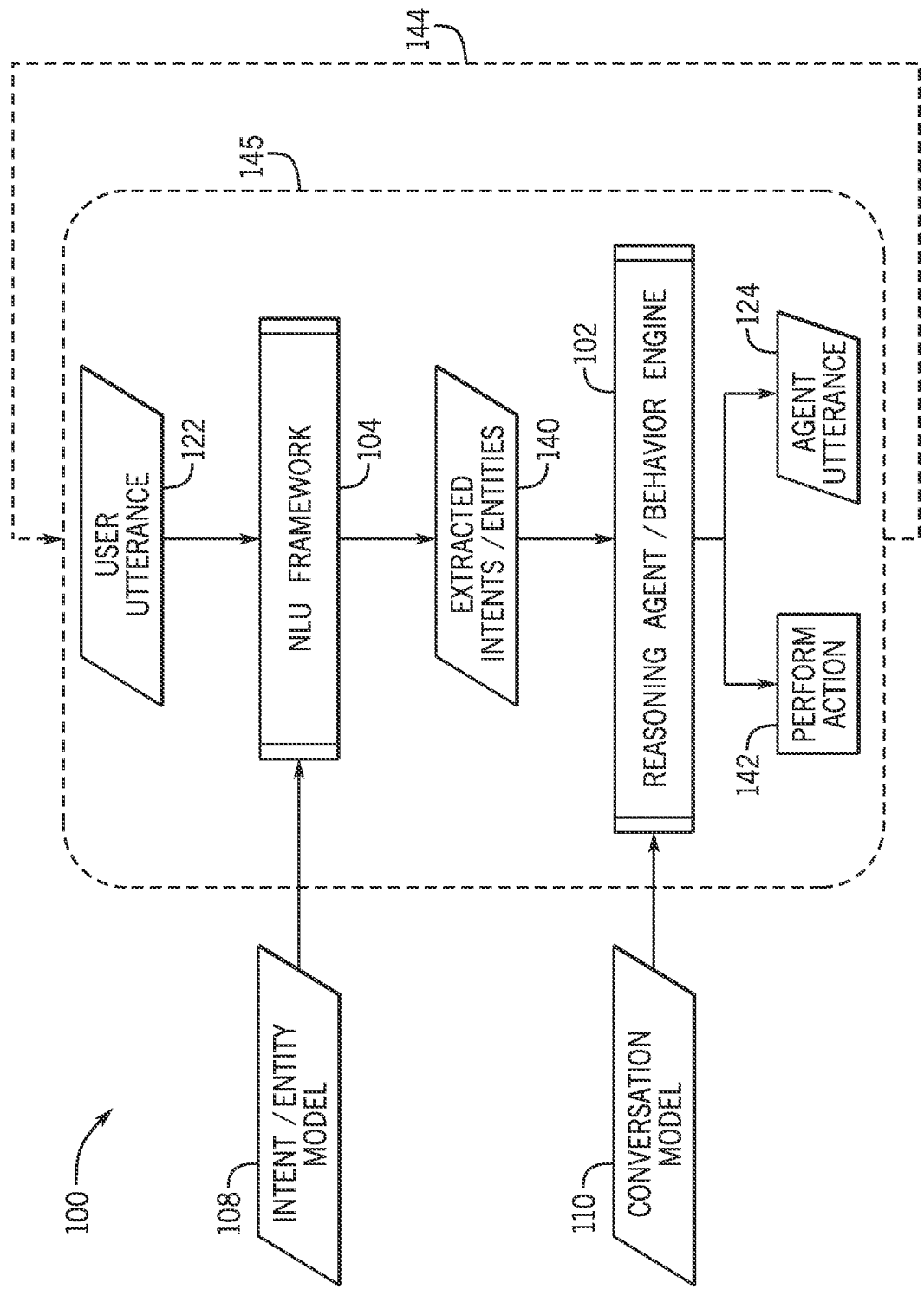
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
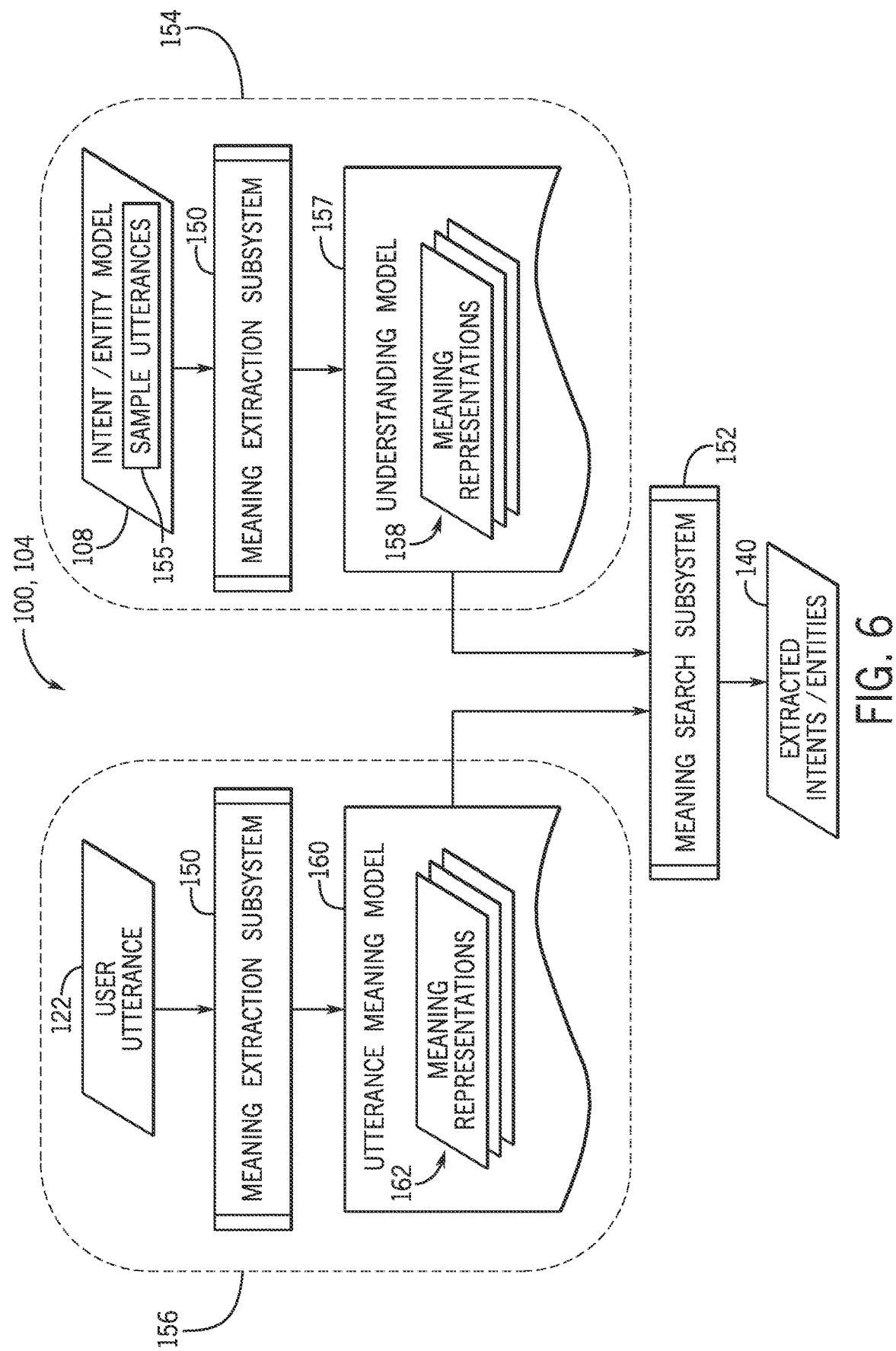
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present technique.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations 158 of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160 as discussed below, thereby generating the extracted intents/entities 140.

Figure 7:
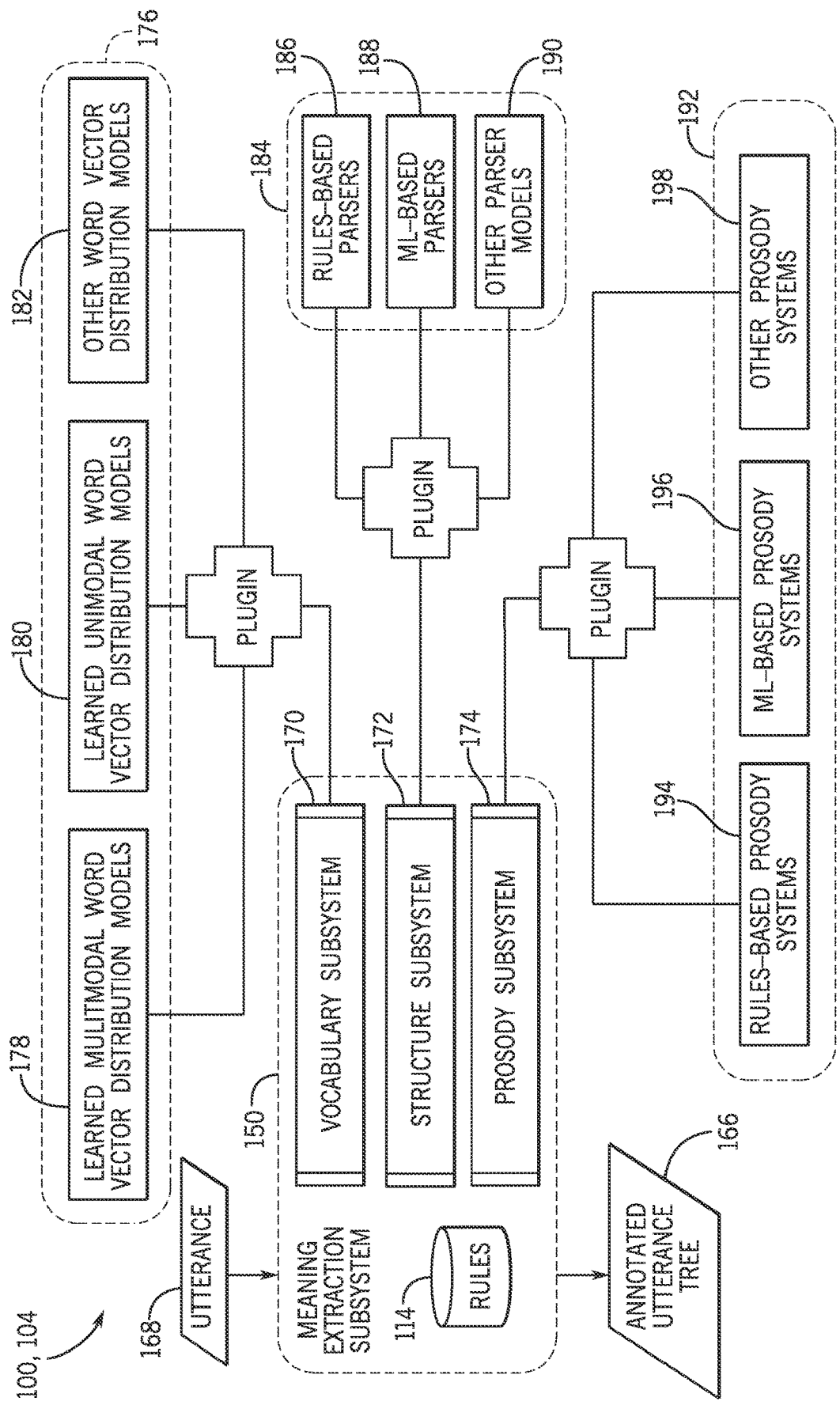
FIG. 7 is a block diagram illustrating an embodiment of the meaning extraction subsystem using a combination of rules-based methods and machine-learning (ML)-based methods within a vocabulary subsystem, a structure subsystem, and a prosody subsystem, to generate an annotated utterance tree for an utterance, in accordance with aspects of the present technique.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 15. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based on the stored rules 114 to generate word vectors for nodes of the annotated utterance tree 166, as discussed below. Moreover, the word vector distribution models 178, 180, and/or 182 can be continually updated based on unsupervised learning performed on received user utterances 122, as discussed below with respect to FIG. 15.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 16:
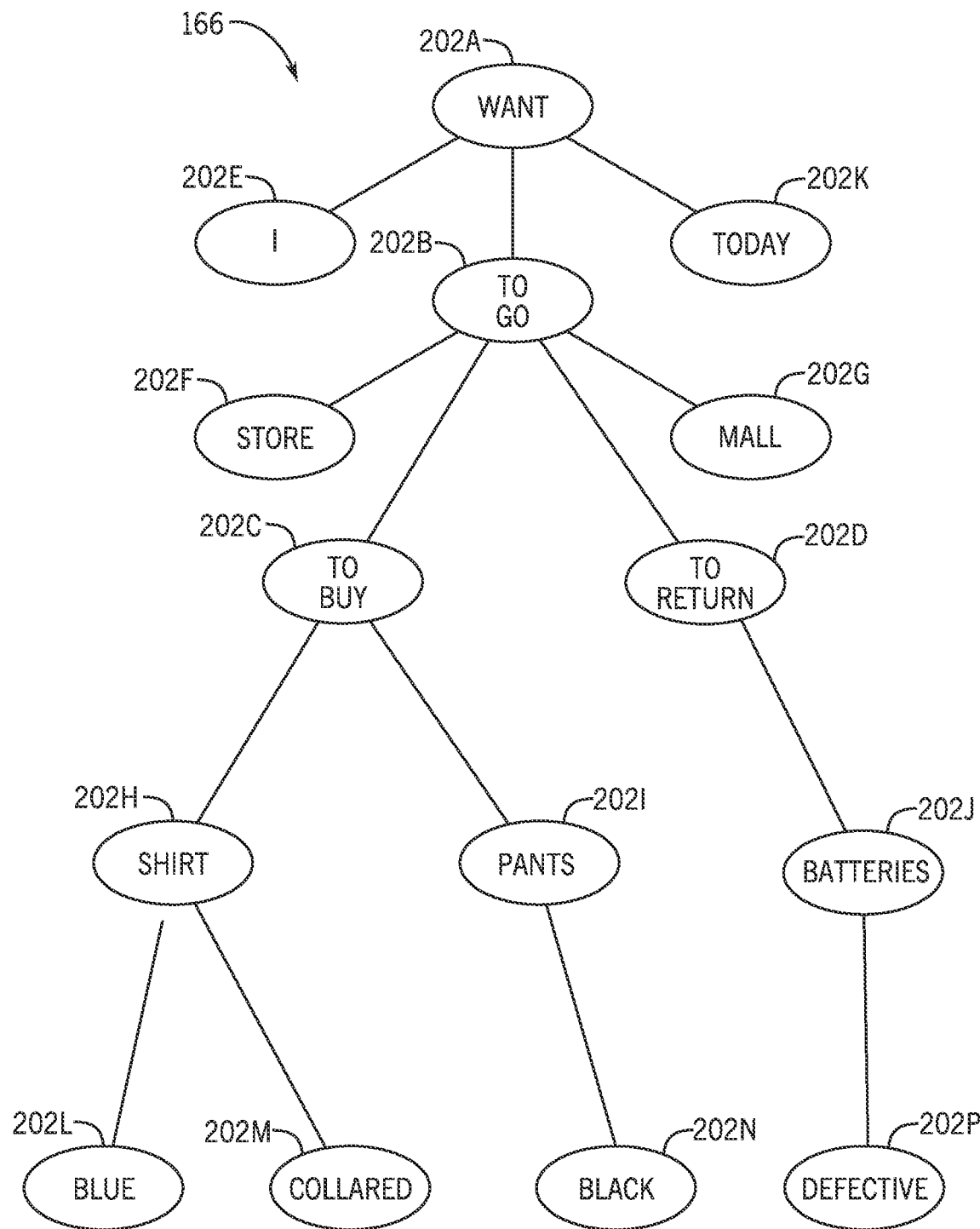
FIG. 16 is a diagram illustrating an embodiment of an annotated utterance tree, in accordance with aspects of the present technique.

For example, FIG. 16 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 16, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 16 is determined by the prosody subsystem 174 and the structure subsystem 172 and represents the syntactic, grammatical meaning of the example utterance. More specifically, the prosody subsystem 174 segments the utterance, while the structure subsystem 172 constructs the annotated utterance tree 166 from these segments. Each of the nodes 202 store or reference a respective word vector that is determined by the vocabulary subsystem 170 to indicate the semantic meaning of the particular word or phrase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 16, each of the nodes 202 has a respective class annotation. In particular, for the example annotated utterance tree illustrated in FIG. 16, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. As discussed below, these class annotations are used by the meaning search subsystem 152 when comparing meaning representations that are generated from annotated utterance trees, like the example annotated utterance tree 166 illustrated in FIG. 16. As such, it may be appreciated that the annotated utterance tree 166, from which the meaning representations are generated, serves as a basis (e.g., an initial basis) for intent/entity extraction.

Figure 8:
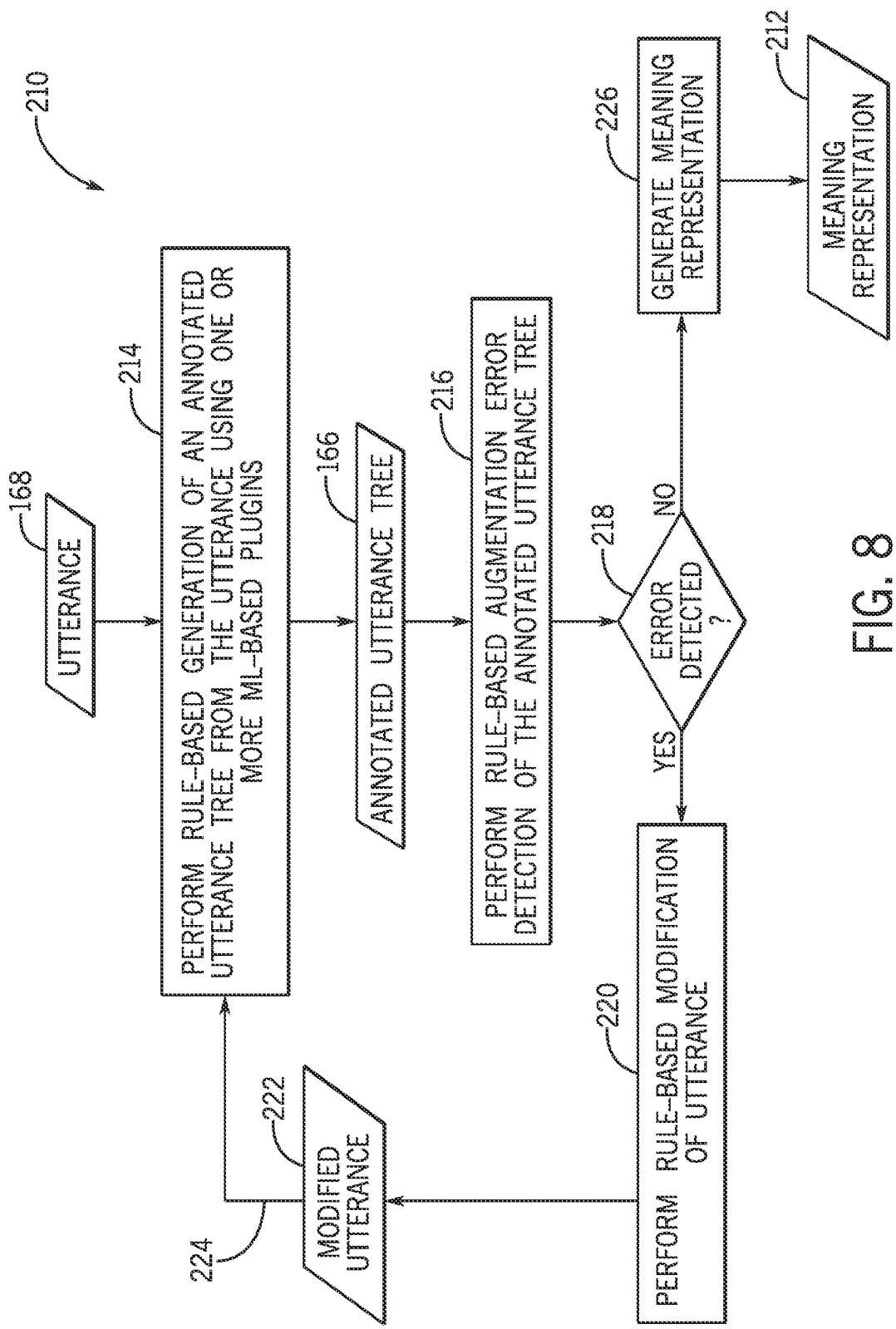
FIG. 8 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 8 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterances 155 of the intent/entity model 108, the corresponding meaning representation 212 becomes part of the meaning representations 158 of the understanding model 157, as discussed above with respect to FIG. 6.

For the embodiment illustrated in FIG. 8, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114. Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 8, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152, as discussed below. In certain embodiments, information regarding the corrections performed in block 220 and the resulting annotated utterance tree 166 that is converted to the meaning representation 212 may be provided as input to train one or more ML-based plugins of the meaning extraction subsystem 150 (e.g., ML-based parsers 188 or ML-based prosody systems 196), such that the erroneous annotated utterance trees can be avoided when processing future utterances.

Figure 9:
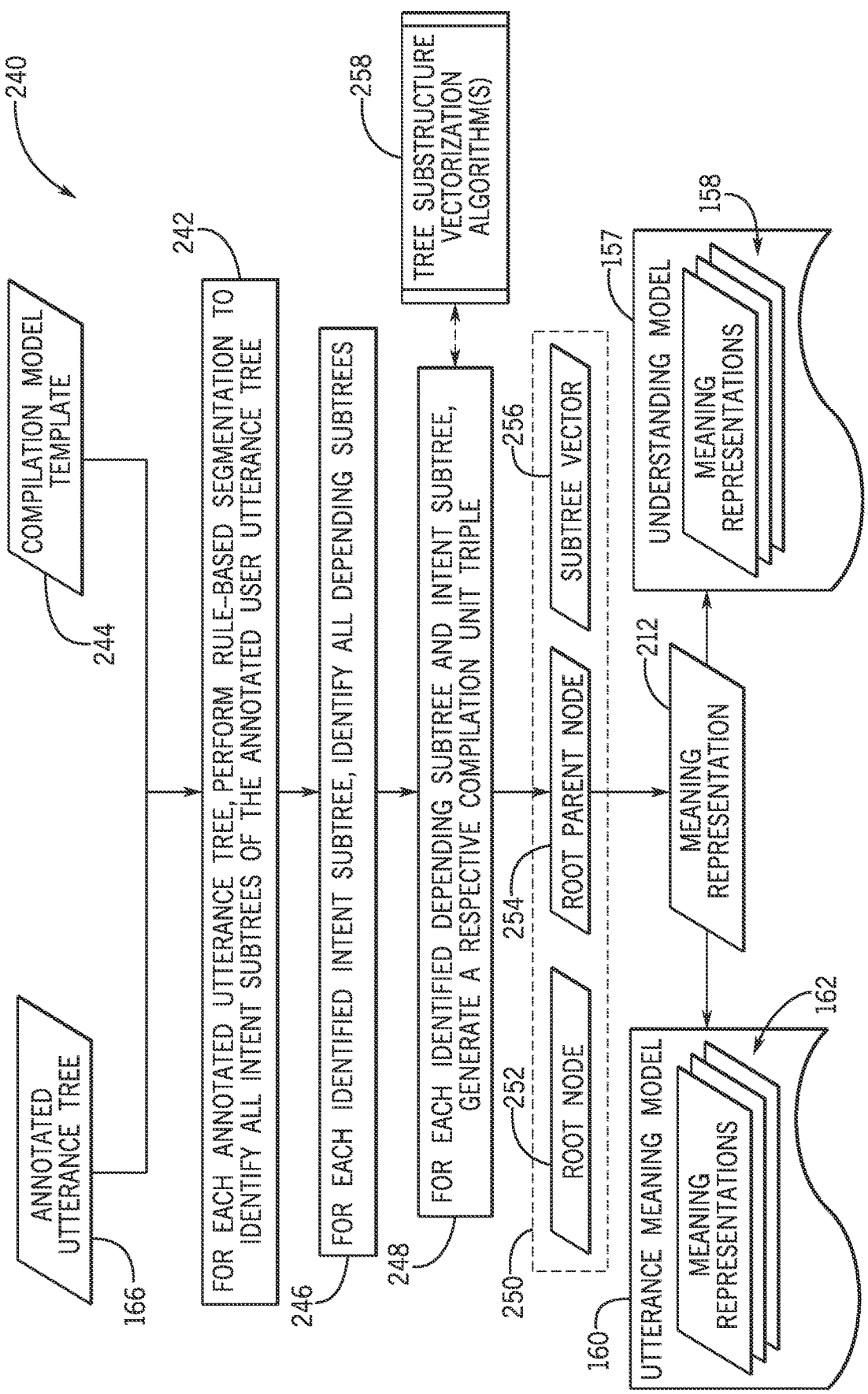
FIG. 9 is a flow diagram illustrating an example process by which the meaning extraction subsystem generates a meaning representations of the understanding model or the utterance meaning model based on the annotated utterance trees and a compilation model template, in accordance with aspects of the present technique.

In certain embodiments, generating the corresponding meaning representation 212 for the annotated utterance tree 166 (block 226) may include determining compilation unit information (e.g., root nodes, parent root nodes, and subtree vectors) and optimizing the meaning representations for search. For example, FIG. 9 is a flow diagram illustrating an embodiment of a process 240 whereby the meaning extraction subsystem 150 generates the corresponding meaning representation 212 from the annotated utterance tree 166. To do this, the prosody subsystem 174 of the meaning extraction subsystem 150 takes the annotated utterance tree 166 and performs a segmentation step (block 242) based on one or more stored rules 114 (e.g., intent segmentation rules). During this segmentation step, the annotated utterance tree 166 is segmented or divided into individual intent subtrees, each representing an atomic intent of the annotated utterance tree 166. This intent segmentation step may also involve information from a compilation model template 244, which may be part of a compilation model template table or database (e.g., associated with the database 106 of FIGS. 4A and 4B). The compilation model template 244 stores data indicating how meaning representations 162 and 158 are to be generated by the meaning extraction subsystem 150 and compared to one another by the meaning search subsystem 152, as is discussed below in greater detail.

For the embodiment illustrated in FIG. 9, for each intent subtree identified in block 242, the meaning extraction subsystem 150 identifies (block 246) all corresponding subtrees that depend from each particular intent subtree. Then, for each of these intent trees and corresponding subtrees, the meaning extraction subsystem 150 generates (block 248) a respective compilation unit triple 250. In particular, the illustrated compilation unit triple 250 includes: a reference 252 to a root node of a subtree, a reference 254 to a parent of the root node of the subtree, and a subtree vector 256 that is representative of the semantic meaning of the subtree. The aforementioned compilation model template 244 defines one or more tree substructure vectorization algorithms 258 that produce vectors for each of the corresponding subtrees, as discussed in greater detail below.

Once the compilation unit triples 250 have been generated for the annotated utterance tree 166, the annotated utterance tree 166 is converted into the meaning representation 212. In certain embodiments, certain information that is not relevant to the meaning search subsystem 152 (e.g., certain classes of nodes, certain annotation data) may be removed during this step to minimize the size of the meaning representation 212 for enhanced efficiency when searching. The generated meaning representation 212 subsequently becomes one of the meaning representations 162 of the utterance meaning model 160 or one of the meaning representations 158 of the understanding model 157, depending on the origin of the utterance 168 represented by the annotated utterance tree 166, as discussed above.

Figure 17:
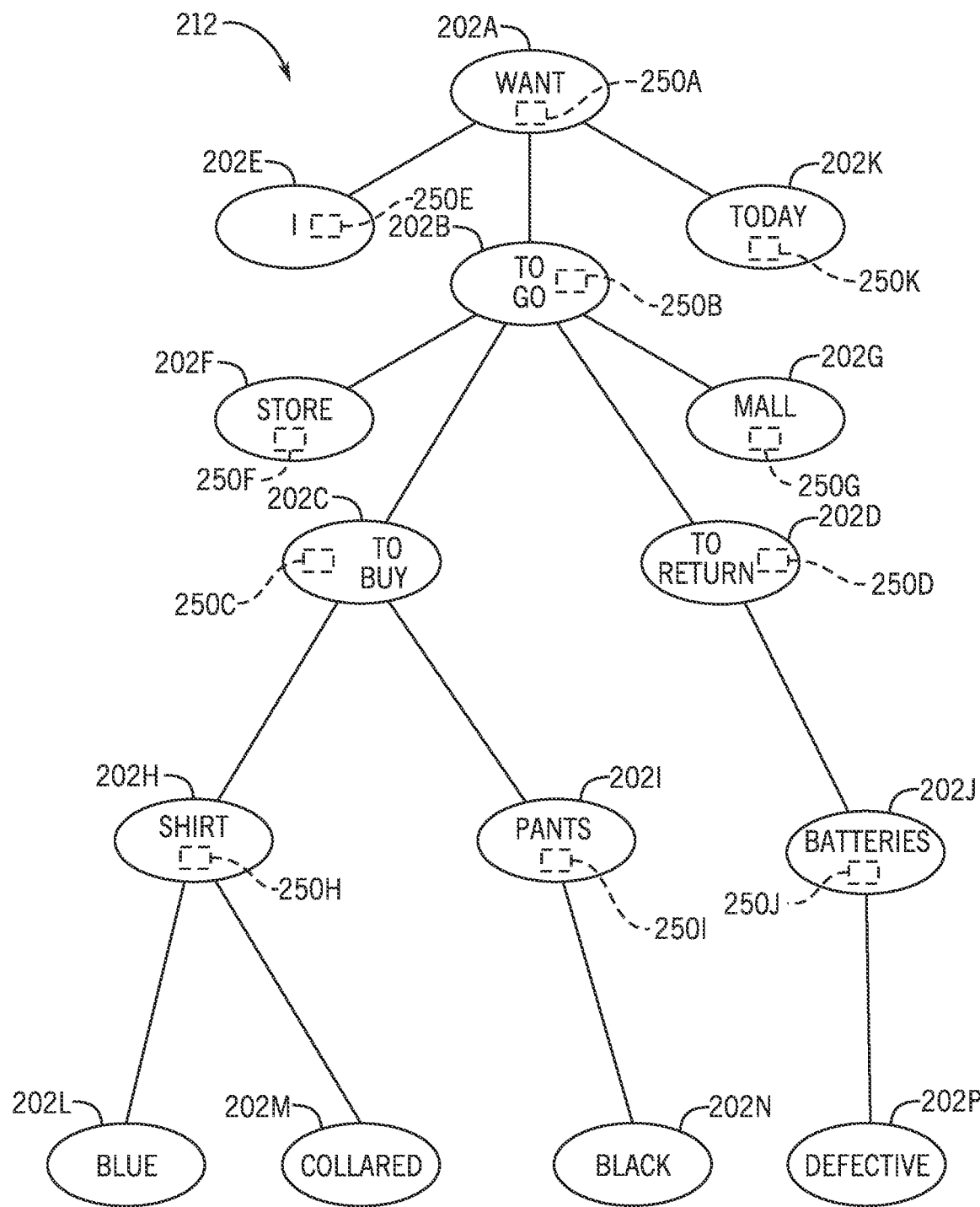
FIG. 17 is a diagram illustrating an embodiment of a meaning representation, in accordance with aspects of the present technique.

To more clearly illustrate, FIG. 17 is a diagram presenting an example of a meaning representation 212 generated for the example annotated utterance tree 166 of FIG. 16, in accordance with an embodiment of the present approach. As mentioned, the meaning representation 212 is a data structure generated from the annotated utterance tree 166 by the meaning extraction subsystem 150. As such, certain nodes of the meaning representation 212 include compilation unit triples 250 that were generated using the process 240 of FIG. 9. In particular, all of the intent subtrees (e.g., subtrees from nodes 202A, 202B, 202C, and 202D), and all of the subtrees that depend from these intent subtrees (e.g., subtrees 202E, 202F, 202G, 202H, 202I, 202J), include a respective compilation unit triple 250 (e.g., compilation unit triples 250A, 250B, 250C, 250D, 250E, 250F, 250G, 250H, 250I, and 250J). Further, as discussed above, each of these compilation unit triples 250 includes a respective subtree vector that is generated based the vectors (e.g., word vectors and/or subtree vectors) of depending nodes and/or subtrees.

Figure 10:
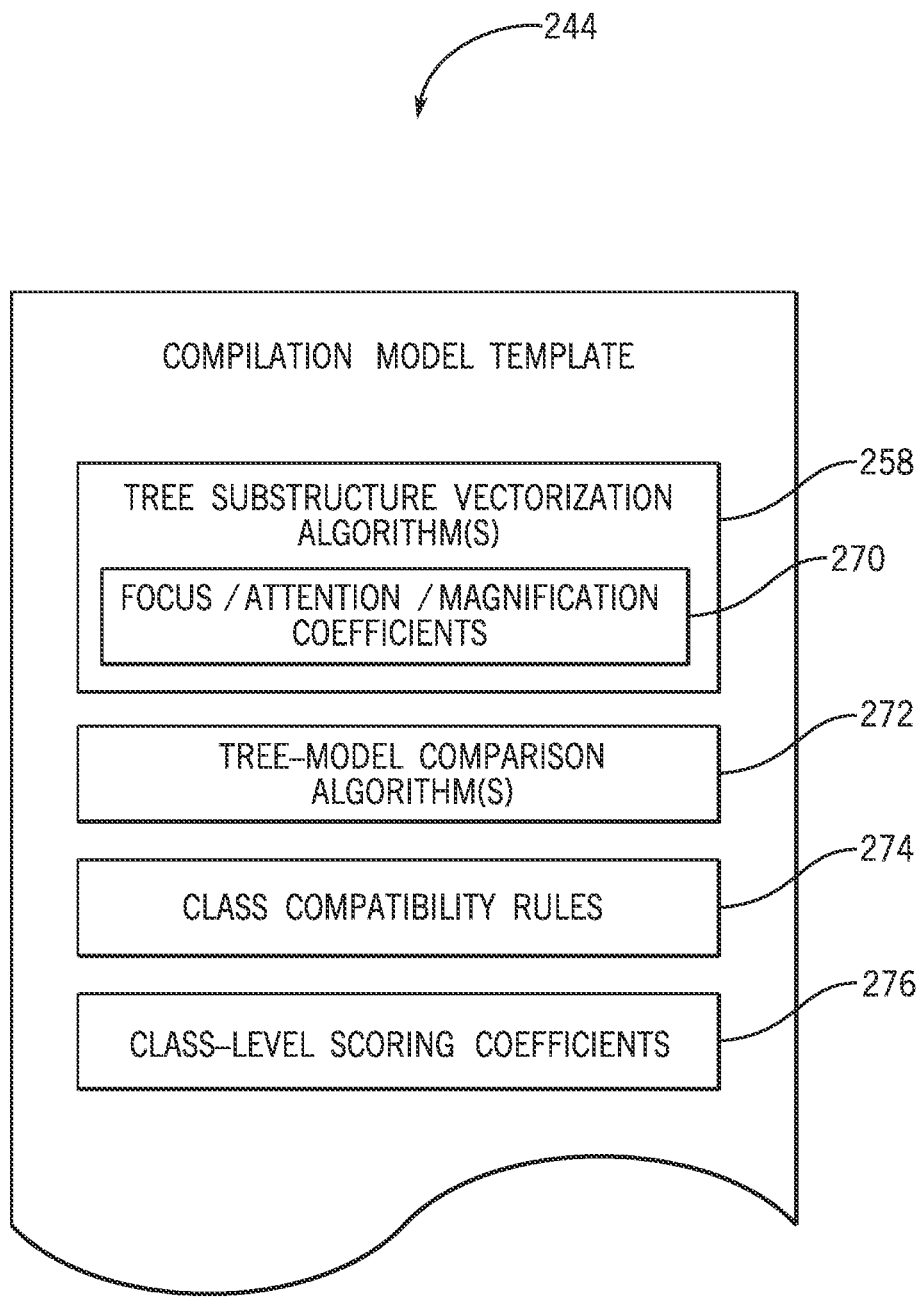
FIG. 10 is a block diagram illustrating an embodiment of the compilation model template, in accordance with aspects of the present technique.

FIG. 10 is a diagram that illustrates an example embodiment of the compilation model template 244 mentioned above. Data stored within the compilation model template 244 generally defines how the meaning extraction subsystem 150 generates subtree vectors for the annotated utterance trees 166 as part of the compilation unit triple 250 determined in block 248 of FIG. 9. Further, data stored within the compilation model template 244 generally defines how the meaning search subsystem 152 compares and scores similarity between the meaning representations 162 of the utterance meaning model 160 and the meaning representations 158 of the understanding model 157, as illustrated in FIG. 6. In certain embodiments, the compilation model template 244 may be stored as one or more tables of the database 106 illustrated in FIGS. 4A and 4B, or within another suitable data structure, in accordance with the present disclosure.

As mentioned with respect to FIG. 9, the compilation model template 244 illustrated in FIG. 10 includes one or more tables identifying or storing one or more pluggable tree substructure vectorization algorithms 258 that generate the subtree vectors 256 of the compilation unit triples 250. As illustrated, the tree substructure vectorization algorithms 258 may be associated with focus/attention/magnification (FAM) coefficients 270. For such embodiments, these FAM coefficients 270 are used to tune how much relative focus or attention (e.g., signal magnification) should be granted to each portion of a subtree when generating a subtree vector. The tree-model comparison algorithms 272, the class compatibility rules 274, and the class-level scoring coefficients 276 of the compilation model template 244 illustrated in the compilation model template 244 of FIG. 10 are discussed below.

Figure 11:
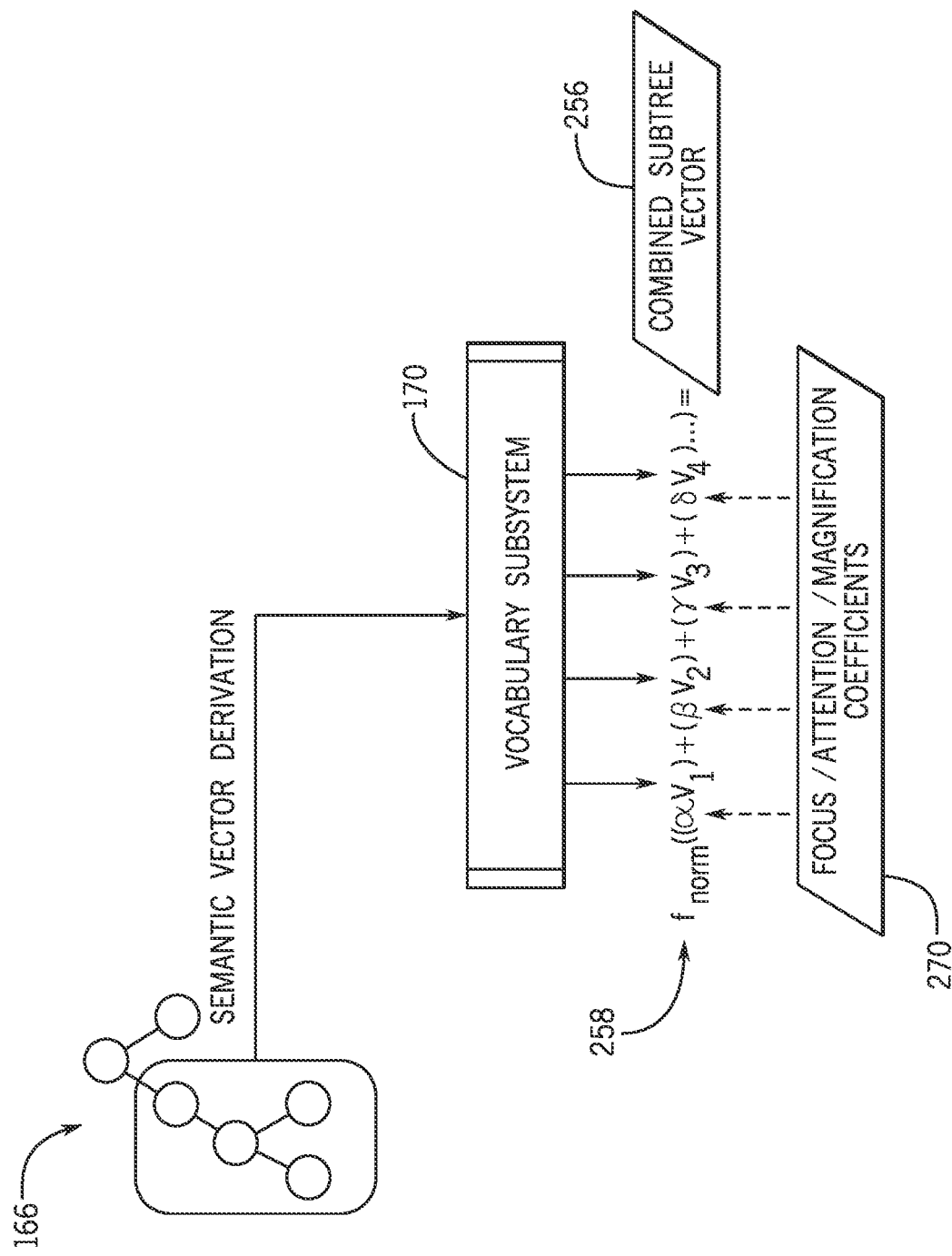
FIG. 11 is a block diagram illustrating example operation of an embodiment of a tree substructure vectorization algorithm to generate a combined subtree vector for a subtree of an annotated utterance tree, in accordance with aspects of the present technique.

FIG. 11 is a block diagram illustrating example operation of an embodiment of a tree substructure vectorization algorithm 258 to generate a subtree vector 256, which is part of the compilation unit triple 250 determined for subtrees of the annotated utterance tree 166, as discussed with respect to FIG. 9. As mentioned above, the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace individual words with phrasal equivalents, the structure subsystem 172 may expand contractions, and so forth), as discussed with respect to FIG. 8. As such, it is appreciated that, at one or more stages of intent/entity extraction, the number of nodes/subtrees of the annotated utterance tree 166 may be increased or decreased, along with the number of word vectors combined to calculate the subtree vector 256, relative to an original utterance or an initially generated annotated utterance tree 166.

As such, for the example illustrated in FIG. 11, the tree substructure vectorization algorithm 258 generates the subtree vector 256, by first multiplying each of the word vectors by a respective one (e.g., $\alpha$, $\beta$, $\gamma$, $\delta$) of the FAM coefficients 270, which increases or decreases the contribution of each word vector to the combined subtree vector 256. After applying the FAM coefficients 270 to the word vectors $V_{1-4}$, the results are combined using vector addition, as indicated by the "+" notation in FIG. 11. Additionally, for the illustrated embodiment, the resulting subtree vector 256 is subsequently normalized to ensure that the dimensions of the combined subtree vector are each within a suitable range after the multiplication and addition operations. It may be noted that the tree substructure vectorization algorithm 258 illustrated in FIG. 11 is merely provided as an example, and in other embodiments, other suitable tree substructure vectorization algorithms may be used, in accordance with the present disclosure.

By way of example, in certain embodiments, verb words or subtrees may be associated with one of the FAM coefficients 270 (e.g., α) that is greater in value than another FAM coefficient (e.g., β) associated with a subject or direct object word or subtree vector. In certain embodiments, root node word vectors may be associated with a relatively higher FAM coefficient 270 than word vectors associated with other nodes. In certain embodiments, the combined subtree vector 256 is a centroid that is calculated as the weighted average of the word vectors associated with all nodes of the subtree. In other embodiments, the meaning extraction subsystem 150 may recursively perform subtree vectorization to a predefined depth or until a particular node class is identified (e.g., a subject node, a modifier node). In certain embodiments, one or more of the vectors (e.g., $V_1$, $V_2$, $V_3$, and $V_4$) that are used to generate the combined subtree vector may itself be a combined subtree vector that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
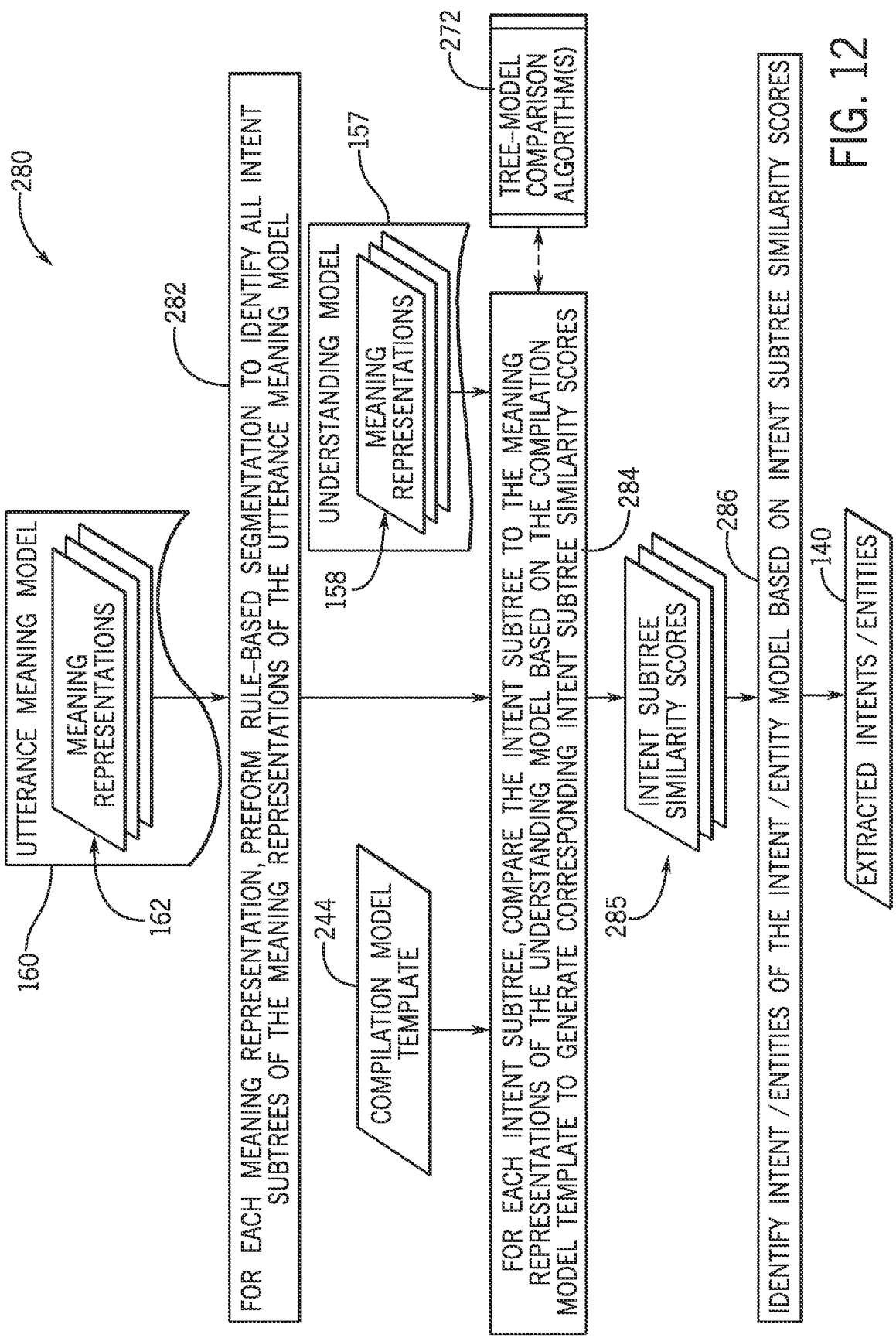
FIG. 12 is a flow diagram illustrating example process by which the meaning search subsystem searches the meaning representations of the understanding model for matches to the meaning representation of the user utterance, in accordance with aspects of the present technique.

Once the meaning representations 158 and 162 have been generated, as illustrated in FIG. 6, the meaning search subsystem 152 can compare these meaning representations to extract intent/entities from the user utterance 122. FIG. 12 is a flow diagram illustrating an example embodiment of a process 280 whereby the meaning search subsystem 152 searches the meaning representations 158 of the understanding model 157 for matches to the meaning representation 162 of the user utterance 122 based on information stored in the compilation model template 244. For the embodiment illustrated in FIG. 12, the meaning search subsystem 152 receives the at least one meaning representation 162 of the utterance meaning model 160 generated in FIG. 9, as discussed above. Using the prosody subsystem 174 discussed above, the meaning search subsystem 152 first segments (block 282) the meaning representations 162 into intent subtrees, each representing an atomic intent, based on one or more stored rules 114 (e.g., intent-segmentation rules).

For the embodiment illustrated in FIG. 12, for each intent subtree of the meaning representation 162 identified in block 282, the meaning search system 152 compares (block 284) the subtree of the meaning representation 162 to the meaning representations 158 of the understanding model 157, based on the contents of the compilation model template 244, to generate corresponding intent-subtree similarity scores 285 using the tree-model comparison algorithm 272. For the embodiment illustrated in FIG. 12, the meaning search system 152 then adds (block 286) the similarity scores calculated in block 284 to the utterance meaning model 160, which may serve as the extracted intent/entities 140 that are passed to the RA/BE 102, as illustrated in FIG. 5. In other embodiments, the meaning search system 152 may generate a different data structure (e.g., a simpler, smaller data structure) to represent the extracted intents/entities 140 that includes only the identified intents/entities from the user utterance 122 (or references to these intent/entities in the intent/entity model 108) along with the intent-subtree similarity scores 285 as a measure of confidence in the intent/entity extraction. In still other embodiments, the extracted intents/entities 140 may only include intents/entities associated with intent subtree similarity scores greater than a predetermined threshold value, which may be stored as part of the compilation model template 244.

Returning briefly to FIG. 10, the illustrated compilation model template 244 includes one or more tables identifying or storing one or more tree model comparison algorithms 272 that are used to compare and score similarity between the meaning representations 162 of the utterance meaning model 160 and the meaning representations 158 of the understanding model 157, as illustrated in FIG. 6. As discussed in greater detail, the tree model comparison algorithms 272 are pluggable modules defined or identified in the compilation model template 244 that are designed to determine a similarity score between two subtree vectors generated by the substructure vectorization algorithms 258, based on class compatibility rules 274 that are also stored as part of the compilation model template 244. The class compatibility rules 274 define which classes of subtree vectors can be compared to one another (e.g., verb word and subtree vectors are compared to one another, subject or object word and subtree vectors are compared to one another) to determine vector distances that provide measures of meaning similarity therebetween.

Figure 13:
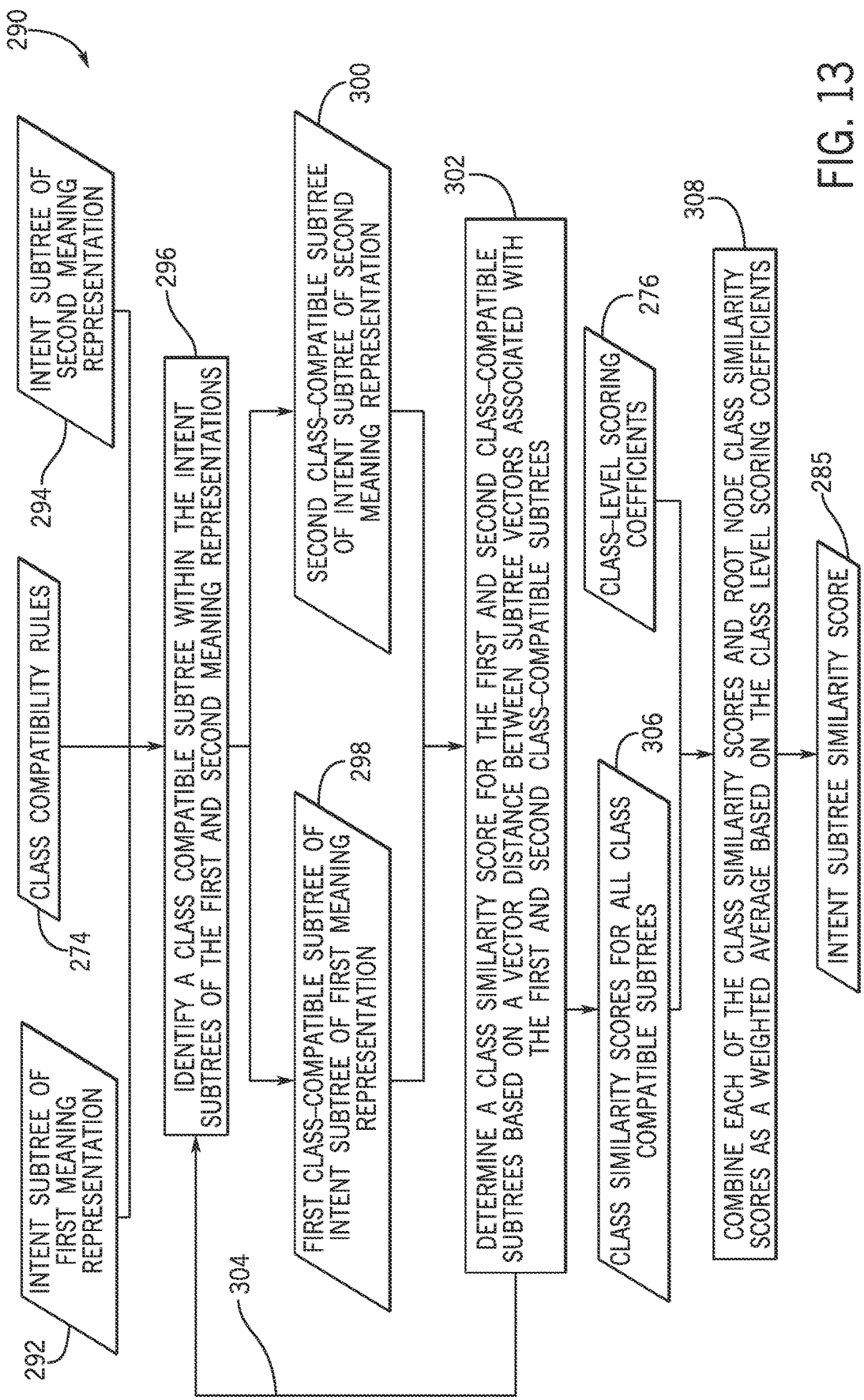
FIG. 13 is a flow diagram illustrating an embodiment of a process by which a tree-model comparison algorithm compares an intent subtree of a first meaning representation to an intent subtree of a second meaning representation, based on the compilation model template, to generate an intent subtree similarity score, in accordance with aspects of the present technique.

The illustrated embodiment of the compilation model template 244 also includes class-level scoring coefficients 276 that define different relative weights in which different classes of word/subtree vectors contribute to an overall similarity score between two subtrees, as discussed with respect to FIG. 13. For example, in certain embodiments, a verb subtree similarity score may be weighted higher and contribute more than a subject subtree similarity score. This sort of weighting may be useful for embodiments in which the agent automation system 100 tends to receive specific natural language instructions. Additionally, in certain embodiments, both the action being requested and the object upon which this action should be applied may be considered more important or influential to the meaning of an utterance than the subject, especially when the subject is the agent automation system 100. For such embodiments, a verb subtree similarity score and a direct object subtree similarity score may be weighted higher and contribute more to the overall similarity score than a subject subtree similarity score. In certain embodiments, the class-level scoring coefficients 276 may be predefined, derived or updated using a ML-based approach, derived or updated using a rule-based approach, or a combination thereof.

As such, in certain embodiments, subtrees are considered a match (e.g., are afforded a higher similarity score) when they resolve to prescribed syntactic patterns found within a larger form. For instance, for an utterance determined to be in an active form (e.g., a subject-verb-any form, as detected by a rules-based parser 186 of the structure subsystem 172 using pre-defined pattern rules), a direct subject subtree (which could be a single word or a complete clause) of the verb may be treated as the subject argument to the verb-led form. Likewise, for an utterance determined to be in a passive form (e.g., a form with passive auxiliaries to the verb), then a prepositional object attached to a specific form of preposition attached to the verb may be treated as the subject equivalent. For example, certain subject (e.g., direct subject) or object (e.g., direct object, indirect object, prepositional object) subtrees are compatible with other subject or object subtrees and can be compared. As a specific example, a first utterance, "Bob ate cheese," is in the active form and, therefore, "Bob" is the direct subject of a form of the verb "to eat." In a second example utterance, "Cheese was eaten by Bob," "was" is a passive auxiliary that indicates, along with the verb form, that the second utterance is in the passive form. For the second example utterance, "by Bob" is the prepositional phrase, with "Bob" being the prepositional object. Accordingly, "Bob" in the first utterance (e.g., as a direct subject in the active form) is compatible with "Bob"

in the second utterance (e.g., as a prepositional object in the passive form) and can be compared as described.

FIG. 13 illustrates an embodiment of a process 290 in which an example tree-model comparison algorithm 272 of the meaning search subsystem 152 compares an intent subtree 292 of the meaning representations 162 (representing at least a portion of the user utterance 122) to an intent subtree 294 of the meaning representations 158 (representing at least a portion of one of the sample utterances 155 of the intent/entity model 108) to calculate an intent subtree similarity score 285. As mentioned, the tree-model comparison algorithm 272 uses the class compatibility rules 274 and the class-level scoring coefficients 276 of the compilation model template 244 to calculate this intent subtree similarity score 285. It may be noted that, in other embodiments, the process 290 may include fewer steps, additional steps, repeated steps, and so forth, in accordance with the present disclosure.

For the illustrated embodiment, the process 290 involves identifying (block 296) class compatible sub-trees 298 and 300 from the intent subtrees 292 and 294, respectively, as defined by the class compatibility rules 274. For the illustrated example, the first class compatible subtree 298 (of the first intent subtree 292) and the second class compatible subtree 300 (of the second intent subtree 294) are then compared to determine a respective class similarity score. More specifically, a respective class similarity score is calculated (block 302) for each node or subtree depending from the class compatible subtrees identified in block 296. In particular, the class similarity score may be determined based on the vector distance between the subtree vectors 256 of the first and second class-compatible subtrees 298 and 300.

As indicated by the arrow 304, blocks 296 and 302 may be repeated until all class compatible subtrees have been identified and the class similarity scores 306 for all class compatible subtrees have been calculated. In an example, the class similarity score for a given class (e.g., a verb class, a subject class, a modifier class) is calculated to be the weighted average of all class-compatible similarity contributions by the constituent subtrees of the intent trees being compared. In other embodiments, the class similarity score for a given class may be calculated as an average similarity score (e.g., an average vector distance) of all nodes or subtrees of the class that are directly coupled to the root nodes of the class compatible subtrees 298 and 300. In certain embodiments, each class similarity score value may be between 0 and 1, inclusively. For example, when comparing the intent subtrees 292 and 294, a set (e.g., an array or matrix) of class similarity scores may include a first class similarity score corresponding to nodes and subtrees of a first class (e.g., verbs), a second class similarity score corresponding to nodes and subtrees of a second class (e.g., direct objects), a third class similarity score corresponding to nodes and subtrees of a third class (e.g., verb modifiers), and so forth.

Continuing through the process illustrated in FIG. 13, the class similarity scores 306 are subsequently combined (block 308) to yield an overall intent-subtree similarity score 285 between the first and second intent subtrees 292 and 294. That is, in block 308, the meaning search subsystem 152 uses the class-level scoring coefficients 276 of the compilation model template 244 to suitably weight each class similarity score generated in block 302 to generate the overall intent subtree similarity score 285. For example, a first class similarity score corresponding to nodes and sub-trees of a first class (e.g., modifiers) is multiplied by a class-level scoring coefficient associated with the first class, a second class similarity score corresponding to nodes and subtrees of a second class (e.g., verbs) is multiplied by a class-level scoring coefficient associated with the second class, a third class similarity score corresponding to nodes and subtrees of a third class (e.g., subjects), is multiplied by a class-level scoring coefficient associated with the third class, and so forth. Additionally, in certain embodiments, one class similarity score corresponds to the vector distance between the respective subtree vectors 256 associated with the root node of the first intent subtree 292 and the root node of the second intent subtree 294, and this class similarity score is similarly multiplied by a respective class-level scoring coefficient (e.g., root node scoring coefficient). In certain embodiments, these products are summed and the result is divided by the number of class similarity scores. As such, for the illustrated example, the overall intent subtree similarity score 285 may be described as a weighted average of the class similarity scores 306 of the class compatible subtrees and the class similarity score of the root nodes. In certain embodiments, the intent subtree similarity score 285 may be normalized to have a value between 0 and 1, inclusive.

Additionally, it may be appreciated that present embodiments enable entrenchment, which is a process whereby the agent automation system 100 can continue to learn or infer meaning of new syntactic structures in new natural language utterances based on previous examples of similar syntactic structures to improve the domain specificity of the NLU framework 104 and the agent automation system 100. As used herein, "domain specificity" refers to how attuned the system is to correctly extracting intents and entities expressed in actual conversations in a given domain and/or conversational channel. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned to be more accurate or appropriate for the given domain.

It is presently recognized that this can enable the agent automation system 100 to have a continuously learning grammar structure model capable of accommodating changes in syntactic structure, such as new grammatical structures and changes in the use of existing grammatical structures. For example, FIG. 14 is a flow diagram illustrating an embodiment of a process 320 whereby the agent automation system 100 continuously improves a ML-based parser 188, which may be plugged into the structure subsystem 172 of the meaning extraction subsystem 150, as discussed with respect to FIG. 7.

Figure 14:
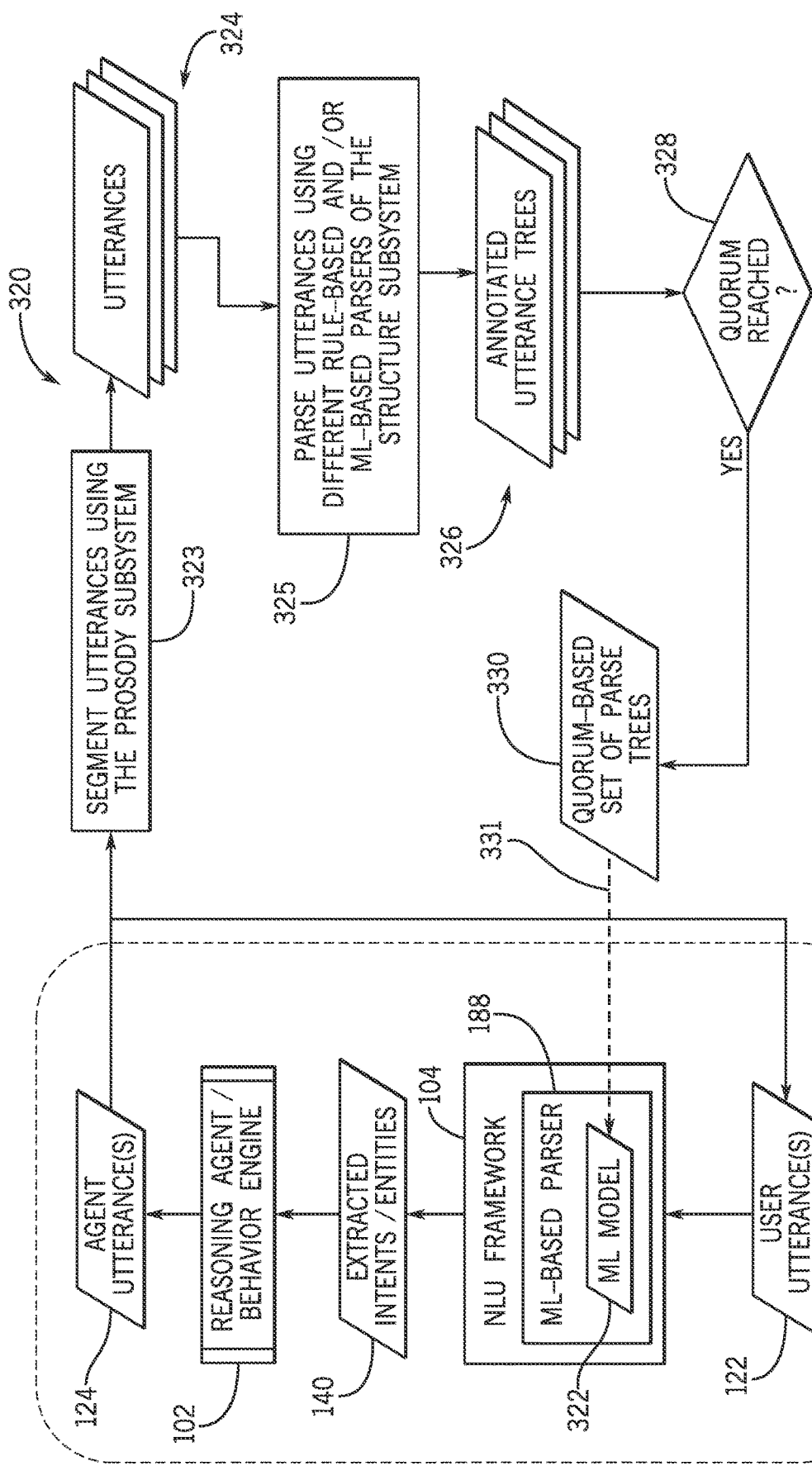
FIG. 14 is a block diagram illustrating an embodiment of a process by which the agent automation system continuously improves a structure learning model, such as a recurrent neural network associated with a ML-based parser of the NLU framework, for improved domain specificity, based on a collection of utterances, in accordance with aspects of the present technique.

For the example illustrated in FIG. 14, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated from a continually growing corpus of utterances 112 of the database 106 illustrated in FIG. 4A. For the example illustrated in FIG. 14, the corpus of utterances 112 may be a continually growing collection of stored user utterances 122 and agent utterances 124, such as a chat log.

For the embodiment illustrated in FIG. 14, prior to operation of the agent automation system 100, the RNN-based model 322 may initially have a set of weights (e.g., a matrix of values) that are set by training. For this example, the ML-based parser 188 may be trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 14 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 14 includes receiving and responding to the user utterance 122, as discussed above with respect to the process 145 of FIG. 5. As mentioned, in certain embodiments, the user utterances 122 and the agent utterances 124 are collected to populate the corpus of utterance 112 stored in the database 106, as illustrated in FIG. 4A. As some point, such as during regularly scheduled maintenance, the prosody subsystem 174 of the meaning extraction subsystem 150 segments (block 323) the collection of stored user utterances 122 and agent utterances 124 into distinct utterances 324 ready for parsing. Then, different rule-based parsers 186 and/or ML-based parsers 188 of the structure subsystem 172 of the meaning extraction subsystem 150 parse (block 325) each of the utterances 324 to generate a multiple annotated utterance tree structures 326 for each of the utterances 324. The meaning extraction subsystem 150 then determines (in decision block 328) whether a quorum (e.g., a simple majority consensus) has been reached by the different parsers.

For the example illustrated in FIG. 14, when the meaning extraction subsystem 150 determines in block 328 that a sufficient number (e.g., a majority, greater than a predetermined threshold value) of annotated utterance trees 326 for a particular utterance are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the utterances 324. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to more correctly parse the grammatical structure of the user utterance 122 and extract the intents/entities 140 therefrom.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 15 is a flow diagram illustrating an embodiment of a process 340 whereby the agent automation system 100 continuously improves a word vector distribution model 342, which may be plugged into the structure subsystem 172 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the example illustrated in FIG. 15, the corpus of utterances 112 may be, for example, a collection of chat logs storing user utterances 122 and agent utterances 124 from various chat room exchanges, or other suitable source data.

Figure 15:
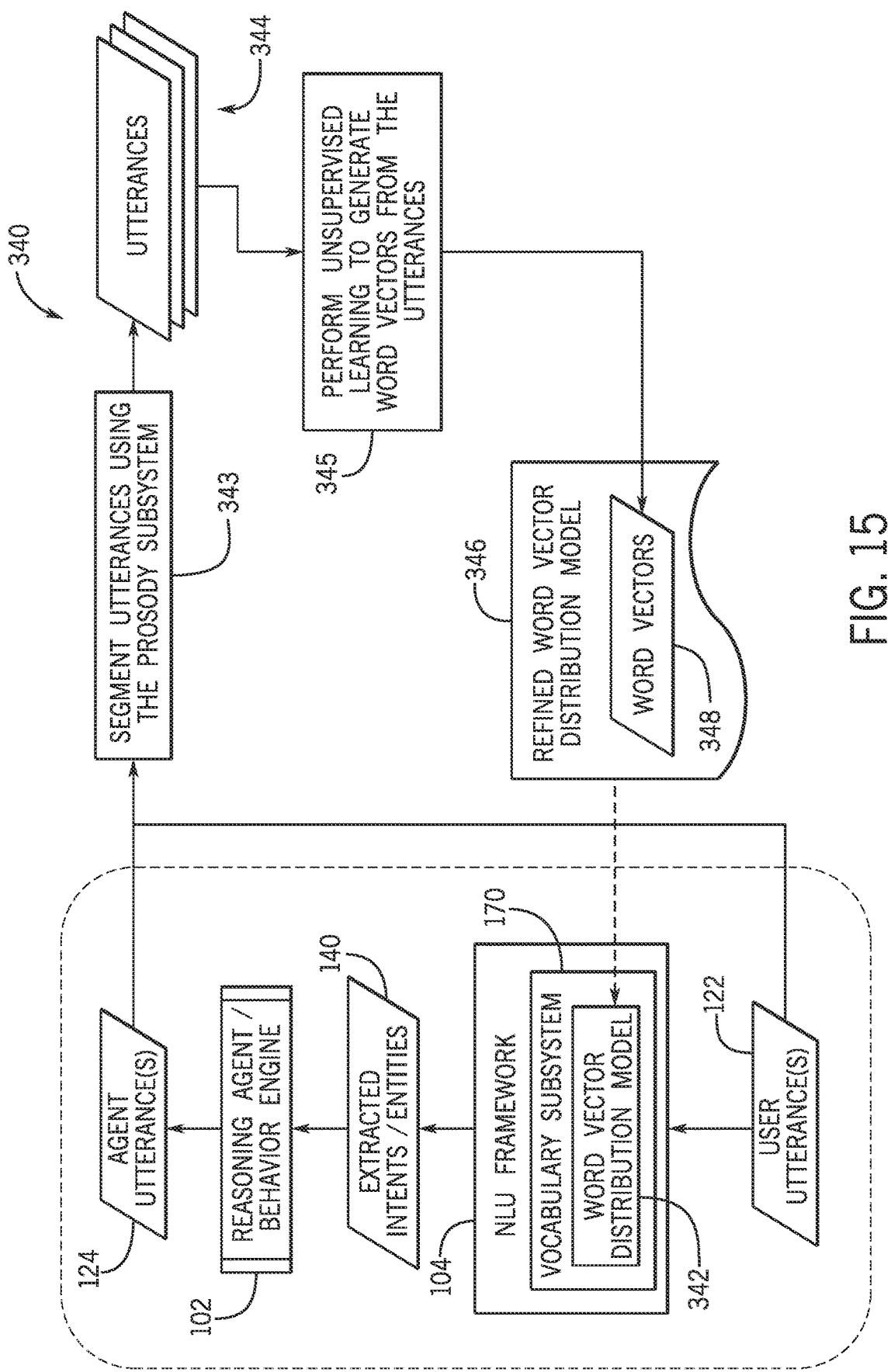
FIG. 15 is a block diagram illustrating an embodiment of a process by which the agent automation system continuously learns new words and/or refines word understanding for improved domain specificity based on a collection of utterances, in accordance with aspects of the present technique.

For the embodiment illustrated in FIG. 15, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 15 enables the word vector distribution model 342 to be modified to include new word vectors, and to change values of existing word vectors, based on source data gleaned from the growing collections of user and agent utterances 122 and 124, to become more adept at generating annotated utterance trees 166 that include these new or changing terms.

Like FIG. 14, the process 340 illustrated in FIG. 15 includes receiving and responding to the user utterance 122, as discussed above with respect to FIG. 5. As mentioned, the user utterances 122 and the agent utterances 124 can be collected to populate the corpus of utterance 112 stored in the database 106, as illustrated in FIG. 4A. As some point, such as during regularly scheduled maintenance, the prosody subsystem 174 of the meaning extraction subsystem 150 segments (block 343) the corpus of utterances 112 into distinct utterances 344 that are ready for analysis. Then, in block 345, the meaning extraction subsystem 150 performs rule-augmented unsupervised learning to generate a refined word vector distribution model 346 containing new or different word vectors 348 generated from the segmented utterances 344.

For example, as discussed above, the meaning extraction subsystem 150 may analyze the set of segmented utterances 344 and determine word vectors 348 for the words of these utterances based on how certain words tend to be used together. For such embodiments, two words that are frequently used in similar contexts within these utterances 344 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 15, the refined word vector distribution model 346 is used to replace the existing word vector distribution model 342, such that the vocabulary subsystem 170 can use this refined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Technical effects of the present disclosure include providing an agent automation framework that is capable of extracting meaning from user utterances, such as requests received by a virtual agent (e.g., a chat agent), and suitably responding to these user utterances. The NLU framework includes a meaning extraction subsystem that is designed to generate meaning representations for the sample utterances of the intent/entity model, as well as a meaning representation for a received user utterance. To generate these meaning representations, the meaning extraction subsystem includes a vocabulary subsystem, a structure subsystem, and a prosody subsystem that cooperate to parse utterances based on combinations of rule-based methods and ML-based methods. Further, for improved accuracy, the meaning extraction subsystem includes a rule-based augmentation error detection subsystem that can cooperate with the vocabulary, structure subsystem, and prosody subsystems to iteratively parse and correct an utterance before meaning representations are generated. The meaning representations are a data structure having a form or shape that captures the grammatical structure of the utterance, while subtrees of the data structure capture the semantic meaning of the words and phrases of the utterance as vectors that are annotated with additional information (e.g., class information).

Additionally, the disclosed NLU framework includes a meaning search subsystem that is designed to search the meaning representations associated with the intent/entity model to locate matches for a meaning representation of a received user utterance. Conceptually, the meaning representation of the received user utterance is used like a search key to locate matching meaning representations in the search space defined by the collection of meaning representations generated from the intent/entity model. The meaning search subsystem is designed to determine a similarity score for portions of different meaning representations based on stored particular stored rules and weighting coefficients (e.g., class compatibility rules and class-level scoring coefficients). Additionally, the NLU framework can continue to learn or infer meaning of new syntactic structures in new natural language utterance based on previous examples of similar syntactic structures, and learn or modify its vocabulary based on a usage of a new term or an existing term in a new context. As such, components of the NLU framework (e.g., a neural network models, the word vector distributions) may be continuously updated based on new utterances, such as natural language exchanges between users and a virtual agent, to enhance the adaptability of the NLU framework to changes in the use and meaning of certain terms and phrases over time.

Vocabulary Management

Virtual agents may be implemented in a wide range of applications for a wide range of customers or clients. For example, virtual agents may be utilized by organizations in retail, manufacturing, accounting, consumer product development and/or sales, software development, information technology services, social media, consulting, engineering, banking, oil and gas, insurance, real estate, commercial equipment sales, media, healthcare, construction, legal services, transportation, pharmaceuticals, marketing, etc. Further, these virtual agents may engage with users within these organizations in a wide variety of roles, such as executives, information technology (IT) professionals, assistants, engineers, attorneys, doctors, nurses, technicians, accountants, human resources professionals, analysts, software developers, janitors, etc. Dependent upon the particular application and the particular users, a given instantiation of the virtual agent may utilize vocabulary terms that may be specific to that application and/or the specific users of the virtual agent. As such, it is presently recognized that there is a need to customize the vocabulary of virtual agents to the particular industries and users they will serve. Present embodiments are directed to an agent automation framework that is capable of extracting meaning from user utterances, such as requests received by a virtual agent (e.g., a chat agent), suitably responding to these user utterances, and learning new vocabulary words, or new meanings for known words, as time passes and exchanges between the chat agent and the user occur.

The agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

In present embodiments, the virtual agent is capable of learning new words, or new meanings for known words, based on exchanges between the virtual agent and the user in order to customize the vocabulary of the virtual agent to the needs of the user or users. Specifically, the agent automation framework may have access to a corpus of previous exchanges between the virtual agent and the user, such as one or more chat logs. The agent automation framework may segment the chat logs into utterances using the prosody subsystem. The utterances may then be further segmented into words and/or phrases. The agent automation framework may then recognize new words and/or new meanings for known words. New word vectors may then be generated for these new words and/or new meanings for known words. The new word vectors may then be added to an existing word vector distribution model of the vocabulary subsystem to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

In interpreting and analyzing user utterances, the user utterance may include a word or phrase for which there are multiple word vectors corresponding to multiple respective known meanings for the word. In order to identify the intended meaning, the agent automation framework segments the utterance into words and/or phrases. The words and/or phrases may then be pre-processed by, for example, applying directives and/or instructions from the vocabulary model. Pre-processing may include checking spelling, correcting formatting issues, expanding contractions, expanding abbreviations, replacing acronyms with associated words, as well as other data-cleansing processes. If word usage context is available, the agent automation framework may determine which meaning was intended by performing context-based disambiguation via an ontology service and/or the structure service. If no context is available, the agent automation framework may extract word vectors matching the surface form or form derivatives. If no word vectors are found, the agent automation framework derives semantic word vectors according to null-word rules. The vectors are then post-processed before being output. Post-processing may include, for example, extracting a representative vector or vector set given one or more synonymic vector lists. As time passes and the virtual agent exchanges utterances with the user, the virtual agent learns new words, or new meanings for known words, and thus customizes its vocabulary to its specific application and users.

A computing platform may include a chat agent, or another similar virtual agent, that is designed to respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. As the chat agent of the agent automation framework exchanges utterances with one or more users, a chat log or other corpus of utterances may be populated. The agent automation framework may then analyze the chat log to identify new words or new meanings for known words, and generate word vectors for these new words and/or meanings. The new word vectors can be used to better analyze user utterances and can also be used in agent utterances responding to user utterances. Accordingly, as time passes and utterances are exchanged with the user, the chat agent may learn new words and/or new meanings for known words, thus customizing the chat agent's vocabulary to the chat agent's specific application and users.

Figure 18:
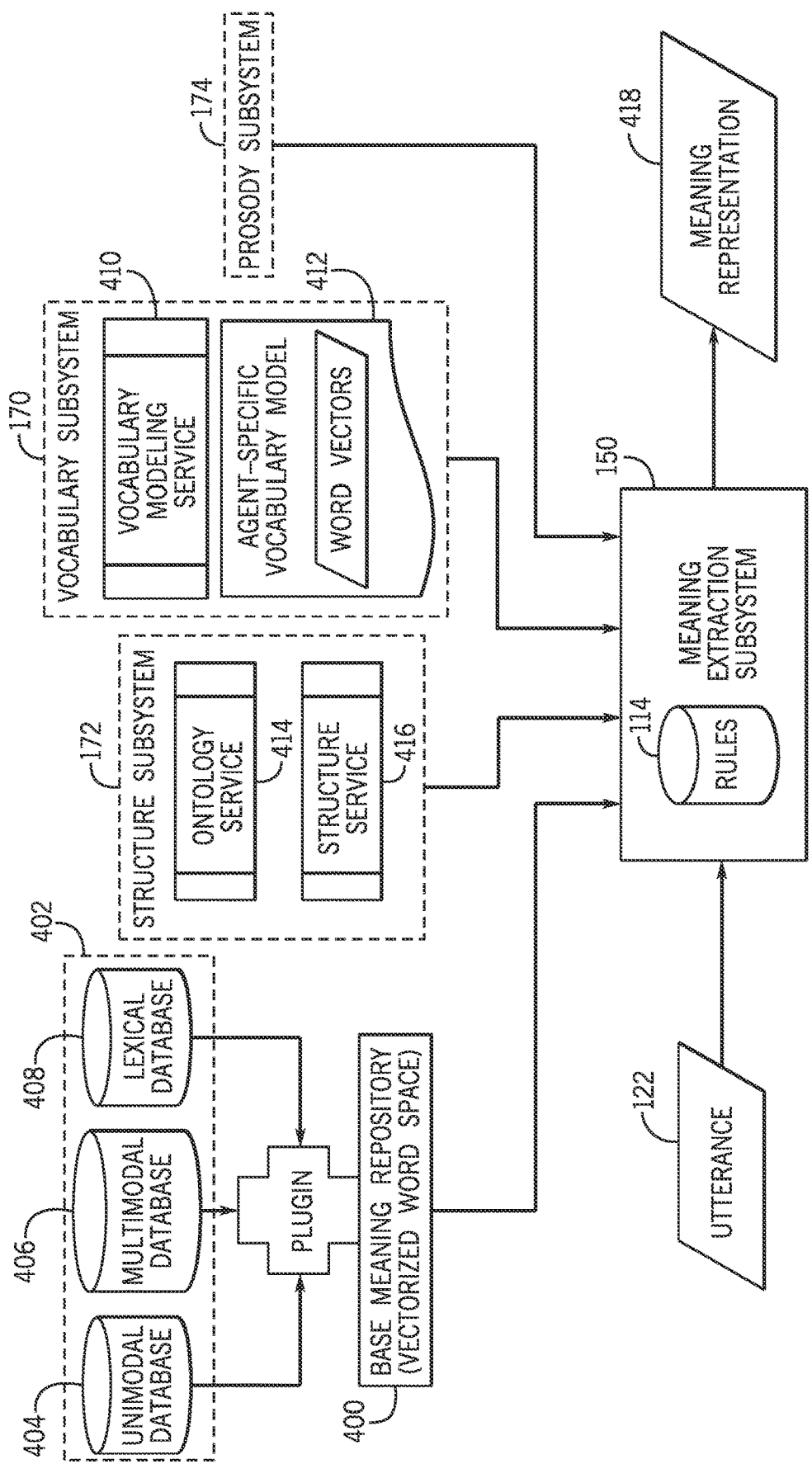
FIG. 18 is a block diagram illustrating how the vocabulary subsystem of FIG. 7 operates within the NLU framework, in accordance with aspects of the present techniques.

FIG. 18 is a block diagram illustrating how the vocabulary subsystem 170 of FIG. 7 operates within the NLU framework 104. As shown, the rule based meaning and extraction system 150 has access to a base meaning repository 400. The base meaning repository 400 may be a vectorized word space. That is, the base meaning repository 400 may include a collection of word vectors for known vocabulary words. As shown, the base meaning repository 400 may have access to a number of word distribution databases 402. In the illustrated embodiment, the word distribution databases 402 include a unimodal database 404, a multimodal database 406, and a lexical database 408. As described above with regard to FIG. 7, unimodal refers to word vector distributions having a single vector for each word. Accordingly, the unimodal database 404 may include a single word vector for each word listed in the database 404. Correspondingly, multimodal refers to having word vector distributions supporting multiple vectors for particular words (e.g., homonyms, polysemes) that can have different meanings in different contexts (e.g., a "bank" may refer to a place to store money, money itself, a maneuver of an aircraft, or a location near a river). As such, the multimodal database 406 may include multiple word vectors for each word listed in the database 406 based on the different possible meanings for the word. The lexical database 408 may be used to for disambiguation purposes to help select the correct word vector for a given word from the multimodal database 406. In some embodiments, this determination may be made based on context with help from the structure subsystem 172. In some embodiments, as is discussed in more detail below, the lexical database 408 may also be used to generate word vectors for new words that were previously unknown, or for new meanings for known words. It should be understood, however, that the word distribution databases 402 shown in FIG. 18 are merely examples and that embodiments are envisaged that utilize additional databases, fewer databases, or different combinations of databases.

As shown, data from the word distribution databases 402 may be retrieved or plugged into the base meaning repository 400 to provide a repository of known vocabulary words and their meanings to the meaning extraction subsystem 150. As previously described, the meaning extraction subsystem 150 may parse provided utterances and output one or more meaning representations 418. Occasionally, the meaning extraction subsystem 150 may come across a new word that is not in the base meaning repository 400, or use of a word in the base meaning repository 400 that does not comport with any of the meanings of the word stored in the base meaning repository 400. In such instances, the meaning extraction subsystem 150 may alert a vocabulary modeling service 410. In some embodiments, the meaning extraction subsystem 150 may provide the vocabulary modeling service 410 with both the new word and/or meaning, as well as the context in which the new word and/or meaning was used. The vocabulary modeling service 410 generates and/or maintains an agent-specific vocabulary model 412. For example, the vocabulary modeling service 410 may store meanings for new vocabulary words and/or alternate meanings for known vocabulary words. For example, a company may have in its office a conference room called "Everest". Accordingly, the vocabulary modeling service 410 may store the meaning of the word "Everest" as being a mountain and/or a conference room. Further, the vocabulary modeling service 410 may notice certain patterns for when different meanings of a word are intended and update meaning/derivation rules and/or synonym entries accordingly. For example, the character sequence "http" may indicate that the character string is a URL. Accordingly, as new words, or new meanings for existing words, are used, a patterns for what meaning is intended are discovered, the vocabulary modeling service 410 may update the agent-specific vocabulary model 412 to incorporate these changes. In some embodiments, the vocabulary modeling service 410 may update the base meaning repository 400 with new words and/or meanings. Accordingly, over time, as new words, or new meanings for existing words, are used, the agent-specific vocabulary model 412 may evolve such that the agent is more suited to its specific application.

As previously discussed, when the meaning extraction subsystem 150 notices a new word or a new meaning for an existing word, the meaning extraction subsystem 150 notifies the vocabulary modeling service 410 and provides the new word and/or meaning to the vocabulary modeling service 410, as well as the context in which the new word and/or meaning was used. In some embodiments, the structure subsystem 172 may be used to analyze the context in which the new word and/or meaning were used. For example, as shown in FIG. 18, the structure subsystem 172 may include an ontology service 414 and a structure service 416. The ontology service 414 may access the lexical database 408, which may store metadata for words reflecting different possible forms of the word (e.g., noun, verb, adjective, etc.). The structure service 416 performs linguistic structure extraction (e.g., parsing the structure, tagging parts of speech, etc.) and may assist the ontology service 414 in disambiguation by analyzing the context of the new word and/or meaning. Accordingly, the ontology service 414 and the structure service 416 may work in concert, using data from the lexical database 408, to analyze the use of the word, the context of the word's use, and determine what meaning of the word was intended.

As previously described, the prosody subsystem 174 analyzes the prosody of the utterance using a combination of rule-based and ML-based prosody plugins. Specifically, the prosody subsystem 174 analyzes the utterance for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. Accordingly, the prosody subsystem 174 can combine or select from prosody parsed structures output by the various prosody plug-ins to help generate the meaning representations 418.

Figure 19:
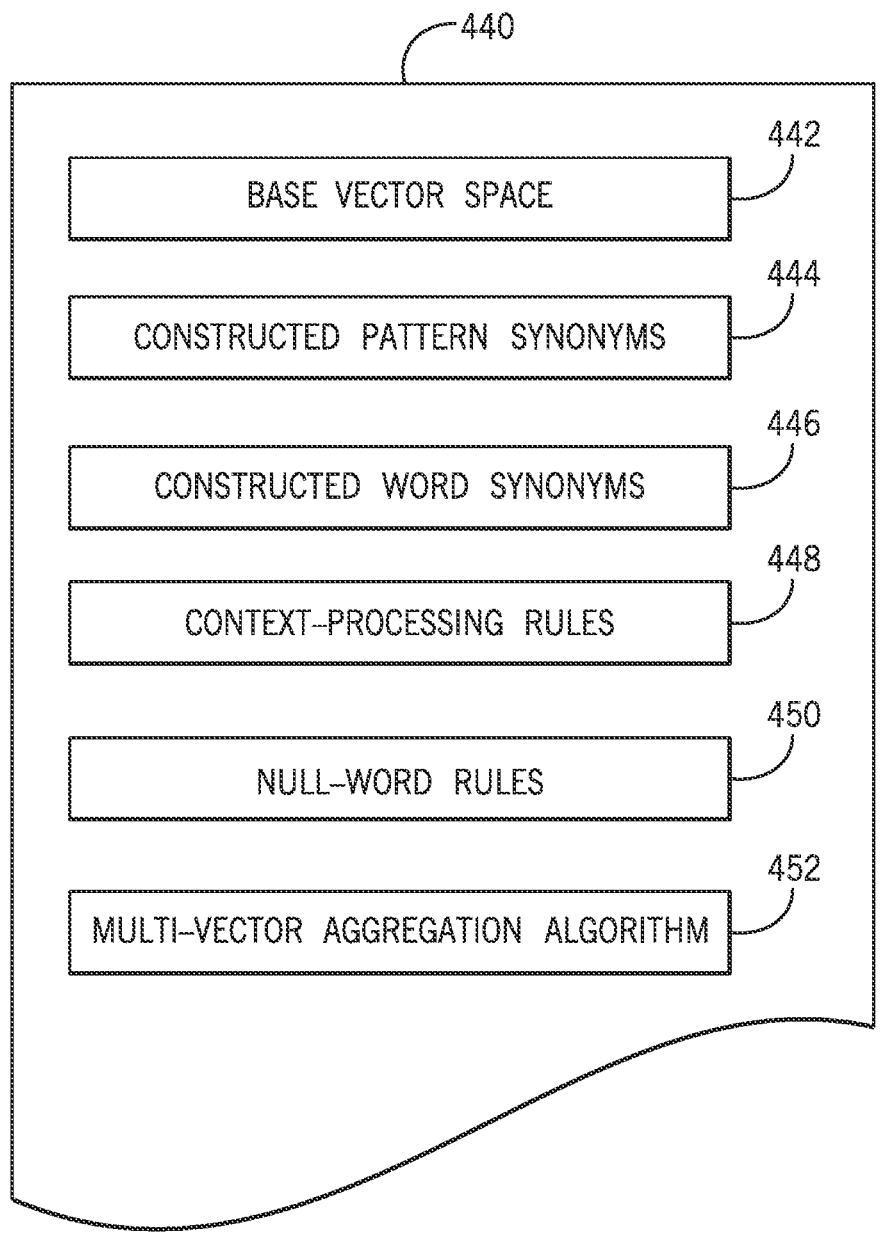
FIG. 19 is a diagram illustrating what may be included in a vocabulary model template, in accordance with aspects of the present techniques.

The agent specific vocabulary model 412 may be developed using a collection of vocabulary model templates. FIG. 19 is a diagram illustrating what may be included in a vocabulary model template 440. As shown, the vocabulary model template 440 may include fields for base vector space 442, constructed pattern synonyms 444, constructed word synonyms 446, context processing rules 448, null word rules 450, and multi-vector algorithms 452.

The base vector space 442 may include data from the base meaning repository 400 and/or the databases 402. Accordingly, the data may include one or more word vectors (e.g., a vector for each respective meaning), as well as data corresponding to word usage and methods for vector learning and/or derivation. As previously described, the base vector space 442 may be derived from some available corpus of data (e.g., one or more websites, or some other collection of writing) and act as a basis for subsequent modifications to the meanings of the word.

The constructed pattern synonyms 444 include one or more phrases or collections of words that may act as synonyms for the word in question or otherwise have the same or similar meanings as the word in question. Similarly, the constructed word synonyms 446 include words that may act as synonyms for the word in question or otherwise have the same or similar meanings as the word in question. Both the constructed pattern synonyms 444 and the constructed word synonyms 446 may be generated and/or maintained by the vocabulary modeling service 410 over time. In some embodiments, the constructed pattern synonyms 444 and the constructed word synonyms 446 include word vectors for the word synonyms and the pattern synonyms.

The context processing rules 448 include rules generated by the vocabulary modeling service 410 for how to process the context in which the word is used. The context processing rules 448 may be developed by the vocabulary modeling service 410 as new uses and/or meanings for words, or new words, are used in utterances. For example, the vocabulary modeling service may develop rules for determining when the word "return" is intended as a noun (e.g., "I submitted my tax return today") or a verb (e.g., "I would like to return this pair of shoes that I bought"). The context processing rules 448 may be used to determine which of the known meanings for a word is intended, as well as how to determine an intended meaning for a word that does not comport with one of the known meanings for a word. Further, the context processing rules 448 may be used to determine an intended meaning for a new word based on context. In addition to generating new rules or modifying existing rules, the context processing rules 448 may also include combining multiple rules to process context of word usage.

The null word rules 450 include rules for determining meanings for words that cannot otherwise be determined via disambiguation and/or other word vector techniques based on data in the base meaning repository 400, context, etc. For example, the null word rules 450 may include rules for deriving a word vector for a word based on the surrounding words. For example, if the base word vector database was learned via contextual approaches (i.e., learning a new word or a new meaning for an existing word based on the words that frequently surround it or predicting what words typically surround a word, or any other statistical method measuring co-occurrence of a word and its surrounding context), then the null word placeholder can be generated based on the word vectors of the surrounding words in an utterance. Alternatively, a model can be trained to directly generate word vectors given known word-surface-form-as-an-ordered-collection-of-characters to vector mappings (e.g., use a pre-existing word vector database as training data to derive an ML model that can be consulted to generate word vectors given an ordered collection of characters).

Figure 20:
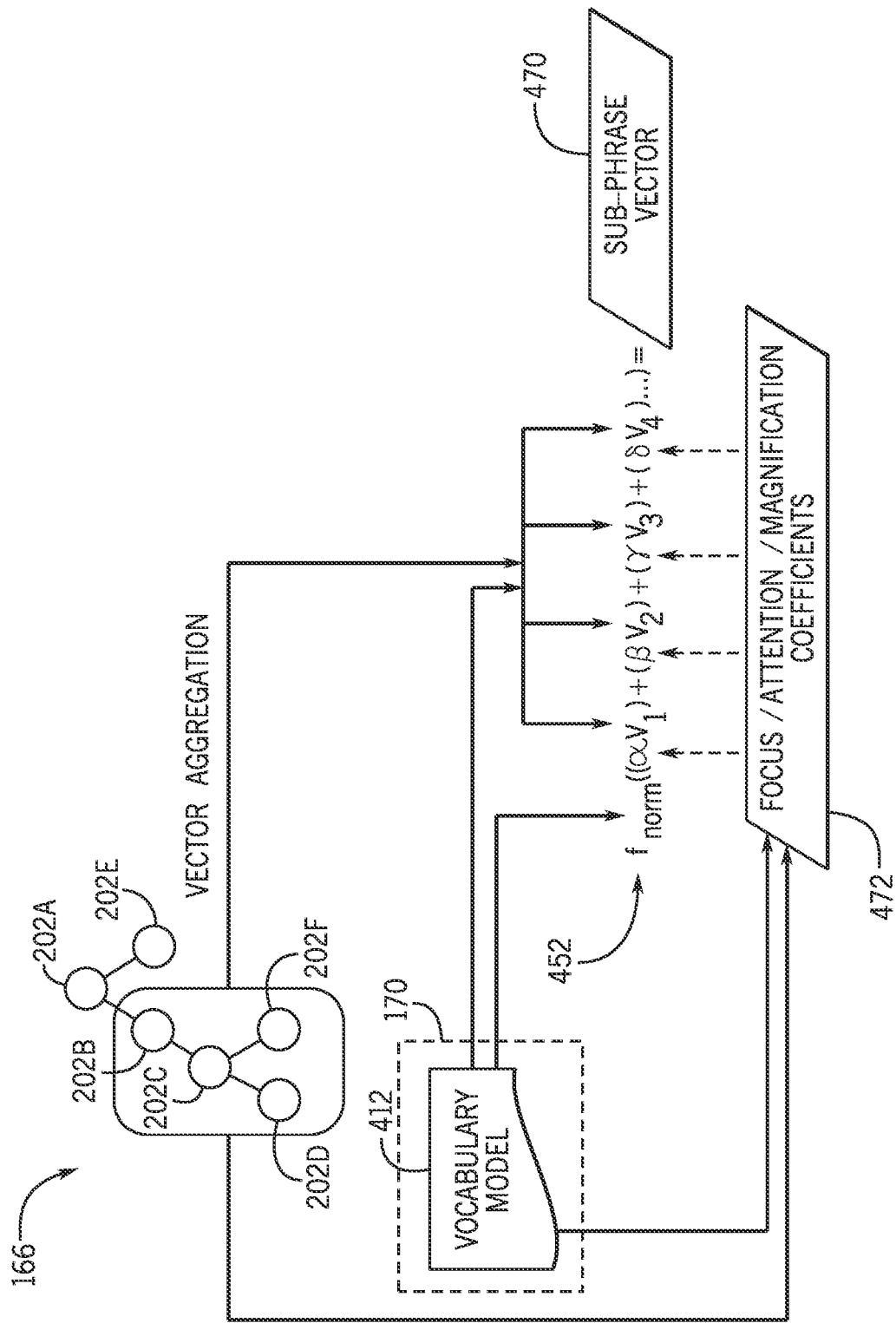
FIG. 20 is a block diagram illustrating example operation of an embodiment of a multi-vector aggregation algorithm to generate a combined sub-phrase vector for a subtree of an annotated utterance tree, in accordance with aspects of the present techniques.

The multi-vector aggregation algorithms 452 include one or more algorithms for deriving a single word vector from a collection of word vectors. For example, FIG. 20 illustrates how a multi-vector aggregation algorithm 452 combines multiple word vectors into a single sub-phrase vector 470. As shown in FIG. 20, the vocabulary model 412 of the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace phrases including multiple word vectors with individual words or sub-phrases having single word vectors). As such, it is appreciated that, at one or more stages of intent/entity extraction, the number of nodes/subtrees of the annotated utterance tree 166 may be increased or decreased, along with the number of word vectors combined to calculate the sub-phrase vector 470, relative to an original utterance or an initially generated annotated utterance tree 166. In other embodiments, the multi-vector aggregation algorithm 452 may be used to generate a single word vector 470 from a group of synonyms by using weighted average.

As shown in FIG. 20, the multi-vector aggregation algorithm 452 generates the sub-phrase vector 470 by multiplying each of the word vectors by a respective focus/attention/magnification (FAM) coefficient 472 (e.g., $\alpha$, $\beta$, $\gamma$, $\delta$) associated with the word vector. The FAM coefficients 472 are used to tune how much relative focus or attention (e.g., signal magnification) should be granted to each portion (e.g., node) of a subtree when generating a sub-phrase vector 470. Accordingly, the FAM coefficients 472 increase or decrease the contribution of each word vector to the combined sub-phrase vector 470. After applying the FAM coefficients 472 to the word vectors $V_{1-4}$, the results are combined using vector addition, as indicated by the "+" notation in FIG. 20. Additionally, for the illustrated embodiment, the resulting sub-phrase vector 470 is subsequently normalized to ensure that the dimensions of the combined sub-phrase vector 470 are each within a suitable range after the multiplication and addition operations. It may be noted that the tree substructure vectorization algorithm 452 illustrated in FIG. 20 is merely provided as an example, and in other embodiments, other suitable tree substructure vectorization algorithms may be used, in accordance with the present disclosure. In some embodiments, the vector aggregation may be performed iteratively (e.g., via class-level component comparisons). In other embodiments, a general signal for all nodes in the tree or sub-tree may be requested and used for vector aggregation.

By way of example, in certain embodiments, verb words or subtrees may be associated with one of the FAM coefficients 472 (e.g., $\alpha$) that is greater in value than another FAM coefficient (e.g., $\beta$) associated with a subject or direct object word or subtree vector. In certain embodiments, root node word vectors may be associated with a relatively higher FAM coefficient 472 than word vectors associated with other nodes. In certain embodiments, the combined sub-phrase vector 470 is a centroid that is calculated as the weighted average of the word vectors associated with all nodes of the subtree. In other embodiments, the meaning extraction subsystem 150 may recursively perform vector aggregation. In certain embodiments, one or more of the vectors (e.g., $V_1$, $V_2$, $V_3$, and $V_4$) that are used to generate the combined sub-phrase vector 470 may itself be a combined sub-phrase vector 470 that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 21:
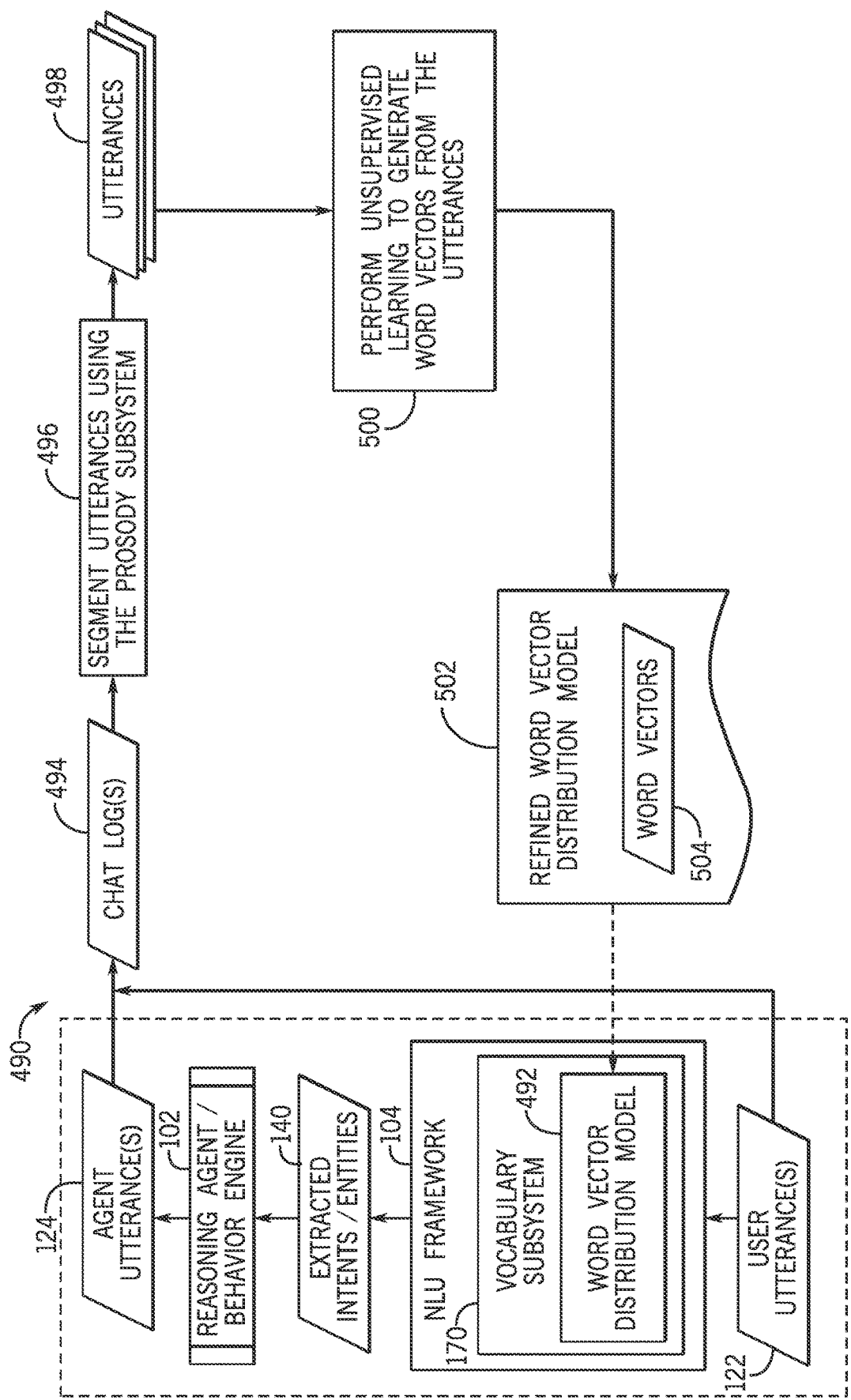
FIG. 21 is a flow diagram illustrating how the agent automation framework continuously improves a word vector distribution model, which may be plugged into the vocabulary subsystem of the meaning extraction subsystem shown in FIG. 7, in accordance with aspects of the present techniques.

Returning to FIG. 7, as the virtual agent communicates with users (e.g., receives, processes, and responds to utterances), data may be generated and collected to further train the system to learn new words and/or refine word understandings. For example, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 21 is a flow diagram illustrating an embodiment of a process 490 whereby the agent automation system 100 continuously improves a word vector distribution model 492, which may be plugged into the vocabulary subsystem 170 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 492, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the embodiment illustrated in FIG. 21, the corpus of utterances 112 may be, for example, a collection of chat logs 494 storing user utterances 122 and agent utterances 124 from various chat room exchanges, or other suitable source data.

For the embodiment illustrated in FIG. 21, prior to operation of the agent automation system 100, the word vector distribution model 492 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 21 enables the word vector distribution model 492 to be modified to include new word vectors, and to change values of existing word vectors, based on source data gleaned from the growing collections of user and agent utterances 122 and 124, to become more adept at generating annotated utterance trees 166 that include these new or changing terms.

The process 490 illustrated in FIG. 21 includes receiving and responding to the user utterance 122, as discussed above with respect to FIG. 5. As mentioned, the user utterances 122 and the agent utterances 124 can be collected to populate the corpus of utterances 112 (e.g., chat logs 494) stored in the database 106, as illustrated in FIG. 4A. As some point, such as during regularly scheduled maintenance, the prosody subsystem 174 of the meaning extraction subsystem 150 segments (block 496) the chat logs 494 into distinct utterances 498 that are ready for analysis. Then, in block 500, the meaning extraction subsystem 150 performs rule-augmented unsupervised learning to generate a refined word vector distribution model 502 containing new or different word vectors 504 generated from the segmented utterances 498.

For example, as discussed above, the meaning extraction subsystem 150 may analyze the set of segmented utterances 498 and determine word vectors 504 for the words of these utterances based on how certain words tend to be used together. For such embodiments, two words that are frequently used in similar contexts within these utterances 498 are considered closely related and, therefore, are assigned a similar vector value (e.g., relatively closer in terms of Euclidean distance) in one or more dimensions of the word vectors 504. In this manner, the meaning extraction subsystem 150 may adapt to changes in the meaning of a previously understood term based on new context in which the term is used. Accordingly, the agent automation system 100 may parse the chat logs 494 to evaluate how a word or phrase is used in the chat logs 494 and determine whether the usage is represented by one or more associated word vectors 504 of the word vector distribution model 502. This may include, for example, considering the context in which the word or phrase is used to determine the intended meaning of the word, as described below with regard to FIG. 22. If not, the word vector distribution model 502 may be updated to add one or more new word vectors 504 representative of the new meaning, or replace one or more existing vectors 504 to match the new meaning.

As illustrated in FIG. 21, the refined word vector distribution model 502 is used to replace the existing word vector distribution model 492, such that the vocabulary subsystem 170 can use this refined model to provide word vectors for the words and phrases of new user utterances 122 received by the agent automation system 100. For example, an initial word vector distribution model 492 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 500, a new word vector would be generated for the term "Everest" that would be relatively close in one or more dimensions to word vectors for terms such as "conference", "meeting", "presentation", and so forth. After updating the word vector distribution model 502, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Figure 22:
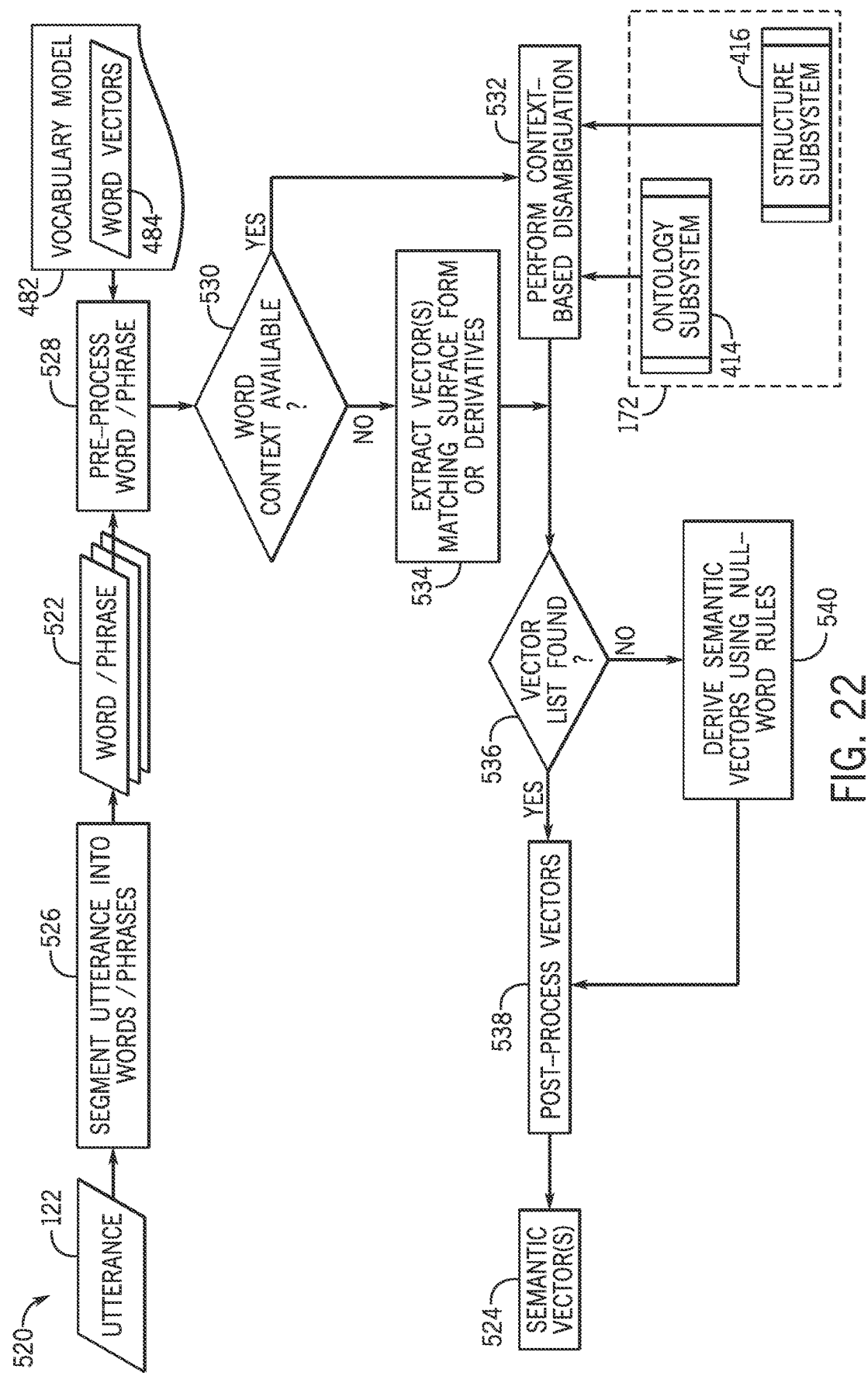
FIG. 22 is a flow diagram illustrating a process for receiving the user utterance, determining which meanings of one or more words or phrases appearing in the utterance were intended, and outputting one or more associated semantic word vectors, in accordance with aspects of the present technique.

As previously described, a word or phrase may be associated with multiple word vectors 504 associated with different meanings of the word. Using the "Everest" example from above, when the term "Everest" is used in a user utterance 122, the user could have intended Mount Everest, the conference room named Everest, or some other meaning. Accordingly, the NLU framework 104 may analyze user utterances 122 to determine which word vectors 504 were intended when a word or phrase appears in an utterance 122. FIG. 22 is a flow chart illustrating a process 520 for receiving a user utterance 122, determining which meanings of one or more words or phrases 522 appearing in the utterance 122 were intended, and outputting one or more associated semantic word vectors 524. At block 526, the utterance 122 is parsed and segmented into words and/or phrases 522. This may include, for example, parsing the utterance 122 and generating an annotated utterance tree as shown and described above with regard to FIGS. 8 and 9, wherein each word or phrase 522 is represented by a node.

At block 528, each word/phrase 522 is pre-processed. Pre-processing may include, for example, applying pre-processing directives or instructions from the vocabulary model 482. These directives or instructions may provide guidance for checking spelling, correcting formatting issues, expanding contractions, expanding abbreviations, replacing acronyms with associated words, as well as other data-cleansing processes.

At decision 530, the system determines whether there is any word context available. If word context is available, the process 520 proceeds to block 532 and performs context-based disambiguation. The surrounding words and/or phrases 522 in the utterance 122 may provide context for determining what meaning of the word or phrase 522 in question was intended. In some embodiments, the ontology service 414 and/or the structure service 416 may be utilized to perform the context-based disambiguation. Returning to the "Everest" example, if the utterance 122 is "I'm not sure, but we have a meeting scheduled in Everest at 2:30 pm this afternoon to discuss what to do", the other words 522 in the utterance 122 may be used to determine that the use of the word "Everest" in the utterance 122 was referring to the conference room. For example, the words "meeting" and reference to a time just a couple of hours in the future, with Mount Everest being thousands of miles away, may signal that Everest the conference room was intended, instead of Mount Everest. However, if the utterance had been "we're just going to Santa Cruz for the weekend, it's not like we're traveling to go climb Everest", the other words 522 in the utterance 122 may be used to determine that the use of the word "Everest" in the utterance 122 was referring to Mount Everest and not the conference room. For example, the words "climb", "traveling" and reference to various destinations, may signal that Mount Everest was intended, instead of Everest the conference room. Once the context-based disambiguation has been performed, word vectors are selected based on the context and extracted.

However, if the utterance 122 in question only includes a single word or phrase 522, the system may determine that there is no context available and proceed to extract one or more vectors matching the surface form or form derivatives (block 534). For example, word vectors 484 for the word or phrase 522 may be selected from the vocabulary model 482 based solely on the surface form used in the utterance 122, or form derivatives. Alternatively, if the utterance 122 in question only includes a single word or phrase 522, the system may refer to other utterances that precede or proceed the utterance in question to determine whether any context is available. For example, the single word or phrase 522 of the utterance 122 may be a single word or phrase answer to a question. As such, considering the question may provide context as to what was meant by the single word or phrase 522 of the utterance 122.

If there are no word vectors associated with the word or phrase 522, then no word vectors are extracted. At decision 536, the process 520 determines whether a vector list has been found (i.e., were any word vectors extracted?). If vectors were extracted in blocks 532 and/or 534, then the process 520 proceeds to block 538 and post-processes the extracted vectors, resulting in the output semantic word vectors 524. For example, the post-processing may include extracting a representative vector or vector set given one or more synonymic vector lists generated during blocks 532 and 534.

However, if no vector word lists have been extracted in blocks 532 and 534, the process 520 proceeds to block 540 and uses null-word rules (e.g., as described with regard to FIG. 19) received from the vocabulary model 482 to generate word vectors 524 for the word or phrase 522. In some embodiments, when null word rules are used to derive semantic vectors for a word or phrase, the unknown word or phrase may be flagged as an unknown word for future learning, and/or input may be requested from a user to help define the word or phrase. The generated word vectors 524 may then be post-processed (block 538) as described above. The NLU framework 104 may then insert the semantic vectors 524 output by the process 520 shown in FIG. 22 into the annotated utterance tree and use the annotated utterance tree to determine the intent of the utterance 122 and generate a response. In some embodiments, learning may be triggered by one or more conditions. For example, in some embodiments, learning may be triggered by the magnitude of collected data (e.g., when chat logs reach a threshold size). In other embodiments, an unknown word or an unknown meaning for a known word being used a threshold number of times within some window of time may trigger learning. In some embodiments, learning may take place on a scheduled basis (e.g., weekly, monthly, quarterly, annually, etc.). It should be understood, however, that in some embodiments, learning may be triggered by one or more of multiple possible conditions.

Technical effects of the present section of the disclosure include a virtual agent that is capable of learning new words, or new meanings for known words, based on exchanges between the virtual agent and the user in order to customize the vocabulary of the virtual agent to the needs of the user or users. The agent automation framework may have access to a corpus of previous exchanges between the virtual agent and the user, such as one or more chat logs. The agent may segment the chat logs into utterances using the prosody subsystem, and then further segment the utterances into words and/or phrases. The agent automation framework may then recognize when new words and/or new meanings for known words appear in user utterances. New word vectors may be generated for these new words and/or new meanings for known words. The new word vectors may then be added to an existing word vector distribution model to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

When determining the intended meaning for a word used in an utterance that has multiple different meanings and multiple different respective word vectors, the agent automation framework segments the utterance into words and/or phrases. If word usage context is available, the agent automation framework may determine which meaning was intended by performing context-based disambiguation via the ontology service and/or the structure service. If no context is available, the agent automation framework may extract word vectors matching the surface form or form derivatives. If no word vectors are found, the agent automation framework derives semantic word vectors according to null-word rules. As time passes and the virtual agent exchanges utterances with the user, the virtual agent learns new words, or new meanings for known words, and thus customizes its vocabulary to its specific application and users.

Templated Rule-Based Data Augmentation for Intent Extraction

It is presently recognized that there is a need to improve the ability of virtual agents to apply NLU techniques to properly derive meaning from complex natural language utterances. For example, it may be advantageous to create a virtual agent capable of comprehending complex language and executing contextually relevant requests, which could afford substantial advantages in terms of reduced operational cost and increased responsiveness to client issues. Additionally, it is recognized that it is advantageous for virtual agents to be customizable and adaptable to various communication channels and styles.

Additionally, in the context of NLU and AI, it is recognized that data augmentation can add value to base data by adding information derived from internal and external sources within an enterprise. For example, data augmentation can help reduce manual intervention involved in developing meaningful information and insight from business data, as well as significantly enhance data quality. There are many approaches to augment data, for instance, adding noise or applying transformations on existing data and simulation of data. However, it is presently recognized that data augmentation can become increasingly challenging as the complexity of data increases. With this in mind, there appears to be a need to improve methods of applying semantic techniques for data augmentation within a NLU framework.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. In particular, the meaning extraction subsystem of the disclosed NLU framework includes a vocabulary subsystem, a structure subsystem, and a prosody subsystem that cooperate to parse utterances (e.g., received user utterances, sample utterances of the intent/entity model) into the annotated utterance trees based on combinations of rule-based methods and machine learning (ML)-based (e.g., statistical) methods.

The disclosed NLU framework also includes a model augmentation subsystem capable of performing rule-based augmentation to augment a model (e.g., the utterance meaning model and/or the understanding model) by generalizing and/or refining the model. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to prune substantially similar meaning representations from the model based on stored refining rules. Additionally, refining may also include applying substitution rules that modify meaning representations by replacing one word surface or phrasal form with another that may be more common in a given conversational style, discourse, or channel. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations and idiosyncrasies in discourse styles and to nuances in word surface form and usage. The disclosed techniques can also improve the operation of the NLU framework and agent automation system by reducing or optimizing processing and memory resource usage when deriving meaning from natural language utterances.

Figure 23:
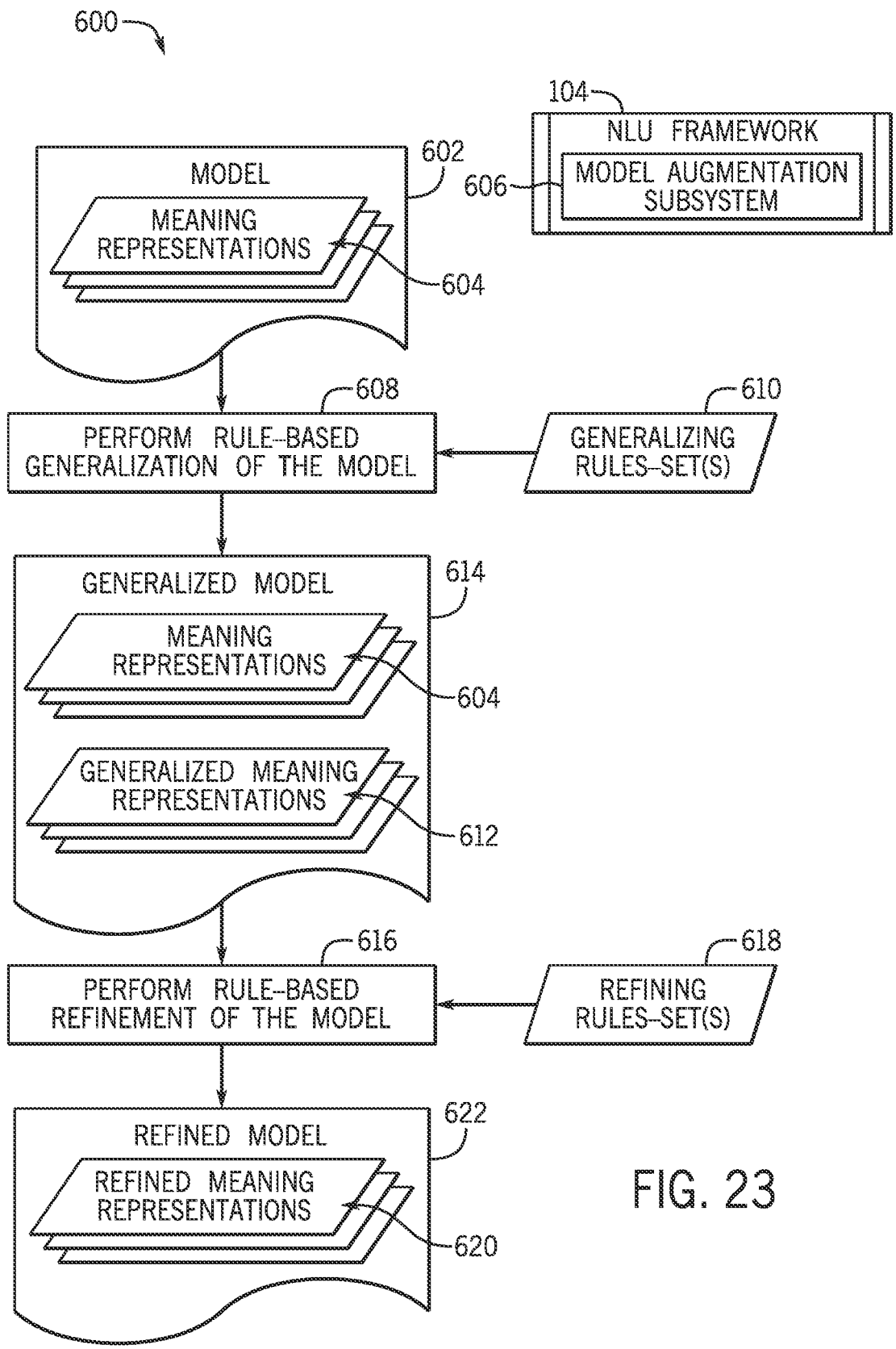
FIG. 23 is a flow diagram illustrating an example process by which a model augmentation subsystem of the NLU framework augments one or more models (e.g., the utterance meaning model, the understanding model, or a combination thereof) before performing a meaning search operation, in accordance with aspects of the present technique.

Once the meaning representations 158 and 162 have been generated, as illustrated in FIG. 6, the meaning search subsystem 152 can compare these meaning representations to extract intent/entities from the user utterance 122. However, in certain embodiments, the NLU framework 104 may first augment the utterance meaning model 160 and/or the understanding model 157 to improve the operation of the meaning search subsystem 152 to extract the intents/entities 140. For example, FIG. 23 is a flow diagram illustrating an embodiment of an augmentation process 600 whereby the NLU framework 104 augments a model 602 that includes one or more meaning representations 604. It should be noted that, in certain embodiments, the augmentation process 600 may be separately performed on the meaning representations 162 to augment the utterance meaning model 160, or the meaning representations 158 to augment the understanding model 157, or a combination thereof. For clarity, prior to augmentation, the model 602 may be referred to herein as an "original" model, and the one or more meaning representations 604 may be referred to herein as "original" meaning representations 604. The augmentation process 600 may be executed as part of a model augmentation subsystem 606, or another suitable subsystem, of the NLU framework 104. Additionally, the model augmentation subsystem 606 may cooperate with other subsystems (e.g., the vocabulary subsystem 170, the structure subsystem 172, and/or the prosody subsystem 174) of the NLU framework 104 to perform the augmentation process 600, as discussed below.

The embodiment of the augmentation process 600 illustrated in FIG. 23 begins with model augmentation subsystem 606 performing (block 608) a rule-based generalization of the model 602, which may be generated as discussed above. For example, based on one or more stored generalizing rule-sets 610, model augmentation subsystem 606 generates a plurality of generalized meaning representations 612 for at least a portion of the original meaning representations 604 of the model 602. As such, after the generalization step of block 608, the model 602 is expanded to include the generalized meaning representations 612, and the resulting model may be referred to herein as a generalized model 614 (e.g., a generalized utterance meaning model or a generalized understanding model). The generalized meaning representations 612 may be different structural permutations that are re-expressions of original meaning representations 604 and the underlying utterance. In general, the purpose of generalization is to expand the original model 602 to include additional forms related to the original meaning representations 604 already present in the model. It should be noted that, in certain embodiments, the augmentation process 600 only includes the generalization step of block 608. For such embodiments, the augmentation process 600 concludes at block 608 and the generalized model 614 serves as the augmented model (e.g., an augmented meaning model or an augmented understanding model) that is used for the subsequent meaning search operation.

For the embodiment illustrated in FIG. 23, the augmentation process 600 continues with the model augmentation subsystem 606 performing (block 616) a rule-based refinement of the generalized model 614 generated in block 608. For example, based on one or more stored refining rule-sets 618, the model augmentation subsystem 606 modifies or eliminates certain meaning representations (e.g., original meaning representations 604 and/or generalized meaning representations 612) of the generalized model 614. In general, the purpose of refinement is to adjust and focus the generalized model 614 to improve performance (e.g., improve domain specific performance, and/or reduce resource consumption) of the subsequent search operation by the meaning search subsystem 152. Upon completion of the rule-based refinement step of block 616, meaning representations 604 and/or 612 of the generalized model 614 are refined (e.g., modified and/or pruned) to generate refined meaning representations 620, and the resulting model may be referred to herein as a refined model 622 (e.g., a refined utterance meaning model or a refined understanding model). For the illustrated embodiment, after both the generalization step of block 608 and the refining step of block 616, the resulting refined model 622 may be referred to as the augmented model (e.g., the augmented utterance meaning model or the augmented understanding model) that is used for the subsequent meaning search operation. It may be appreciated that, in certain embodiments, the generalization step of block 608 may be skipped, and augmentation process 600 may include performing the rule-based refinement of block 616 on the original meaning representations 604 of the original model 602 to generate the augmented model. Once the augmentation process 600 is complete, the meaning search subsystem 152 can instead use the augmented model (e.g., a generalized model, a refined model, or a generalized and refined model) as the utterance meaning model 160 or the understanding model 157 when extracting intent/entities from the user utterance 122, as illustrated and discussed with respect to FIG. 6.

Figure 24:
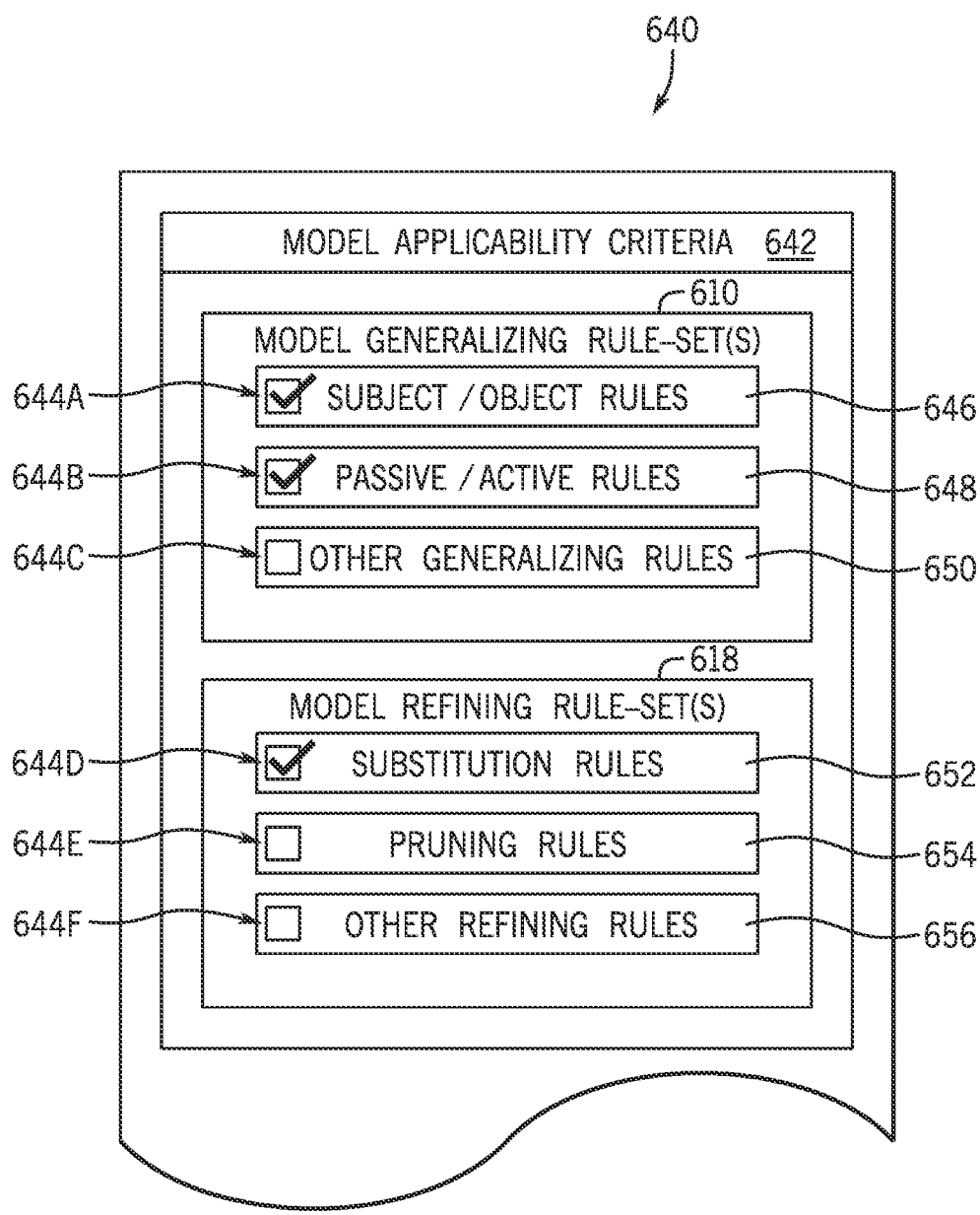
FIG. 24 is a diagram of an embodiment of a model augmentation template storing generalizing rule-sets, refining rule-sets, and model applicability criteria used by the model augmentation subsystem to augment the one or more models, in accordance with aspects of the present technique.

The aforementioned generalizing rule-sets 610 and refining rule-sets 618 generally define how the augmentation process 600 is performed to generate the augmented model. FIG. 24 illustrates an embodiment of a model augmentation template 640 that stores these generalizing rule-sets 610 and refining rule-sets 618, as well as model applicability criteria 642 that defines when and how these rule-sets are to be applied. In certain embodiments, the model augmentation template 640 may be stored as one or more tables of the database 106 illustrated in FIGS. 4A and 4B, or within another suitable data structure, in accordance with the present disclosure.

For the embodiment illustrated in FIG. 24, the model augmentation template 640 defines each rule of the generalizing rule-sets 610 and the refining rule-sets 618 based on particular model applicability criteria 642. That is, for the illustrated embodiment, particular rules of the generalizing rule-sets 610 and the refining rule-sets 618 can be selectively applied to or executed against certain meaning representations having particular characteristics, as defined by particular model applicability criteria 642. For example, the corresponding model applicability criteria 642 can indicate that particular generalizing rule-sets 610 and/or refining rule-sets 618 should only be applied to certain types of models (e.g., the utterance meaning model 160 or the understanding model 157), or to certain meaning representations (e.g., having a particular form or shape, having particular nodes, having particular classes of nodes, having particular word vectors, having particular subtree vectors, and so forth). As such, the model applicability criteria 642 can include language-specific conditions, discourse-style conditions, and so forth, which govern when and how these rule-sets should be applied during the augmentation process 600. For the illustrated example, as indicated by the checkboxes 644 (e.g., checkboxes 644A, 644B, 644C, 644D, 644E, and 644F), only a portion of the generalizing rule-sets 610 and the refining rule-sets 618 have been activated for the augmentation process 600.

For the illustrated embodiment, the generalizing rule-sets 610 include subject/object rules 646, a passive/active rules 648, as well as other suitable generalizing rules 650. For example, the subject/object rules 646 may include a rule that consumes a meaning representation of a model and, from it, generates an alternative form of the meaning representation in which a subject and an object of the meaning representation (and of the underlying utterance) are interchanged. By way of specific example, one of the subject/object rules 646 may generate a meaning representation corresponding to the utterance, "She sent him the item" from a meaning representation corresponding to the utterance, "She sent the item to him." Similarly, the passive/active rules 648 may include a rule that consumes a meaning representation of a model and, from it, generates an alternative form of the meaning representation that has been converted from an active form to a passive form, or from a passive form to an active form. By way of specific example, the passive/active rule 648 may generate a meaning representation corresponding to the utterance, "I sent him the item" from a meaning representation corresponding to the utterance, "The item was sent to him." The other generalizing rules 650 may include any other grammatical rearrangement or transformation that generates a meaning representation having a similar (e.g., the same or closely related) meaning relative to an original meaning representation already present in the model.

For the illustrated embodiment, the refining rule-sets 618 include substitution rules 652, pruning rules 654, and any other suitable refining rules 656. For example, the one of the substitution rules 652 may define how constituent portions (e.g., nodes, subtrees, word vectors, subtree vectors) of a meaning representation of a model should be replaced with other substitute portions prior to performing the search operation. For example, one of the substitution rules 652 may identify two phrases having similar surface forms and different meanings, and substitute a portion (e.g., a subtree) of the original meaning representation representing the first phrase with a different portion (e.g., a replacement subtree) representing the second phrase. For example, the substituted structure may include fewer nodes or more nodes relative to the original meaning representation. As such, using substitution rules 652, certain word surface forms (e.g., words, acronyms, expressions, emojis, and so on) can be replaced with other word surface forms or phrasal forms that are more common in a given conversation style, discourse, and/or domain. As such, it should be appreciated that the substitution rules 652, as well as other refining rules 656 expressed in the model augmentation template 640, can be used to capture local conversation style or subject vertical idiosyncrasies, as well as address nuances in word surface form, for example, in cases involving polysemy or other word-usage nuances.

By way of particular example, individually, the meanings of the words "look" and "up" are substantially different from the resulting meaning when used in combination ("look up"). As such, in an embodiment, a substitution rule 652 may locate every representation of the word "look" that is associated with the word "up" within the meaning representations of a model, and then substitute the corresponding structure with suitable structure (e.g., nodes, subtrees, word vectors, subtree vectors) that instead represent the term "look-up" or "search". For this example it may also be appreciated that, when performing comparisons during the later meaning search operation, "search" may be represented by a single tree node, while "look-up" may be represented by multiple tree nodes. As such, in certain cases, the substitution rule 652 can reduce the number of comparison operations and yield better match scores during the subsequent meaning search operation. However, it may be noted that, in certain embodiments, rather than locate and substitute specific words or phrases represented with the meaning representation, the substitution rule 652, as well as other rules defined in the model augmentation template 640, may instead rely on the shape of the meaning representation (e.g., the grammatical structure of the represented sentence or phrase) when applying generalizing and/or refining linguistic-rule-based manipulation, as set forth herein.

For the refining rule-set 618 illustrated in FIG. 24, the pruning rules 654 generally improve efficiency and reduce redundancy by removing sufficiently similar meaning representations from a model. As such, the pruning rules 654 may include a rule that defines a threshold level of similarity (e.g., in terms of similarity in structure, word vectors, and/or subtree vectors) that is acceptable between two meaning representations of a model, as well as which of the two meaning representations should be culled from the model. By way of particular example, one of the pruning rules 654 may identify two meaning representations (e.g., an original meaning representation and a generalized meaning representation, or two generalized meaning representations) that differ in limited ways (e.g., only in leaf nodes or in modifier nodes). In response, the rule may remove one of the two meaning representations from the model, reducing redundancy in the model and improving performance during the subsequent search operation. That is, by reducing the number of meaning representation of the utterance meaning model 160 and/or the understanding model 157, the memory footprint and the number of comparison operations of the subsequent meaning search operation can be substantially reduced, improving the performance of the NLU framework 104 and the agent automation system 100.

Figure 25:
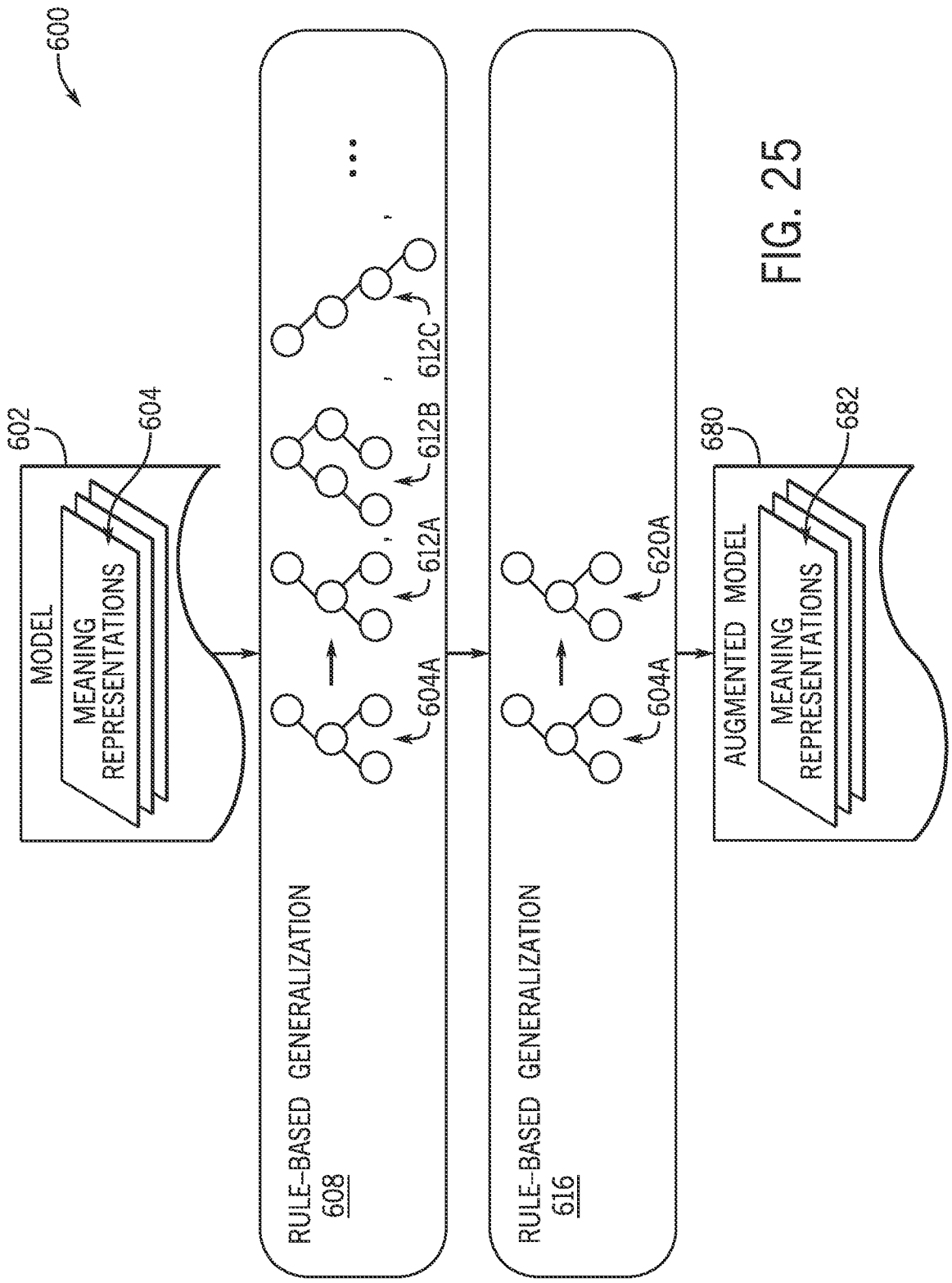
FIG. 25 is a diagram illustrating an embodiment of model augmentation in which meaning representations of the one or more models are generalized and/or refined to yield an augmented model, in accordance with aspects of the present technique.

FIG. 25 provides another depiction of the augmentation process 600 whereby one or more original meaning representations 604 of the original model 602 (e.g., meaning representations 162 of the utterance meaning model 160 or meaning representations 158 of the understanding model 157) are generalized and/or refined to yield an augmented model 680 having augmented meaning representations 682 (e.g., generalized and/or refined meaning representations). As set forth above, during rule-based generalization (block 608), the model augmentation subsystem 606 of the NLU framework 104 cooperates with the structure subsystem 172 of the NLU framework 104 to generate alternative forms of at least a portion of the meaning representations 604 based on one or more active generalization rule-sets 610. For the illustrated embodiment, the rule-based generalization of block 608 includes selectively applying subject/object rules 646, passive/active rules 648, and/or other suitable generalization rules 650 based on the model applicability criteria 642 that corresponds to these generalization rules. As such, the rule-based generalization of block 608 illustrates a single meaning representation 604A, which meets certain model applicability criteria 642 defined for one or more of the generalizing rule-sets 610, and which is used to generate at least generalized meaning representations 612A, 612B, and 612C based on the corresponding generalizing rule-sets 610.

For the embodiment illustrated in FIG. 25, during rule-based refining (block 616), the model augmentation subsystem 606 of the NLU framework 104 modifies the original meaning representation 604A of the model 602 based on one or more active refining rule-sets 618. In particular, for the illustrated embodiment, the model augmentation subsystem 606 cooperates with the vocabulary subsystem 170 of the NLU framework 104 to replace word vectors and subtree vectors associated with portions of the original meaning representation 604A with alternative word vectors and subtree vectors based on one or more active refining rule-sets 618. For the illustrated embodiment, the rule-based refining of block 616 includes applying substitution rules 652 and/or other suitable refining rules 656 based on the model applicability criteria 642 that corresponds to these refining rules. As such, the rule-based refinement of block 616 illustrates the original meaning representation 604A, which meets certain model applicability criteria 642 defined for one or more of the refining rule-sets 618, being used to generate the refined meaning representation 620A based on the corresponding refining rule-sets 618. In other embodiments, in block 616, the model augmentation subsystem 606 also removes or prunes one or more of the meaning representations of the model 602 (e.g., original meaning representations 604A, generalized meaning representations 612A, 612B, 612C) based on one or more active refining rule-sets 618. As mentioned, in certain embodiments, the steps of block 608 or 616 may be skipped, resulting in the augmented model 680 being only generalized or refined relative to the original model 602.

For embodiment illustrated in FIG. 25, relative to the original model 602, the augmented model 680 generally includes an expanded number of meaning representations 682, a reduction in redundancy within meaning representations 682, and/or an improvement in domain specificity. As such, when the original model 602 is the understanding model 157, then the augmented model 680 enables an expanded and/or refined search space for the subsequent meaning search operation. When the original model 602 is the utterance meaning model 160, then the augmented model 680 may be described as an expanded and/or refined search key for the subsequent meaning search operation. As such, by augmenting the utterance meaning model 160 and/or understanding model 157, the meaning search subsystem 152 is more likely to correctly extract the intents/entities 140 from received user utterances 122, as discussed above with respect to FIG. 6.

Figure 26:
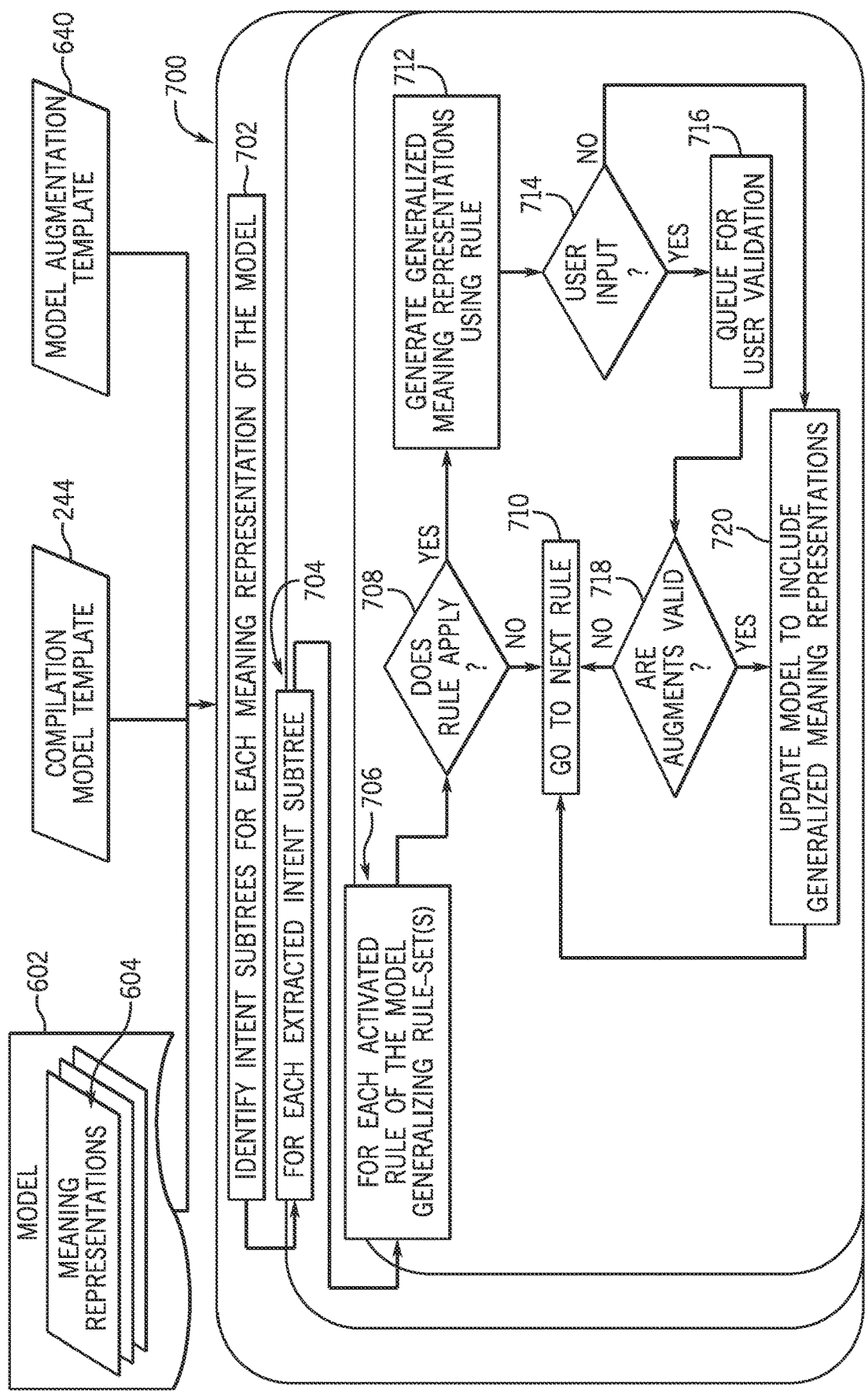
FIG. 26 is a flow diagram illustrating an embodiment of a process whereby the model augmentation subsystem performs rule-based generalization of the meaning representations of the one or more models, in accordance with aspects of the present technique.

FIG. 26 is a flow diagram illustrating an embodiment of a generalization process 700 whereby the model augmentation subsystem 606 of the NLU framework 104 performs rule-based generalization of the original meaning representations 604 of the original model 602. As mentioned, the original model 602 may be the utterance meaning model 160, including meaning representations 162, or the understanding model 157, including meaning representations 158, as illustrated in FIG. 6. The example generalization process 700 of FIG. 26 may be executed by the model augmentation subsystem 606 or another suitable subsystem of the NLU framework 104, and may involve the cooperation of other components (e.g., the structure subsystem 172 and the prosody subsystem 174) of the NLU framework 104. For the illustrated embodiment, the generalization process 700 receives the model 602 as an input, as well as the compilation model template 244 and the model augmentation template 640 discussed above.

The embodiment of the generalization process 700 illustrated in FIG. 26 begins with the model augmentation subsystem 606 identifying (block 702) intent subtrees for each of the meaning representations 604 of the model 602, wherein each intent subtree represents a distinct (e.g., atomic) intent of a particular meaning representation (as well as the underlying utterance). For example, in certain embodiments, the model augmentation subsystem 606 may invoke the prosody subsystem 174 to use one or more stored rules to segment the meaning representations 604 into distinct intent subtrees. Once all of the intent subtrees have been identified, the generalization process 700 includes an outer "for loop" (indicated by block 704) in which each of the intent subtrees are individually, serially processed. Within the outer "for loop" of block 704, there is an inner "for loop" (indicated by block 706) in which each of the activated rules of the generalizing rule-set(s) 610 of the model augmentation template 640 are conditionally or selectively applied, based on the corresponding model applicability criteria 642. In other words, the "for loops" associated with blocks 704 and 706 conditionally applies each activated rule of the generalizing rule-sets 610 to each intent subtree of the original meaning representations 604 of the model 602 as part of the generalization process.

Within the inner "for loop" indicated by block 706, the generalization process 700 includes the model augmentation subsystem 606 determining (decision block 708) whether the current activated generalizing rule (e.g., one of the subject/object rules 646 or passive/active rules 648) is applicable to the current intent subtree based on the model applicability criteria 642 of the model augmentation template 640, as discussed above with respect to FIG. 24. When the model augmentation subsystem 606 determines, based on the model applicability criteria 642, that the current rule does not apply, then it may proceed to the next rule in the "for loop" of block 706, as indicated by the block 710. When the model augmentation subsystem 606 determines, based on the model applicability criteria 642, that the current rule is applicable to the current intent subtree, the model augmentation subsystem 606 generates (block 712) one or more generalized meaning representations 612 from the current intent subtree based on the current generalization rule.

For the embodiment illustrated in FIG. 26, the generalization process 700 continues with the model augmentation subsystem 606 determining (decision block 714) whether a user should review and provide input to validate the generalized meaning representations 612 generated in block 712. For example, the model augmentation subsystem 606 may check the current generalization rule within the model augmentation template 640 to determine whether user validation and input should be sought. When the model augmentation subsystem 606 determines that user input should be requested, it queues (block 716) the generalized meaning representations 612 generated in block 712 for later user validation. When the model augmentation subsystem 606 eventually receives a valid response from the user (decision block 718), or when the model augmentation subsystem 606 determines in decision block 714 that user input is not involved with the current rule, then the model augmentation subsystem 606 responds by updating (block 720) the model 602 to include the generalized meaning representations 612 generated in block 712. In response to the model augmentation subsystem 606 receiving an invalid response from the user responding in decision block 718, or in response to the model augmentation subsystem 606 updating the model in block 720, the model augmentation subsystem 606 proceeds (block 710) to the next rule in the "for loop" of block 706.

Once the NLU framework 104 has processed each of the active rules of the generalization rule-set 610, the model augmentation subsystem 606 then proceeds to the next intent subtree of the "for loop" of block 704, and then repeats the "for loop" of block 706, which again conditionally applies each of the active model generalization rules-sets 610 against the next intent subtree based on the corresponding model applicability criteria 642. Accordingly, the illustrate generalization process 700 continues until all intent subtrees identified in block 702 have been processed in this manner to expand the model 602 into the generalized model 614 (e.g., a generalized utterance meaning model or a generalized understanding model). As mentioned, in certain embodiments, the generalized model 614 undergoes a subsequent refining step as a part of the augmentation process 600. However, in certain embodiments, the generalized model 614 produced by the generalization process 700 may not undergo a refining step, and the generalized model 614 serves as an augmented model 680 (e.g., an augmented utterance meaning model or an augmented understanding model) for the subsequent meaning search operation. In certain embodiments, the generalization process 700 is executed separately for both the utterance meaning model 160 and the understanding model 157 to expand both models prior to the meaning search operation.

Figure 27:
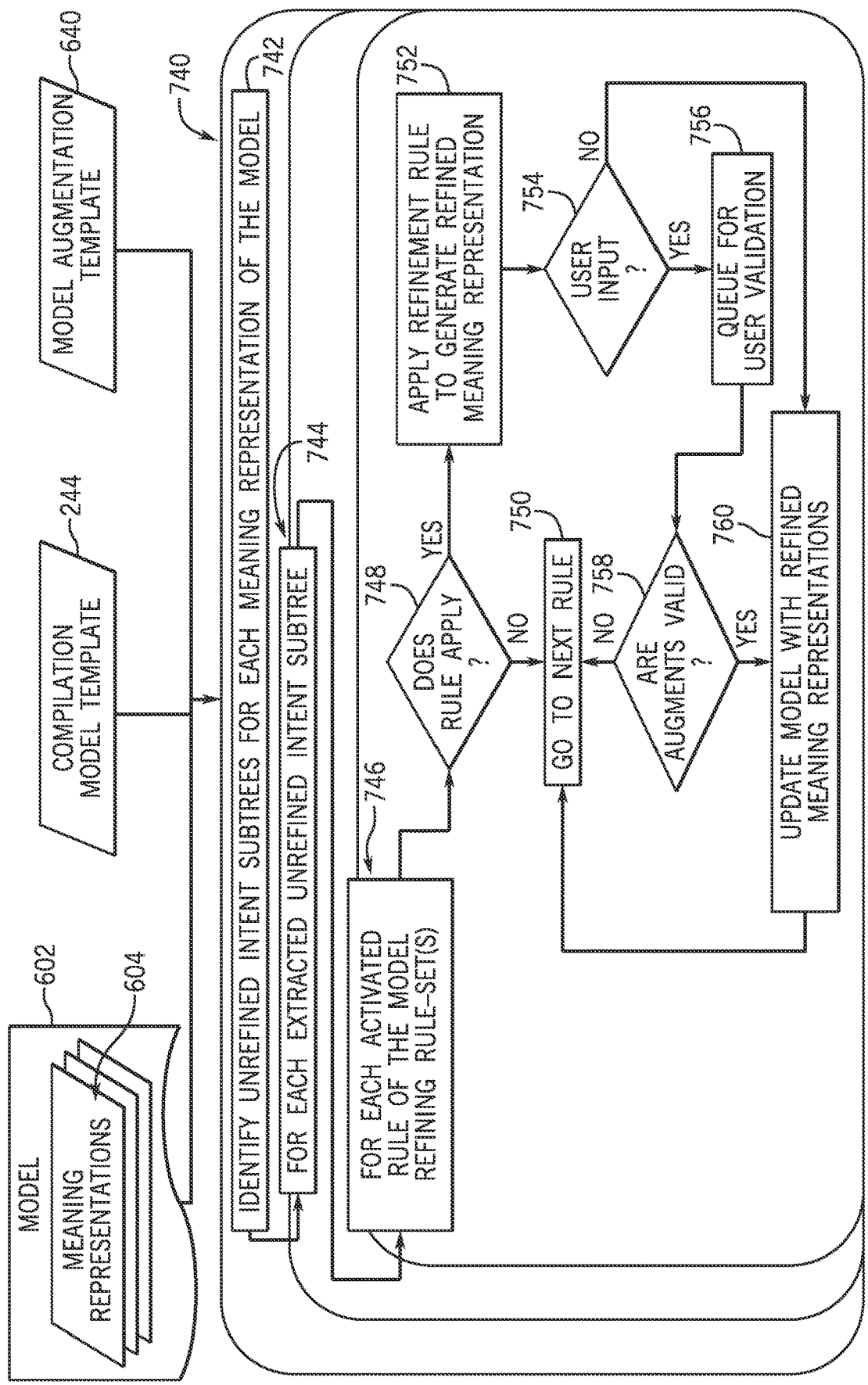
FIG. 27 is a flow diagram illustrating an embodiment of a process whereby the model augmentation subsystem performs rule-based refinement of the meaning representations of the one or more models, in accordance with aspects of the present technique.

FIG. 27 is a flow diagram illustrating an embodiment of a refinement process 740 whereby the model augmentation subsystem 606 performs rule-based refinement of the one or more meaning representations 604 of the model 602. As mentioned, in certain embodiments, the meaning representations 604 and the model 602 may be original meaning representations of an original (e.g., non-generalized, non-expanded) model 602 (e.g., the utterance meaning model 160 or the understanding model 157). In other embodiments, the model 602 may be the generalized model 614 (e.g., a generalized utterance meaning model or generalized understanding model) that is the product of the generalization process 700 of FIG. 26. The example refinement process 740 may be executed by the model augmentation subsystem 606 or anther suitable subsystem of the NLU framework 104, and may involve the cooperation of other components (e.g., the vocabulary subsystem 170, the structure subsystem 172, and the prosody subsystem 174) of the NLU framework 104. For the illustrated embodiment, the refinement process 740 receives the model 602 as an input, as well as the compilation model template 244 and the model augmentation template 640 discussed above.

The embodiment of the refinement process 740 illustrated in FIG. 27 begins with the model augmentation subsystem 606 identifying (block 742) unrefined intent subtrees for each of the meaning representations 604 of the model 602, wherein each unrefined intent subtree represents distinct (e.g., atomic) intents of meaning representations that have not been processed by the refining rule-sets 618. For example, in certain embodiments, the prosody subsystem 174 may use one or more stored rules to segment the meaning representations 604 into these intent subtrees. Once all of the unrefined intent subtrees have been identified, the refinement process 740 includes an outer "for loop" (indicated by block 744) in which each of the unrefined intent subtrees are individually processed. Within the outer "for loop" of block 744, there is an inner "for loop" (indicated by block 746) in which each of the activated rules of the refining rule-sets 618 of the model augmentation template 640 is selectively applied based on the model applicability criteria 642. In other words, the "for loops" associated with blocks 744 and 746 ensure that each activated rule of the refining rule-sets 618 can be conditionally or selectively applied to each intent subtree of the meaning representations 604 of the model 602 as part of the refinement process.

Within the inner "for loop" indicated by block 746, the refinement process 740 includes the model augmentation subsystem 606 determining (decision block 748) whether the current activated refining rule is applicable to the current intent subtree based on the model applicability criteria 642 of the model augmentation template 640, as discussed above with respect to FIG. 24. When the current rule does not apply, then the model augmentation subsystem 606 may proceed to the next refining rule in the "for loop" of block 746, as indicated by block 750. When the model augmentation subsystem 606 determines that the current refining rule is applicable to the current intent subtree, the model augmentation subsystem 606 applies (block 752) the current refinement rule to generate a refined meaning representation 620.

For the embodiment illustrated in FIG. 27, the refinement process 740 continues with the model augmentation subsystem 606 determining (decision block 754) whether a user should review and provide input to validate the refined meaning representation 620 generated in block 752. For example, the model augmentation subsystem 606 may check the current refinement rule within the model augmentation template 640 to determine whether user validation and input should be sought. When the model augmentation subsystem 606 determines that user input should be requested, it queues (block 756) the refined meaning representation generated in block 752 for later user validation. When the model augmentation subsystem 606 eventually receives a valid response from the user (decision block 758), or when the model augmentation subsystem 606 determines in decision block 754 that user input is not involved for the current refinement rule, then the model augmentation subsystem 606 responds by updating (block 760) the model 602 using the refined meaning representation 620 generated in block 752. In response to the model augmentation subsystem 606 receiving an invalid response from the user in decision block 718, or in response to the model augmentation subsystem 606 updating the model 602 in block 720, the model augmentation subsystem 606 proceeds (block 710) to the next rule the next rule in the inner "for loop" of block 706. As noted, the refined meaning representation 620 may include one or more substituted structural portions (e.g., different nodes, subtrees, or relative organization of nodes) and/or one or more substituted semantic portions (e.g., a vector, such as a word vector or subtree vector) relative to the meaning representations of the model 602 prior to the refinement process 740.

For the illustrated embodiment, once the model augmentation subsystem 606 has processed each of the active rules of the refining rule-set 618, it then proceeds to the next intent subtree of the outer "for loop" of block 744, and then repeats the "for loop" of block 746, which conditionally applies each of the active model refinement rules-sets 618 against the next intent subtree based on the corresponding model applicability criteria 642. The refinement process 740 continues until all intent subtrees identified in block 742 have been processed in this manner. As mentioned, in certain embodiments, after the refinement process 740, the resulting refined model 622 may serve as an augmented model 680 (e.g., an augmented utterance meaning model or an augmented understanding model) for the subsequent meaning search operation.

Technical effects of the present section of this disclosure include providing an agent automation framework that is capable of extracting meaning from user utterances, such as requests received by a virtual agent (e.g., a chat agent), and suitably responding to these user utterances. The disclosed NLU framework includes a model augmentation subsystem capable of performing rule-based augmentation of an utterance meaning model and/or an understanding model, whereby the model is augmented by expanding and/or refining of the model based on a model augmentation template. For example, the disclosed NLU framework is capable of expanding a number of meaning representations in the model based on stored generalizing rules, wherein the additional meaning representations are re-expressions of the original meaning representations of the model. The disclosed NLU framework is also capable of refining the meaning representations of these models, for example, to remove substantially similar meaning representations based on stored refining rules, and to modify meaning representations to replace word surface or phrasal forms. As such, the disclosed technique enables the generation of an augmented understanding model and/or augmented utterance meaning model having generalized and/or refined meaning representations. By expanding and/or refining the understanding model and/or the utterance model, the disclosed augmentation techniques enable the NLU framework and the agent automation system to be more robust to variations in discourse styles and to nuances in word surface form and usage, and can also improve the operation of the NLU framework and agent automation system by reducing resource usage when deriving meaning from natural language utterances.

Written-Modality Prosody Subsystem

Existing virtual agents applying NLU techniques may fail to properly derive meaning from complex natural language utterances. For example, present approaches may fail to comprehend complex language and/or relevant context in a request. Further, existing approaches may not be suitable for or capable of customization and may not be adaptable to various communication channels and styles.

With this in mind, present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

More specifically, present embodiments are directed to a prosody subsystem of the NLU framework that is designed to analyze collections of written messages for various prosodic cues to break down the collection into a suitable level of granularity (e.g., into sessions, segments, utterances, and/or intent segments) for consumption by other components of the NLU framework, thereby enabling operation of the NLU framework. It should be noted that, while prosody and prosodic cues are generally associated with spoken language, it is presently recognized that certain prosodic cues can be identified in different written language communication channels (e.g., chat rooms, forums, email exchanges), and these prosodic cues provide insight into how the written conversation should be digested into useful inputs for the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, intent segments extracted by the prosody subsystem may be consumed by a training process for a machine learning (ML)-based structure subsystem of the NLU framework. Contextually-relevant groups of utterances extracted by the prosody subsystem may be consumed by another training process that generates new word vector distribution models for a vocabulary subsystem of the NLU framework. Intent segments extracted by the prosody subsystem may be consumed by a semantic mining framework of the NLU framework to generate an intent/entity model that is used for intent extraction. Episodes extracted by the prosody subsystem may be consumed by a reasoning agent/behavior engine (RABE) to generate episodic context information. Additionally, to enable episodic context management within the NLU framework, the prosody subsystem may also analyze a user message for prosodic cues and provide an indication as to whether the user message corresponds to a prior episodes or corresponds to a new episode.

As used herein, the terms "dialog" and "conversation" refer to an exchange of utterances between a user and a virtual agent over a period of time (e.g., a day, a week, a month, a year, etc.). As used herein, an "episode" refers to distinct portions of dialog that may be delineated from one another based on a change in topic, a substantial delay between communications, or other factors. As used herein, "context" refers to information associated with an episode of a conversation that can be used by the RA/BE to determine suitable actions in response to extracted intents/entities of a user utterance. For embodiments discussed below, context information is stored as a hierarchical set of parameters (e.g., name/value pairs) that are associated with a frame of an episode of a dialog, wherein "hierarchical" means that a value of a parameter may itself be another set of parameters (e.g., a set of name/value pairs). As used herein, "domain specificity" refers to how attuned a system is to correctly extracting intents and entities expressed actual conversations in a given domain and/or conversational channel.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

When attempting to derive user intent in a written modality or medium (e.g., in chat logs, dynamic conversations, user forums, or other databases where user communication is stored) it is presently recognized that collections of documents and utterances should be suitably segmented into pieces that are consumable by particular downstream NLP tasks. In order to do so, it is presently recognized that a NLU framework should include a prosody component that takes cues from these stored documents to decompose these documents into differing levels of granularity, in which the level of granularity is dictated by the task at hand. For instance, in certain embodiments, the prosody subsystem is capable of decomposing individual utterances into segments that express granular intents (e.g., intent segments). These intent segments may then be individually matched with an NLU framework's meaning representation model and sequentially consumed by a RA/BE to act upon. In certain embodiments, the prosody subsystem is capable of decomposing long-lived conversations into episodes in order to allow the RA/BE to determine the appropriate context information that should be applied when acting in response to a user utterance. For instance, a conversation that occurred yesterday will most likely have a completely different context than a conversation happening today, whereas a conversation that occurred five minutes ago will most likely have a bearing on a conversation happening now. It is presently recognized that the delineation of context applicability has a substantial impact on reference resolution during processing of user requests by the RABE. Furthermore, in certain embodiments, the prosody subsystem is capable of decomposing conversations into segments that are useful in training ML-based components of the NLU framework. For instance, the prosody subsystem may provide pieces of conversations (e.g., intent segments, utterances in context) that are useful for performing statistical analyses of word context for generation of semantic vectors, as well as for other learning/training endeavors within the NLU framework.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to a prosody subsystem of the NLU framework that is designed to analyze collections of written messages for various prosodic cues to break down the collection into a suitable level of granularity (e.g., into episodes, sessions, segments, utterances, and/or intent segments) for consumption by other components of the NLU framework, enabling operation of the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, as discussed below, in certain embodiments, intent segments extracted by the prosody subsystem may be consumed by a training process for a ML-based structure subsystem of the NLU framework. In certain embodiments, contextually-relevant groups of utterances extracted by the prosody subsystem may be consumed by another training process that generates new word vector distribution models for a vocabulary subsystem of the NLU framework. In certain embodiments, intent segments extracted by the prosody subsystem may be consumed by a semantic mining framework of the NLU framework to generate an intent/entity model that is used for intent extraction. In certain embodiments, episodes extracted by the prosody subsystem may be consumed by a reasoning agent/behavior engine (RABE) to generate episodic context information. In certain embodiments, to enable episodic context management, the prosody subsystem is also designed analyze a user message and, based on the extracted episodes, provide an indication as to whether the user message corresponds to a previous episodes or corresponds to a new episode.

Figure 28:
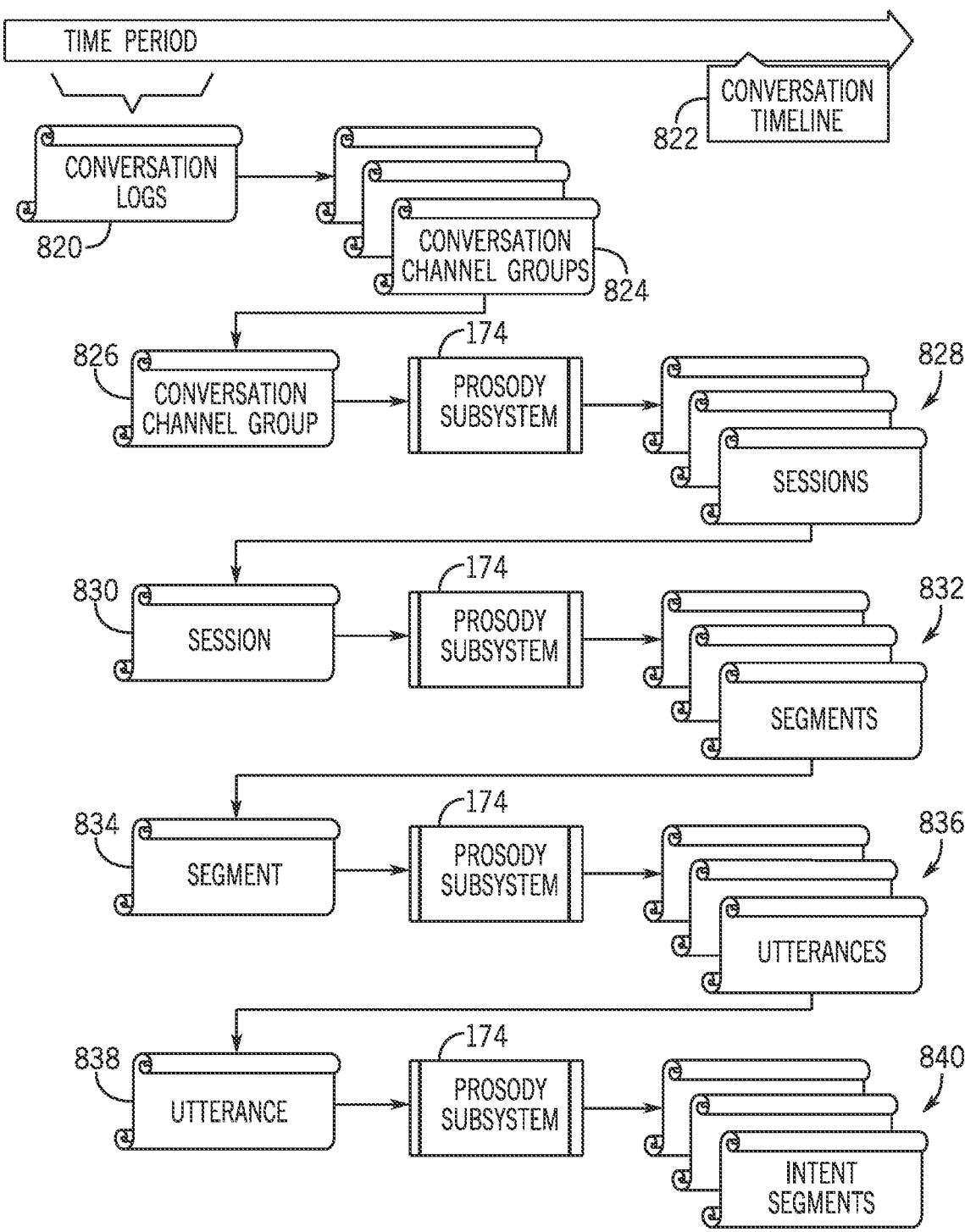
FIG. 28 is a flow diagram illustrating an embodiment of the prosody subsystem digesting conversation logs into a number of different outputs for consumption by various components of the NLU framework, in accordance with aspects of the present technique.

With the foregoing in mind, FIG. 28 is a diagram illustrating an embodiment of the prosody subsystem 174 digesting conversation logs 820 (e.g., chat logs, email logs, forum logs, or a combination thereof) into a number of different outputs for consumption by various components of the NLU framework 104, in accordance with aspects of the present technique. In certain embodiments, the conversation logs 820 may be stored in the database 106 as part of the corpus of utterances 112, as illustrated in FIG. 4A. The diagram of FIG. 28 includes a conversation timeline 822, which represents a collection of written messages of the conversation logs 820 over time. As such, it may be appreciated that the conversation logs 820 may include any number of communications between any number of users or agents that take place over any number of written conversation channels, such as email, chat, forums, and so forth. As mentioned, in addition to the messages themselves, the conversation logs 820 include metadata and/or annotations for each message that capture additional conversation information, such as a time that each message was sent and/or received, a size of each message, a source and recipient of each message, a conversational channel of each message, and so forth.

As illustrated in FIG. 28, particular conversation logs 820 may be selected from a particular time period in the conversation timeline 822. For example, in certain embodiments, the prosody subsystem 174 may select all conversations across all conversational channels that involve a particular user and that occur within a particular time period. Once the conversation logs 820 have been selected, the prosody subsystem 174 may first divide the conversation logs 820 into different conversation channel groups 824 based on the conversation channel associated with each message in the conversation logs 820. For example, the prosody subsystem 174 may split the selected conversation logs 820 into a first conversational channel group that includes conversations that occur via an email conversation channel, a second conversational channel group that includes conversations that occur via chat, and a third conversational channel group that includes conversations that occur via forum posts, based on the metadata prosodic cues associated with each message in the conversation logs 820.

For the embodiment illustrated in FIG. 28, each conversational channel group 826 of the conversation channel groups 824 can be subsequently processed again by the prosody subsystem 174 to divide each conversational channel group 826 into a number of different sessions 828 (e.g., chat sessions, email sessions, forum sessions). For example, in certain embodiments, the prosody subsystem 174 may analyze the metadata associated with messages in the conversation channel group 826 and identify time gaps between each of the messages based on temporal prosodic cues. The prosody subsystem 174 may then determine that, when a time difference between two messages of the conversation channel group 826 is greater than a predefined threshold value (e.g., 5 hours), then this time gap signifies the end of one of the sessions 828 and a beginning of another one of the sessions 828. Accordingly, for the illustrated embodiment, the prosody subsystem 174 splits the messages of the conversation channel group 826 into a suitable number of sessions 828 based on the metadata or temporal prosody cue associated with each message. As discussed below, the sessions 828 generated by the prosody subsystem 174 can be consumed by the RA/BE 102 to enable episodic context management within the agent automation framework 100.

For the embodiment illustrated in FIG. 28, each of the sessions 828 can be subsequently processed again by the prosody subsystem 174 to divide each session 830 into a number of different segments 832 (e.g., chat segments). For clarity, segments 832 may also be referred to herein as "conversation segment" to differentiate from "intent segments" discussed below. For example, in certain embodiments, the prosody subsystem 174 may analyze the contents of each message in the session 830 for written prosodic cues to identify topic changes. By way of particular example, the prosody subsystem 174 may cooperate with the structure subsystem 172 to identify all nouns/subjects within each intent segment of the message, and identify a change in the nouns/subjects as an indication of topic change. In certain embodiments, the prosody subsystem 174 may additionally or alternatively include a collection of transition words and phrases or interrupts (e.g., "anyway", "moving on", "by the way", "next", etc.) that are indicative of a shift in the topic within the session 830. The prosody subsystem 174 may then determine that, when a topic change is identified based on written prosodic cues, this signifies the end of one of the segments 832 and a beginning of another of the segments 832. Accordingly, for the illustrated embodiment, the prosody subsystem 174 splits the messages of the session 830 into a suitable number of segments 832 based on topic changes.

For the embodiment illustrated in FIG. 28, each of the segments 832 can be subsequently processed again by the prosody subsystem 174 to divide each segment 834 into a number of utterances 836. For example, in certain cases, the prosody subsystem 174 may first divide the segment 834 into individual messages, wherein each message represents a distinct utterance 836. However, in certain embodiments, the prosody subsystem 174 may further analyze the contents and/or the metadata associated with each message of the segment 834, and combine multiple messages that are determined to be part of a single utterance based on temporal and/or written prosodic cues. For example, the prosody subsystem 174 may determine that, when a user sends multiple messages before the other party to the conversation responds (e.g., a message burst group) and/or when the user sends multiple messages within a predefined time window (e.g., within 1 minute), then these multiple messages actually represent a single utterance. Accordingly, for the illustrated embodiment, the prosody subsystem 174 splits the messages of the segment 834 into a suitable number of utterances 836.

For the embodiment illustrated in FIG. 28, each of the utterances 836 can be subsequently processed again by the prosody subsystem 174 to divide each utterance 838 into a number of different intent segments 840. For example, in certain embodiments, the prosody subsystem 174 may analyze the punctuation of the utterance as a written prosody cue to identify intent segments 840 for the utterance 838. By way of particular example, the prosody subsystem 174 may identify two sentences within the utterance 838 that are separated by a period and/or two phrases or sentence fragments separated by a comma or semicolon, as two separate intent segments 840 of the utterance 838.

However, in certain embodiments, differentiation between intent segments 840 within each utterance 838 may be achieved using cognitive construction grammar (CCG) forms. In other words, specific CCG forms can be used as formulations for specific, and potentially nested, intents. For such embodiments, the prosody subsystem 174 may provide the utterance 838 to the structure subsystem 172, and the structure subsystem 172 may parse the utterance 838 into an utterance tree. The CCG forms are then detected by traversing these utterance trees and matching predetermined CCG form tree patterns with the patterns found in the utterance trees. In certain embodiments, the predetermined CCG forms are utterance trees stored in a discourse-specific CCG forms database, which may be part of the database 106 of the client instance 42. The CCG forms themselves can be derived or predetermined in a number of ways, such as via linguistic formulation, via general forms databases available for specific languages, via unsupervised learning, or combinations thereof. For example, the predetermined CCG forms may include forms of phrases that people typically use to, for instance, change a topic (e.g., "Now, with regards to . . . ", "Speaking of which . . . ", "Going back to . . . ", and so forth). As such, by matching the predetermined CCG form tree patterns to portions of the utterance 838, the prosody subsystem 174 can detect topic context changes within a portion of a written conversation. As noted, for the NLU framework 104 to be trained and operate in a precise and domain specific manner, it is important that the prosody subsystem 174 generates the various digested outputs (e.g., utterances 836 and intent segments 840) in proper context.

Accordingly, for the illustrated embodiment, the prosody subsystem 174 splits the utterance 838 into a suitable number of intent segments 840. As discussed below, the intent segments 840 generated by the prosody subsystem 174 can be further processed and consumed to train one or more of the ML-based parsers 188 of the structure subsystem 172 of the agent automation framework 100. It may further be appreciated that, after completely processing the conversation logs 820, each of the intent segments 840 may be associated with a particular utterance 838, a particular segment 834, a particular session 830, and a particular conversation channel group 826.

Additionally, it may be appreciated that present embodiments enable entrenchment, which is a process whereby the agent automation system 100 can generally continue to learn or infer meaning of new syntactic structures in new natural language utterances based on previous examples of similar syntactic structures to improve the domain specificity of the NLU framework 104 and the agent automation system 100. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned to be more accurate or appropriate for the given domain. With this in mind, it is presently recognized it is advantageous for the agent automation system 100 to have a continuously learning grammar structure model capable of accommodating changes in syntactic structure, such as new grammatical structures and changes in the use of existing grammatical structures. Additionally, as noted above, the prosody subsystem 174 can be used to generate training data (e.g., intent segments 840) that can be used to train a ML-based component of the structure subsystem 172.

Figure 29:
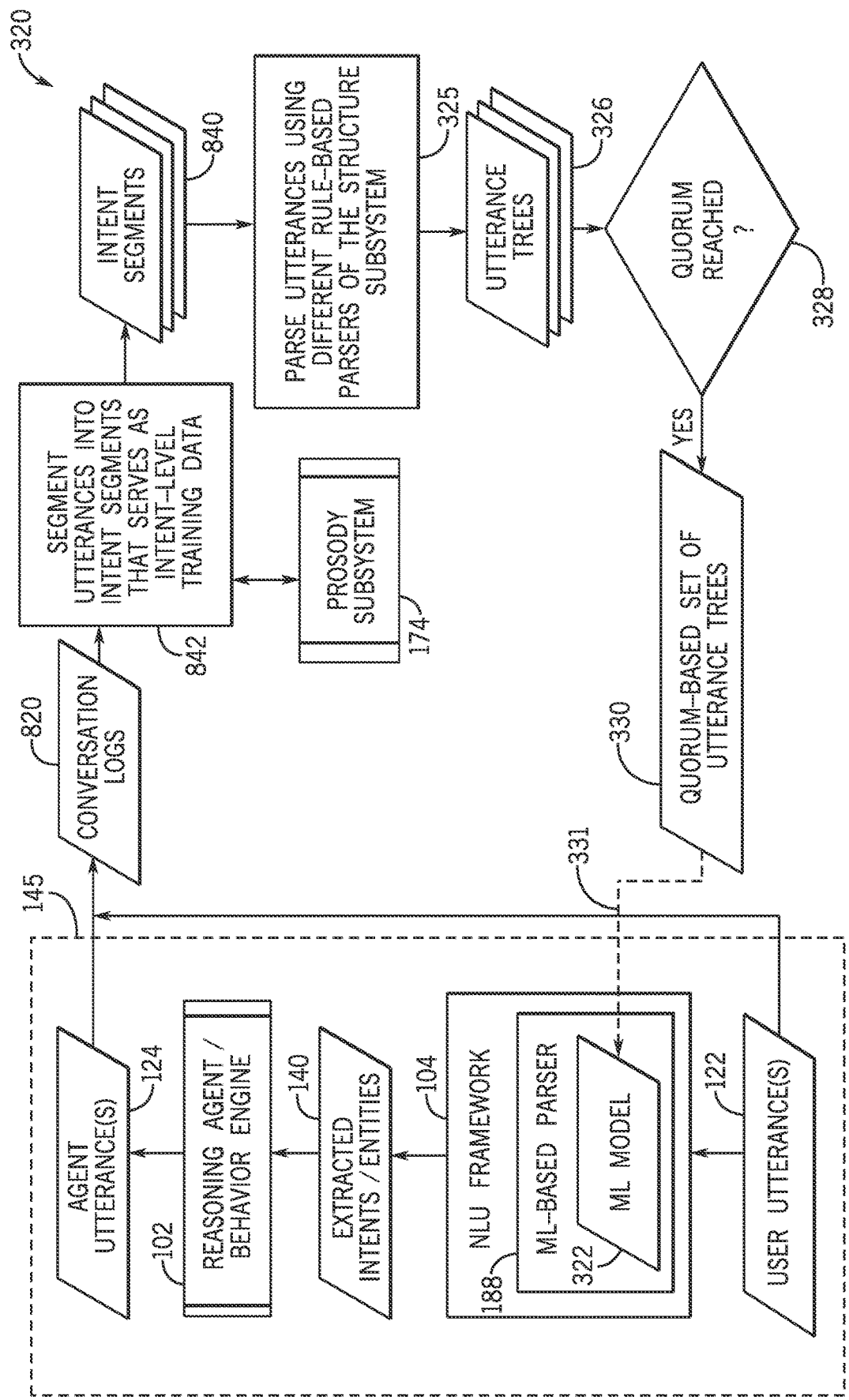
FIG. 29 is a block diagram illustrating an embodiment of a process by which the agent automation system continuously improves a structure learning model, such as a recurrent neural network associated with a ML-based parser of the NLU framework, for improved domain specificity, based on intent segments identified by the prosody subsystem, in accordance with aspects of the present technique.

With the foregoing in mind, FIG. 29 is a flow diagram illustrating an embodiment of a process 320 whereby the agent automation system 100 continuously improves a ML-based parser 188, which may be plugged into the structure subsystem 172 of the NLU framework 104, as discussed with respect to FIG. 7. For the example illustrated in FIG. 29, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated by the prosody subsystem 174 from the conversation logs 820. For the example illustrated in FIG. 29, the conversation logs 820 include a continually growing collection of stored user utterances 122 and agent utterances 124, such as a chat log. As set forth above, the conversation logs 820 include metadata associated with each message that is exchanged between the agent and the user.

For the embodiment illustrated in FIG. 29, prior to operation of the agent automation system 100, the RNN-based model 322 may initially have a set of weights (e.g., a matrix of values) that are set by an initial training. For this example, the ML-based parser 188 may be initially trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 29 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 29 includes receiving and responding to the user utterance 122, as discussed above with respect to the process 145 of FIG. 5. As mentioned, in certain embodiments, the user utterances 122 and the agent utterances 124, along with corresponding metadata, are collected as part of the conversation logs 820. As some point, such as during regularly scheduled maintenance, the prosody subsystem 174 of the NLU framework 104 repeatedly segments (block 842) the conversation logs 820 into intent segments 840, as discussed with respect to FIG. 28. Then, different rule-based parsers 186 and/or ML-based parsers 188 of the structure subsystem 172 of the NLU framework 104 parse (block 325) each of the intent segments 840 to generate multiple annotated utterance tree structures 326 for each of the intent segments 840. The meaning extraction subsystem 150 then determines (in decision block 328) whether a quorum (e.g., a simple majority consensus) has been reached by the different parsers.

For the example illustrated in FIG. 29, when the NLU framework 104 determines in block 328 that a sufficient number (e.g., a majority, greater than a predetermined threshold value) of annotated utterance trees 326 for a particular intent segment are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the intent segments 840. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to parse the grammatical structure of the user utterance 122 and extract the intents/entities 140 therefrom with enhanced domain specificity.

Figure 30:
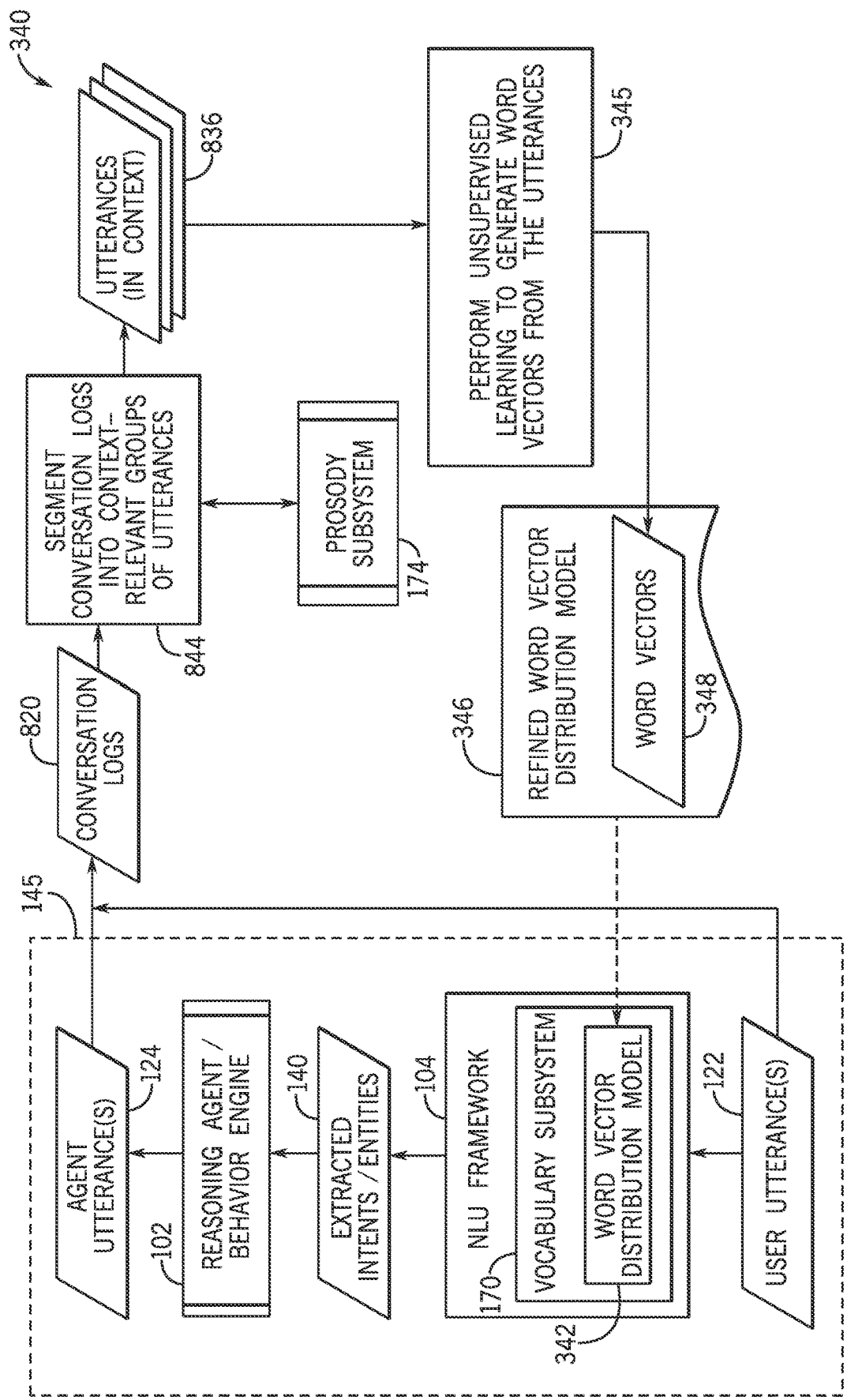
FIG. 30 is a block diagram illustrating an embodiment of a process by which the agent automation system continuously learns new words and/or refines word understanding for improved domain specificity, based on in-context utterances identified by the prosody subsystem, in accordance with aspects of the present technique.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 30 is a flow diagram illustrating an embodiment of a process 340 whereby the agent automation system 100 continuously improves a word vector distribution model 342, which may be plugged into the vocabulary subsystem 170 of the NLU framework 104, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing conversation logs 820. For the example illustrated in FIG. 30, the corpus of utterances 112 may be, for example, a collection of chat logs storing utterances user utterances 122 and agent utterances 124 from various chat room exchanges, or other suitable source data.

For the embodiment illustrated in FIG. 30, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 30 enables the word vector distribution model 342 to be modified to include new word vectors, and to change values of existing word vectors, based on source data gleaned from the growing collections of user and agent utterances 122 and 124 in the conversation logs 820, to improve the domain specificity of the NLU framework 104.

It should be noted that word-vector learning is based on the premise that words are generally used in specific contexts, and this defines a probability that specific words will appear given a specific set of surrounding words or, conversely, a probability that surrounding words will appear given a certain word, or similar context-aware derivations. As such, it is presently recognized that word vectors should be learned using optimization functions related to context (e.g., where words are appropriately "couched" within the context of other words). As such, one important aspect of prosodic segmentation is determining when one context starts and when one context ends. That is, it may be appreciated that, in certain written language source data (e.g., online or news articles), context boundaries may be well-defined; however, in other types of written language source data (e.g., free-form chat), these context boundaries may not be as readily apparent. As such, the disclosed prosody subsystem 174 determines these context boundaries to suitably group utterances in a context-specific manner, such that word meanings are extracted with the correct context specified.

Like FIG. 29, the process 340 illustrated in FIG. 30 includes receiving and responding to the user utterance 122, as discussed above with respect to FIG. 5. As mentioned, the user utterances 122 and the agent utterances 124 can be collected to as part of the conversation logs 820, which may form at least a portion of the corpus of utterance 112 stored in the database 106 illustrated in FIG. 4A. As some point, such as during regularly scheduled maintenance, the prosody subsystem 174 of the NLU framework 104 segments (block 844) the conversation logs 820 into distinct utterances 836, as discussed above with respect to FIG. 28. It should be noted that, because of the manner in which the conversation logs 820 are broken down into sessions 828 before being broken down into utterances 836, as noted above with respect to FIG. 28, the utterances 836 segmented in block 343 are grouped with similar context. For example, in certain embodiments, the utterances 836 generated in block 343 may be grouped based on the session 828 from which each of the utterances 836 are derived, such that each group of utterances 836 are likely to be contextually relevant to one another. Then, in block 345, the NLU framework 104 performs rule-augmented unsupervised learning to generate a refined word vector distribution model 346 containing new or different word vectors 348 generated from the segmented utterances 836.

For example, as discussed above, the meaning extraction subsystem 150 may analyze the set of segmented utterances 836 and determine word vectors 348 for the words of these utterances based on how certain words tend to be used together. For such embodiments, two words that are frequently used in similar contexts within these utterances 836 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 30, the refined word vector distribution model 346 is used to replace the existing word vector distribution model 342, such that the vocabulary subsystem 170 can use this refined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model 342, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140 for the given domain (e.g., enhanced domain specificity).

Figure 31:
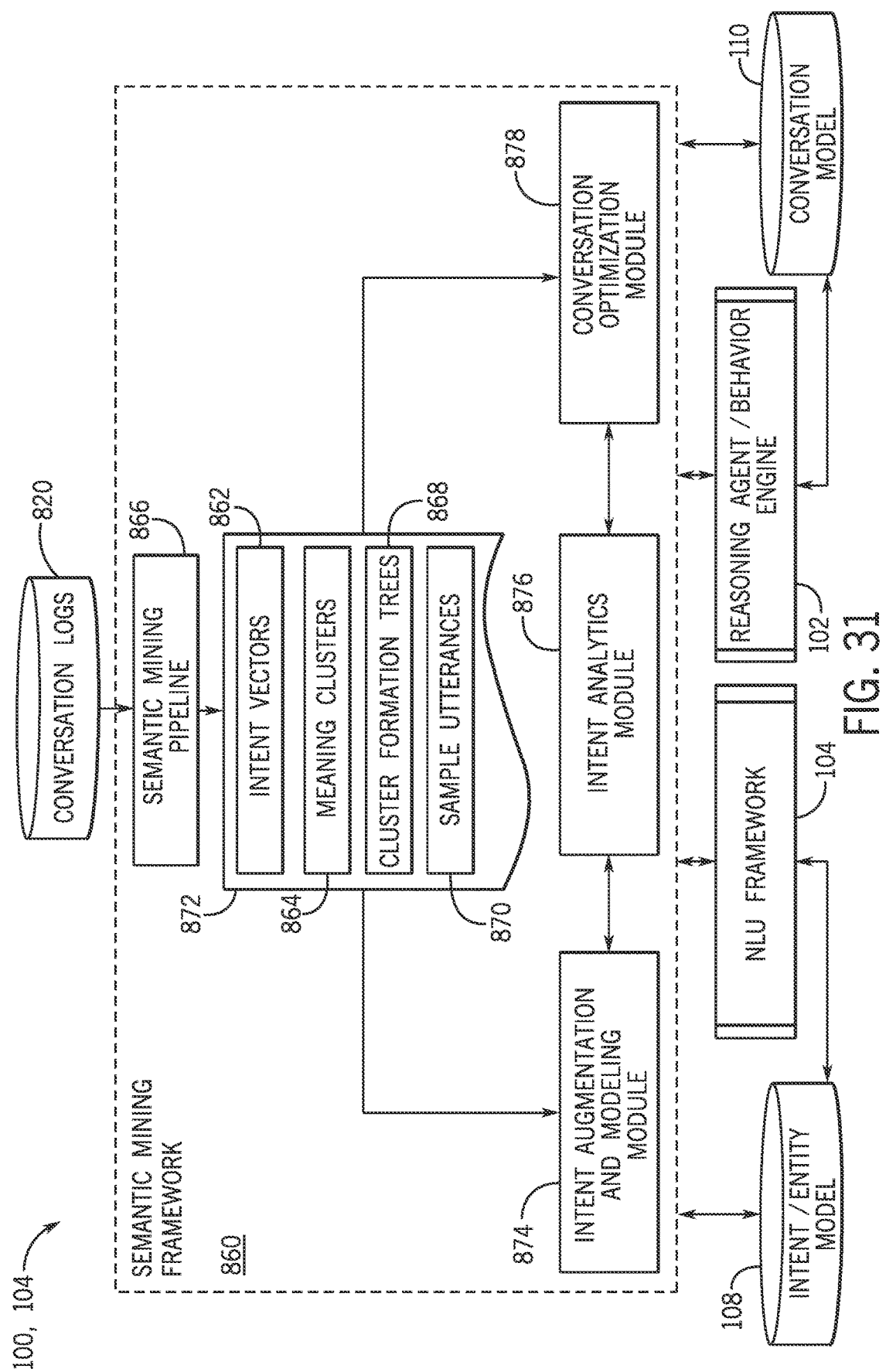
FIG. 31 is a block diagram depicting a high-level view of certain components of the agent automation framework, including a semantic mining framework, in accordance with aspects of the present technique.

As mentioned, the disclosed agent automation framework 100 is capable of generating a number of outputs, including the intent/entity model 108, based on the corpus of utterances 112 and the collection of rules 114 stored in the database 106. FIG. 31 is a block diagram depicting a high-level view of certain components of the agent automation framework 100, in accordance with an embodiment of the present approach. In addition to the NLU framework 104 and the reasoning agent/behavior engine 102 discussed above, the embodiment of the agent automation framework 100 illustrated in FIG. 31 includes a semantic mining framework 860 that is designed to process the conversation logs 820, using various subsystems of the NLU framework 104, to generate and improve the intent/entity model 108 and to improve the conversation model 110.

More specifically, for the illustrated embodiment, the semantic mining framework 860 includes a number of components that cooperate with other components of the agent automation framework 100 (e.g., the NLU framework 104, the vocabulary manager 118) to facilitate generation and improvement of the intent/entity model 108 based on the conversation logs 820, which may form at least a part of the corpus of utterances 112 stored in the database 106. That is, as discussed in greater detail below, the semantic mining framework 860 cooperates with the NLU framework 104 to decompose utterances 112 into intent segments (e.g., intents and entities), and to map these to intent vectors 862 within a vector space. In certain embodiments, certain entities (e.g., intent-specific or non-generic entities) are handled and stored as parameterizations of corresponding intents of the intent vectors within the vector space. For example, in the utterance, "I want to buy the red shirt," the entity "the red shirt" is treated as a parameter of the intent "I want to buy," and can be mapped into the vector space accordingly. The semantic mining framework 860 also groups the intent vectors based on meaning proximity (e.g., distance between intent vectors in the vector space) to generate meaning clusters 864, as discussed in greater detail below with respect to FIG. 32, such that distances between various intent vectors 862 and/or various meaning clusters 864 within the vector space can be calculated by the NLU framework 104, as discussed in greater detail below.

For the embodiment illustrated in FIG. 31, the semantic mining framework 860 begins with a semantic mining pipeline 866, which is an application or engine that generates the aforementioned intent vectors 862, as well as suitable meaning clusters 864, to facilitate the generation of the intent/entity model 108 based on the conversation logs 820. For example, in certain embodiments, the semantic mining pipeline 866 provides all levels of possible categorization of intents found in the conversation logs 820. Additionally, the semantic mining pipeline 866 produces a navigable schema (e.g., cluster formation trees 868 and/or dendrograms) for intent and intent cluster exploration. As discussed below, the semantic mining pipeline 866 also produces sample utterances 870 that are associated with each meaning cluster, and which are useful to cluster for exploration and training of the reasoning agent/behavior engine 102 and/or the conversation model 110. In certain embodiments, the outputs 872 of the semantic mining pipeline 866 (e.g., meaning clusters 864, cluster formation trees 868, sample utterances 870, and others discussed below) may be stored within one or more tables of the database 106 in any suitable manner.

Once the outputs 872 have been generated by the semantic mining pipeline 866, in certain embodiments, an intent augmentation and modeling module 874 may be executed to generate and improve the intent/entity model 108. For example, the intent augmentation and modeling module 874 may work in conjunction with other portions of the NLU framework 104 to translate mined intents into the intent/entity model 108. In particular, meaning clusters 864 may be used by the intent augmentation and modeling module 874 as a basis for intent definition. This follows naturally from the fact that meaning proximity is used as the basis for formation of the meaning clusters 864. As such, related and/or synonymous intent expressions are grouped together and, therefore, can be used as primary or initial samples for intents/entities when creating the intent/entity model 108 of the agent automation framework 100. Additionally, in certain embodiments, the intent augmentation and modeling module 874 utilizes a rules-based intent augmentation facility to augment sample coverage for discovered intents, which makes intent recognition by the NLU engine 116 more precise and generalizable. In certain embodiments, the intent augmentation and modeling module 874 may additionally or alternatively include one or more cluster cleaning steps and/or one or more cluster data augmentation steps that are performed based on the collection of rules 114 stored in the database 106. This augmentation may include a rule-based re-expression of sample utterances included in the discovered intent models and removal of structurally similar re-expressions/samples within the discovered model data. For example, this augmentation can include an active-to-passive re-expression rule, wherein a sample utterance "I chopped this tree" may be converted to "this tree was chopped by me". Additionally, since re-expressions (e.g., "buy this shoe" and "purchase this sneaker") have the same parse structure and similarly labeled parse node words that are effectively synonyms, this augmentation can also include removing such structurally similar re-expressions.

For the embodiment illustrated in FIG. 31, the semantic mining framework 860 includes an intent analytics module 876 that enables visualization of conversation log statistics, including intent and entity prevalence, and so forth. The illustrated embodiment also includes a conversation optimization module 878 that works in conjunction with the intent analytics module 876 to identify blind spots or weak points in the conversation model 110. For example, in an embodiment, the intent analytics module 876 may determine or infer intent prevalence values for certain intents based on cluster size (or another suitable parameter). Subsequently, intent prevalence values can be used by the conversation optimization module 878 as a measure of the popularity of queries that include particular intents. Additionally, when these intent prevalence values are compared to intents associated with particular responses in the conversation model 110, the conversation optimization module 878 may identify portions of the conversation model 110 that provide insufficient coverage (e.g., blind-spot discovery). That is, when the conversation optimization module 878 determines that a particular intent has a particularly high prevalence value and is not associated with a particular response in the conversation model 110, the conversation optimization module 878 may identify this deficiency (e.g., to a designer of the reasoning agent/behavior engine 102), such that suitable responses can be associated with these intents to improve the conversation model 110. Additionally, in certain embodiments, the intent analytics module 876 may determine a number of natural clusters within the meaning clusters 864, and the conversation optimization module 878 may compare this value to a number of breadth of intents associated with responses in the conversation model 110 to provide a measure of sufficiency of the conversation model 110 to address the intent vectors 862 generated by the semantic mining pipeline 866.

Figure 32:
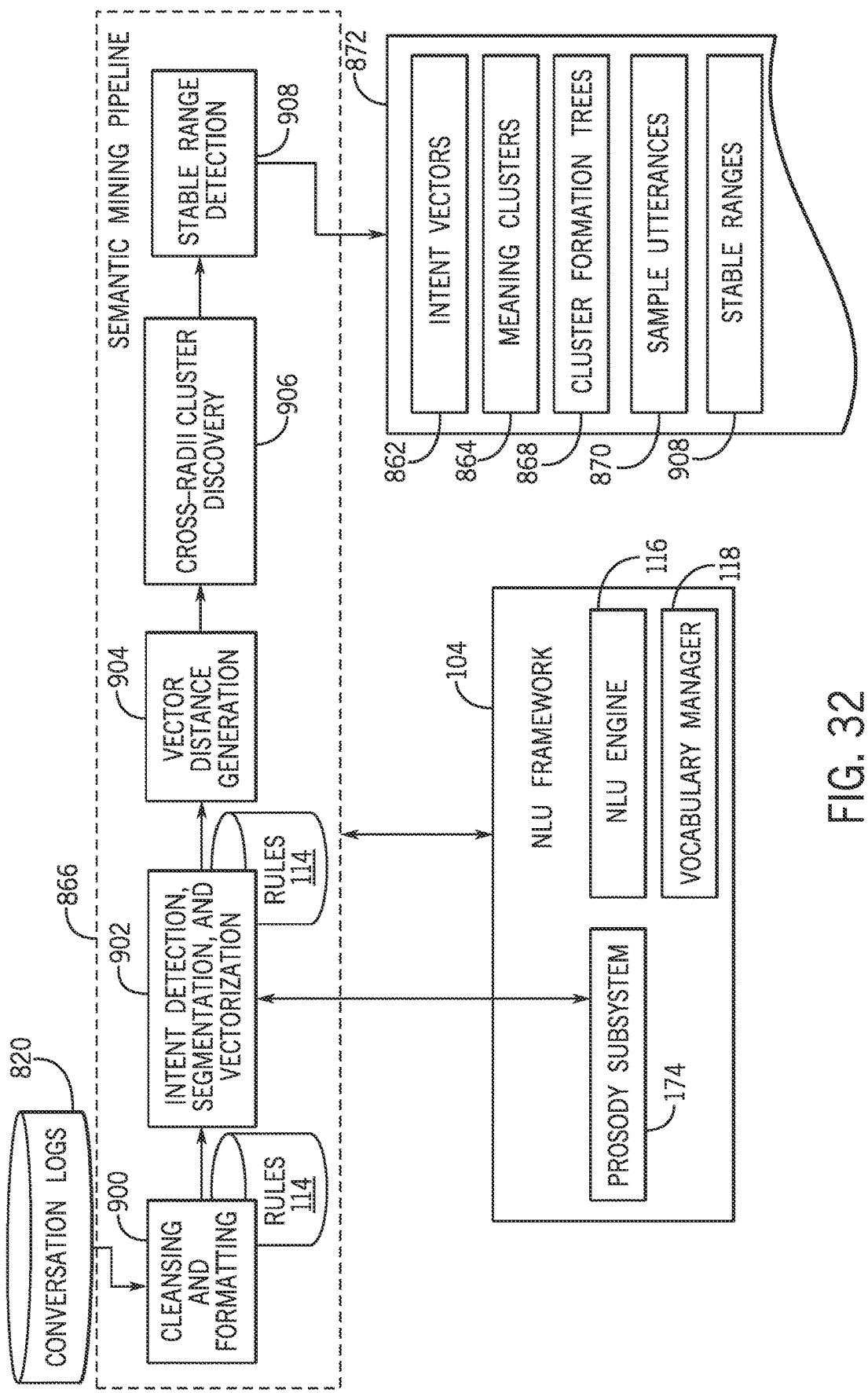
FIG. 32 is a block diagram of a semantic mining pipeline of the semantic mining framework illustrating a number of processing steps of a semantic mining process, in accordance with aspects of the present technique.

FIG. 32 is a block diagram of an embodiment of the semantic mining pipeline 866 that includes a number of processing steps of a semantic mining process used to generate outputs 872 to facilitate the generation of the intent/entity model 108 from the conversation logs 820. As such, the steps that are illustrated as part of the semantic mining pipeline 866 may be stored in suitable memory (e.g., memory 86) and executed by suitable a suitable processor (e.g., processor 82) associated with the client instance 42 (e.g., within the data center 22).

For the illustrated embodiment, the semantic mining pipeline 866 includes a cleansing and formatting step 900. During the cleansing and formatting step 900, the processor 82 analyzes the conversation logs 820 and removes or modifies any source data that may be problematic for intent mining, or to speed or facilitate intent mining. For example, the processor 82 may access rules 114 stored in the database 106 that define or specify particular features that should be modified within the corpus of utterances 112 before intent mining of the utterances 112 occurs. These features may include special characters (e.g., tabs), control characters (e.g., carriage return, line feed), punctuation, unsupported character types, uniform resource locator (URLs), internet protocol (IP) addresses, file locations, misspelled words and typographical errors, and so forth. In certain embodiments, the vocabulary manager 118 of the NLU framework 104 may perform at least portions of the cleansing and formatting step 900 to substitute out-of-vocabulary words based on synonyms and domain-specific meanings of words, acronyms, symbols, and so forth, defined with the rules 114 stored in the database 106.

For the illustrated embodiment, after cleansing and formatting, the conversation logs 820 undergo an intent detection, segmentation, and vectorization step 902. During this step, the processor 82 analyzes the conversation logs 820 using the NLU framework 104, including the NLU engine 116 and the vocabulary manager 118, to detect and segment the utterances into intents and entities based on the rules 114 stored in the database 106. Within this step, the prosody subsystem 174 of the NLU framework 104 is particularly responsible for repeatedly digesting the conversation logs 820 into intent segments 840, as discussed above with respect to FIG. 28. As mentioned above, the intent segments 840 may be generated from utterances 836 based on punctuation, based on CCG grammar form detection/recognition, or a combination thereof. Since these intent segments 840 form the basis for clustering intent vectors 862 during semantic mining, it is presently recognized that proper intent segmentation is important to the precise and domain specific operation of the NLU framework 104.

As discussed, in certain embodiments, certain entities can be stored in the intent/entity model 108 as parameters of the intents. Additionally, these intents are vectorized, meaning that a respective intent vector is produced for each intent by the NLU framework 104. It may be appreciated by those skilled in the art that these vectors may be generated by the NLU framework 104 in a number of ways. For example, in certain embodiments, the NLU framework 104 may algorithmically generate these vectors based on pre-built vectors in a database (e.g., a vector for an intent "buy a shoe" might include a pre-built vector for "buy" that is modified to account for the "shoe" parameter). In another embodiment, these vectors may be based on the output of an encoder portion of an encoder-decoder pair of a language translation system that consumes the intents as inputs.

For the illustrated embodiment, after intent detection, segmentation, and vectorization, a vector distance generation step 904 is performed. During this step, all of the intent vectors produced in block 902 are processed to calculate distances between all intent vectors (e.g., as a two-dimensional matrix). For example, the processor 82 executes a portion of the NLU framework 104 (e.g., the NLU engine 116) that calculates the relative distances (e.g., Euclidean distances, or another suitable measure of distance) between each intent vector in the vector space to generate this distance matrix, which is later used for cluster formation, as discussed below.

For the illustrated embodiment, after vector distance generation, a cluster discovery step 906 is performed. In certain embodiments, this may be a cross-radii cluster discovery process; however, in other embodiments, other cluster discovery processes can be used, including, but not limited to, agglomerative clustering techniques (e.g., Hierarchical Agglomerative Clustering (HAC)), density based clustering (e.g., Ordering Points To Identify the Clustering Structure (OPTICS)), and combinations thereof, to optimize for different goals. For example, discussion cluster discovery may benefit more from density-based approaches, such as OPTICS, while intent model discovery may benefit more from agglomerative techniques, such as HAC.

For example, in one embodiment involving a cross-radii cluster discovery process, the processor 82 attempts to identify a radius value that defines a particular cluster of intent vectors in the vector space based on the calculated vector distances. The processor 82 may determine a suitable radius value defining a sphere around each intent vector, wherein each sphere contains a cluster of intent vectors. For example, the processor 82 may begin at a minimal radius value (e.g., a radius value of 0), wherein each intent vector represents a distinct cluster (e.g., maximum granularity). The processor 82 may then repeatedly increment the radius (e.g., up to a maximum radium value), enlarging the spheres, while determining the size of (e.g., the number of intent vectors contained within) each cluster, until all of the intent vectors and meaning clusters merge into a single cluster at a particular maximum radius value. It may also be appreciated that the disclosed cross-radii cluster discovery process represents one example of a cluster discovery process, and in other embodiments, cluster discovery may additionally or alternatively incorporate measures and targets for cluster density, reachability, and so forth.

For the illustrated embodiment, after cluster discovery, a stable range detection step 908 is performed. For example, for embodiments that utilize the cross-radii cluster discovery process discussed above, the processor 82 analyzes the radius values relative to the cluster sizes determined during cluster discovery 906 to identify stable ranges 908 of radius values, indicating that natural clusters are being discovered within the vector space. Such natural intent clusters are commonly present within a corpus of utterances, and are generally particular to a language and/or a context/domain.

Additionally, the prosody subsystem 174 also supports and enables episodic context management within the agent automation system 100. For example, in certain embodiments, the RA/BE 102 may include a number of different personas, each designed to address different aspects or facets of the behavior of the RA/BE 102, such as a sales persona, a marketing persona, a support persona, a persona for addressing requests during business hours, a persona for addressing requests after business hours, and so forth. Additionally, these personas of the RA/BE 102 manage context information associated with each episode, wherein the context information may be stored as a hierarchical set of name/value pairs in the database 106. As such, the RA/BE 102 ensures that appropriate episodic context information can be applied when responding to user messages.

For example, in certain embodiments, a persona of the RA/BE 102 may initially respond to a user message based on a current context that only includes context information from the current episode (e.g., today's episode context). However, when the prosody subsystem 174 determines that a user message includes prosodic cues indicating that the user message is associated with the context information of another episode (e.g., yesterday's context), the RA/BE 102 responds by retrieving and overlaying the context information of the current episode with the context of the referenced episode based on persona-specific overlay rule templates, which may be stored in the database 106. As such, the persona of the RA/BE 102 can subsequently perform suitable actions in response to the user message, as well as subsequent user message, in a context-appropriate manner. Accordingly, the disclosed RA/BE 102 design provides a substantial improvement by enabling virtual agents having automatic context management.

Figure 33:
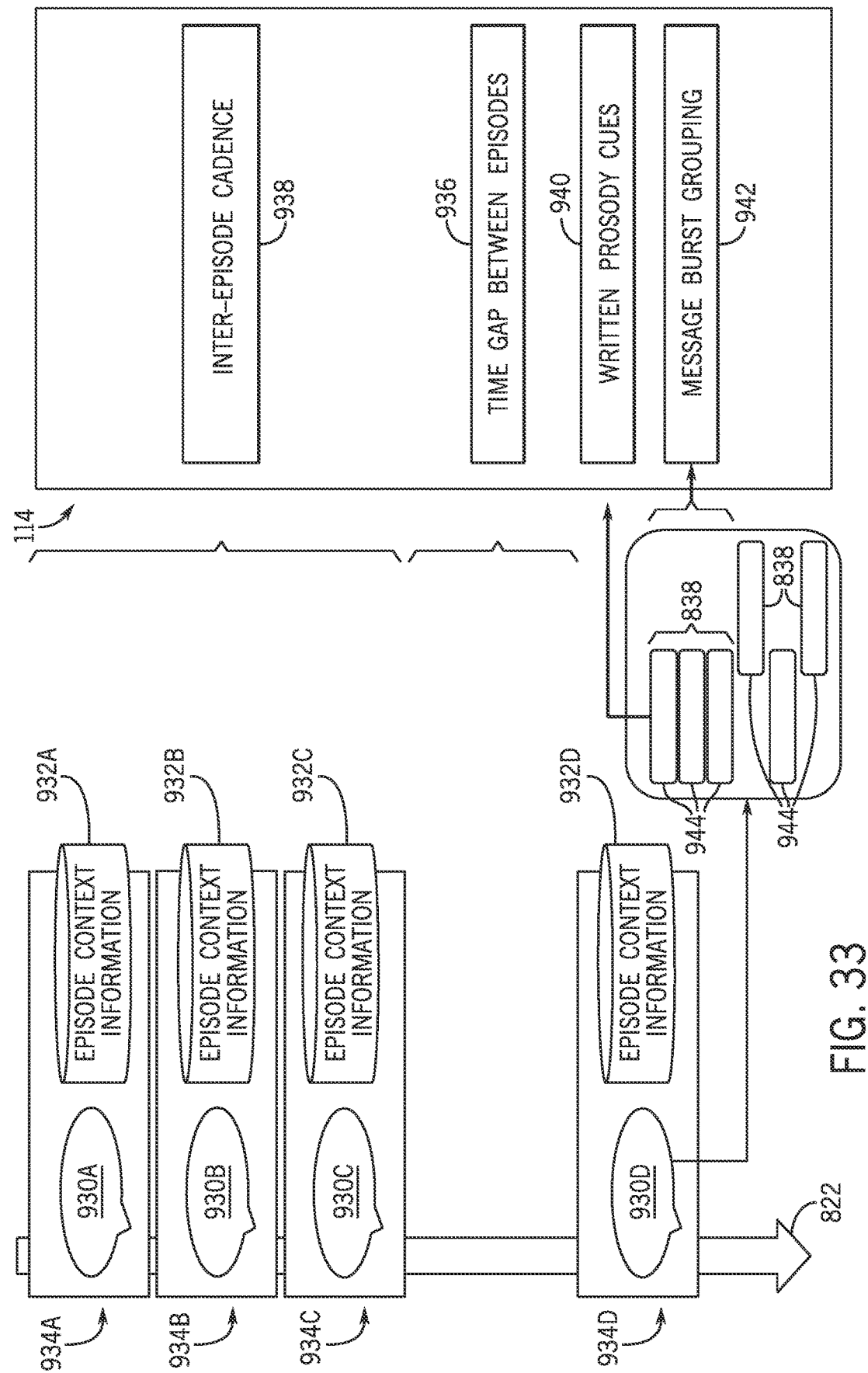
FIG. 33 is a diagram illustrating the prosody subsystem supporting the RA/BE in segmenting episodic context information from conversation logs, in accordance with aspects of the present technique.

For the illustrated example of FIG. 33, the RA/BE 102 manages information for a number of different episodes in one or more suitable tables of the database 106. More specifically, a particular persona of the RA/BE 102 manages episode conversation information 930 (e.g., episode conversation information 930A, 930B, 930C, and 930D), which includes messages and corresponding metadata that are part of each episode of conversation between the user and the persona of the RA/BE 102. Additionally, the persona of the RA/BE 102 manages episode context information 932 (e.g., episode context information 932A, 932B, 932C, and 932D), which includes name/value pairs storing details (e.g., user information, topic information, prices, stock identifiers, weather information, and so forth) relating to the episode of conversation.

For the illustrated example, the persona of the RA/BE 102 calls on the prosody subsystem 174 of the NLU framework 104 to determine how to segment a conversation into episodes 934, including episodes 934A, 934B, 934C, and 934D, which represent discrete or disparate portions of the conversation logs 820 (indicated by the conversation timeline 822 in FIG. 33) that are pertinent to a specific topic/set of topics during one-on-one or group interactions involving the RA/BE 102. It may be noted that, in certain embodiments, these episodes 934 correspond to sessions 828 or segments 832 that are identified from the conversation logs 820 by the prosody subsystem 174, as illustrated in FIG. 28, while in other embodiments, each of the episodes 934 can include messages from different sessions 828 and/or segments 832 that are topically related, based on written prosodic cues, and/or temporally related, based on temporal prosodic cues. For the illustrated example of FIG. 33, each of the episodes 934 corresponds to a particular session 830, which includes respective boundaries to mark start and end times that are determined from the conversation log 820 as the conversation progresses. To identify these boundaries, the prosody subsystem 174 may apply rules and/or statistical learning (e.g., machine-learning) techniques to determine how to divide and group messages from the conversation log 820 to support episodic context management by the RA/BE 102.

For example, in certain embodiments, the prosody subsystem 174 determines the start and end time associated with each of the episodes 934 based on written prosodic cues that indicate changes in topic, based on temporal prosodic cues that indicate a substantial delay between messages, or other suitable factors. Specifically, in certain embodiments, the prosody subsystem 174 may use heuristic rules to identify episode start and end times. Learning mechanisms, similar to human autonoetic introspection, can be used to determine approximations of attention span, identify what context information 932 needs to be propagated across episode boundaries, determine property-override-rules, determine derivative scoping rules, and so forth, and these, in turn, use features of the user (e.g., user demographic, user mood, and so forth) alongside current relevant context (e.g., current time-of-day, location, weather, and so forth).

For the illustrated embodiment, the prosody subsystem 174 may use the rules 114 stored in the database 106 to digest the conversation log 820 represented by the conversation timeline 822 into sessions 828, wherein each session 830 corresponds to one of the episodes 934. For example, in certain embodiments, the rules 114 may define a time gap 936 between episodes 934, such that an amount of time between messages in the conversation log 820 that is greater than or equal to this stored threshold value indicates the end of a first episode (e.g., episode 934A) and the beginning of the next episode (e.g., episode 934B). In certain embodiments, the rules 114 may additionally or alternatively define an inter-episode cadence 938, which defines a length of time or a number of messages along the conversation timeline 822 that generally corresponds to a single episode, such that a duration or a number of messages of a conversation can be used as an indication of demarcation between episodes 934. In certain embodiments, the rules 114 may also define written prosodic cues 940 (also referred to as per-utterance cues), which are written prosodic cues within the messages of the conversation logs 820 that may signal the beginning or end of an episode. Additionally, in certain embodiments, the rules 114 may also define message burst grouping 942, which indicates how certain distinct messages 944 within the conversation logs 820 may be combined by the prosody subsystem 174 to represent a single utterance 838 based on temporal and/or written prosodic cues. As noted above, in certain embodiments, this may involve the prosody subsystem 174 matching utterance trees of the messages 944 and/or utterances 838 to predetermined CCG forms representing phrases that are indicative of topic changes (e.g., "Now, with regards to . . . ", "Speaking of which . . . ", "Going back to . . . ", and so forth) to determine which messages 944 should be treated as a single utterance 838.

However, as mentioned, in certain embodiments, the prosody subsystem 174 may be or include a ML-based prosody system 196, which learns how to digest the conversation log 820 into episodes 934 based on different prosodic cues. For example, in certain embodiments, the ML-based prosody system 196 may analyze the conversation log 820 to determine the inter-episode cadence 938 for a set of conversation logs 820. Additionally, the ML-based prosody system 196 may analyze the conversation logs 820 to determine the typical time gap 936 between episodes 934 based on temporal prosodic cues. The ML-based prosody system 196 may also analyze written prosodic cues in the conversation logs 820 to determine written prosodic cues 940 that signal the beginning or end of an episode. The ML-based prosody system 196 may further analyze temporal prosodic cues in the conversation logs 820 to determine the message burst grouping 942, which dictates how the ML-based prosody system 196 groups messages 944 within the episodes 934 as a distinct utterance 838. In certain embodiments, the conversation logs 820 may be further annotated by a human to indicate when the human believes that the episodic boundaries should occur to enhance learning by the ML-based prosody system 196.

Figure 34:
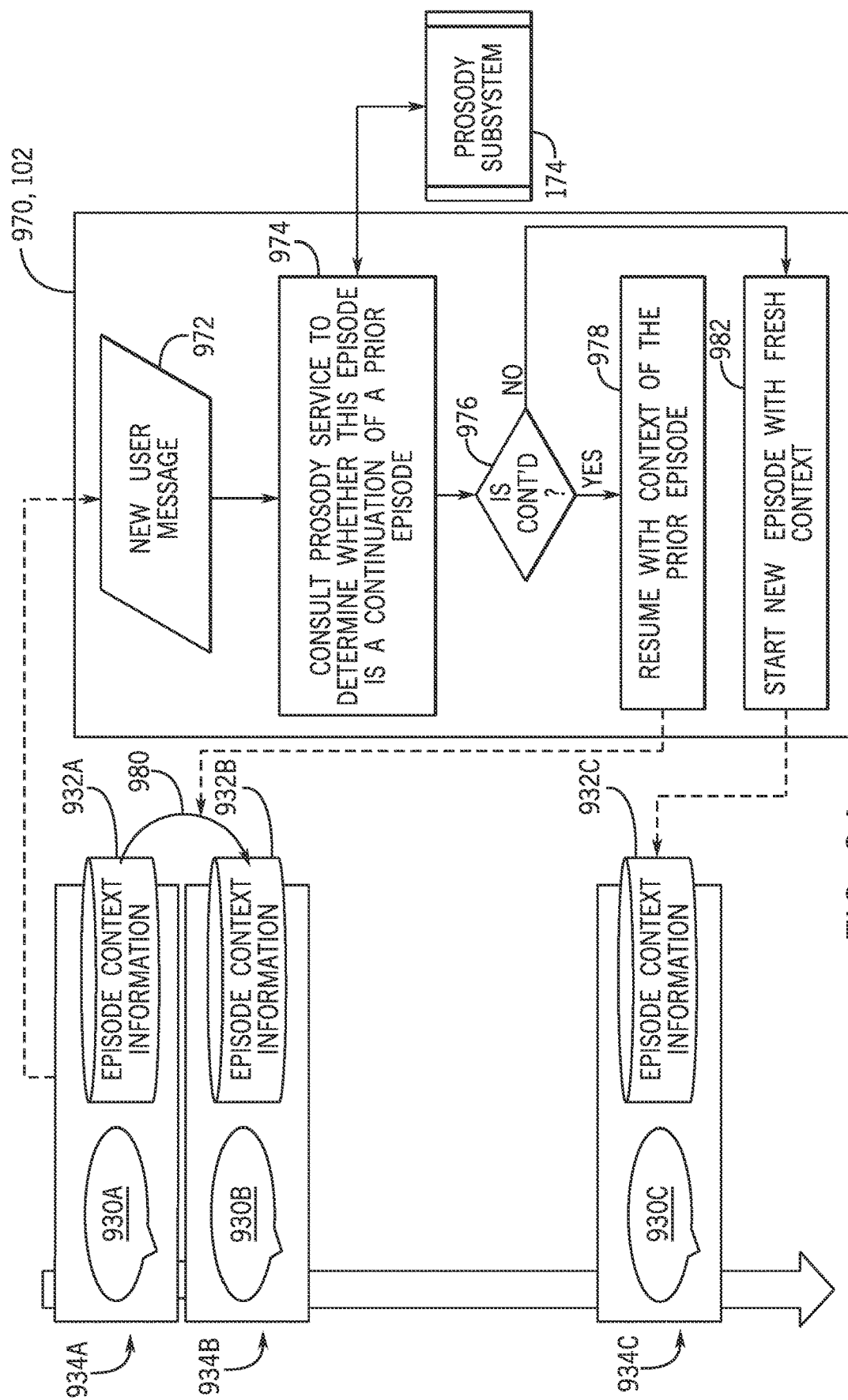
FIG. 34 is a flow diagram illustrating how a persona of the RA/BE uses the prosody subsystem to manage episodic context within the agent automation framework, in accordance with aspects of the present technique.

FIG. 34 is a flow diagram depicting an example of a persona 970 of a RA/BE 102 using the prosody subsystem 174 of the NLU framework 104 to manage episodic conversation context, in accordance with an embodiment of the present approach. For the illustrated embodiment, the persona 970 is a script of the RA/BE 102 that is designed to address a particular aspect of conversations with a user, such as a sales persona, a marketing persona, a support persona. Additionally, the persona 970 of the RA/BE 102 stores and manages context information 932 (e.g., context information 932A, 932B, and 932C) that is associated with each distinct chat episode 934 between the user and the persona 970, wherein the context information 932 may be stored as a hierarchical set of name/value pairs in the database 106. For example, stored context information 932 may include user information (e.g., role, gender, age), conversational topic information (e.g., items discussed, actions requested), and other conversational details (e.g., results/outcomes) for each episode of conversation between the user and the persona 970.

When the persona 970 of the RA/BE 102 receives a new message 972 from the user, the persona 970 consults the prosody subsystem 174 (block 974) to determine (block 976) whether the new message should be treated as a continuation of a prior conversation episode (e.g., chat episode) or the beginning of a new episode. As set forth above with respect to FIG. 33, in certain embodiments, the prosody subsystem 174 may include a rules-based prosody system 194 that applies rules 114 stored in the database 106 to determine whether the new message 972 is a continuation of a prior chat episode. For example, the rules-based prosody system 194 may apply a rule that defines the typical time gap 936 between episodes, and when the time gap between the new message 972 and the previous message in the conversation logs 820 is less than the typical time gap 936, the rules-based prosody system 194 may determine that the new message 972 is a continuation of the previous episode. In other embodiments, the rules-based prosody system 194 may apply a rule that defines written prosodic cues 940 that signal the start of a new episode or that signal that the new message 972 is a continuation of a prior episode. In still other embodiments, the prosody subsystem 174 may include a ML-based prosody system 196 that learns from the conversation logs 820 the typical time gap 936 between episodes and/or written prosodic cues 940 that are then applied to determine whether the new message 972 is a continuation of a prior episode.

When the persona 970 of the RA/BE 102 determines that the prosody subsystem 174 has provided an indication that the new message 972 is a continuation of a prior episode, the RA/BE 102 responds by resuming (block 978) the conversation using the context of the prior episode. To do this, as illustrated by the arrow 980, the RA/BE 102 overlays the episode context information of the prior episode (e.g., episode context information 932A) over the current context information (e.g., episode context information 932B) in order to use at least a portion of the context information of the prior episode when responding to the new user message 972. In certain embodiments, the prosody subsystem 174 may additionally provide the persona 970 with intent segments (e.g., intents/entities) that are identified within the new user message 972, such that the persona 970 can identify context-overlay cues within these intent segments and use these context-overlay cues to identify which prior episode context information should be overlaid. One example of a context-overlay cue in a message might be, "Remember what we discussed on Wednesday?" Additionally, the persona 970 of the RA/BE 102 may be programmed to perform particular actions in response to particular intents/entities parsed from the new user message 972 by the prosody subsystem 174.

In certain embodiments, overlaying may involve the persona 970 of the RA/BE 102 applying persona-specific overlay rule templates stored in the database 106 that define how the hierarchical set of name/value pairs of the context information associated with the prior episode augments or modifies the context information associated with the current conversation with the user. In certain embodiments, this may also involve the RA/BE 102 combining the context information of multiple episodes based on persona-specific multi-episode aggregation rules stored in the database 106. However, when the prosody subsystem 174 signals to the RA/BE 102 that the new message 972 is not a continuation of a prior episode, the persona 970 of the RA/BE 102 starts (block 982) a new episode with fresh context (e.g., episode context information 932C) without overlaying context information of another episode. As such, the persona 970 of the RA/BE 102 can subsequently perform suitable actions in response to the new user message 972, as well as subsequent user messages of the current episode, in a context-appropriate manner.

Technical effects of this section of the present disclosure include providing an agent automation framework that is capable of extracting meaning from user utterances, such as requests received by a virtual agent (e.g., a chat agent), and suitably responding to these user utterances. Additionally, present embodiment include a prosody subsystem of the NLU framework that is designed to analyze collections of written messages for various prosodic cues to break down the collection into a suitable level of granularity (e.g., into episodes, sessions, segments, utterances, and/or intent segments) for consumption by other components of the NLU framework, enabling operation of the NLU framework. These prosodic cues may include, for example, source prosodic cues that are based on the author and the conversation channel associated with each message, temporal prosodic cues that are based on a respective time associated with each message, and/or written prosodic cues that are based on the content of each message. For example, to improve the domain specificity of the agent automation system, intent segments extracted by the prosody subsystem may be consumed by a training process for a ML-based structure subsystem of the NLU framework, and contextually-relevant groups of utterances extracted by the prosody subsystem may be consumed by another training process that generates new word vector distribution models for a vocabulary subsystem of the NLU framework. Additionally, intent segments extracted by the prosody subsystem may be consumed by a semantic mining framework of the NLU framework to generate an intent/entity model that is used for later intent extraction. Additionally, to enable episodic context management within the NLU framework, the prosody subsystem may also analyze a received user message and provide an indication as to whether the user message corresponds to a prior episodes or corresponds to a new episode.

Domain-Aware Vector Encoding (DAVE) Framework

As discussed above, NLU systems are used by a wide variety of clients for various domains, such as Information Technology Management (ITSM), Customer Service Management (CSM), Human Resource Management (HRM), Finance, and so forth. However, in certain embodiments, a NLU system may utilize one or more ML-based word vector distribution models (also referred to herein as semantic models or neural language models) that are trained based on a domain-agnostic corpus, such as an encyclopedia, a dictionary, a newspaper, to generate semantic vectors (also referred to as encodings or embeddings) for portions of utterances, including tokens of utterances, phrases of utterances, and/or entire utterances. It is presently recognized that, while this enables large, existing vector spaces to be leveraged that capture important relationships between many words and phrases (e.g., frequently used terms) within a given language, these domain-agnostic semantic models can fail to provide suitable semantic vectors for domain-specific terminology. For example, a term that is rarely or never used outside of a particular domain (e.g., a domain-specific term) may not be sufficiently represented within the domain-agnostic corpus to enable the domain-agnostic semantic model to learn a high-quality semantic vector that suitably represents the meaning of the term relative to other terms of the generic corpus represented within the vector space. Additionally, it may be desirable to leverage an existing semantic model that generates semantic vectors in a vector space having a different number of dimensions than the vector space(s) utilized by the NLU system.

Figure 35:
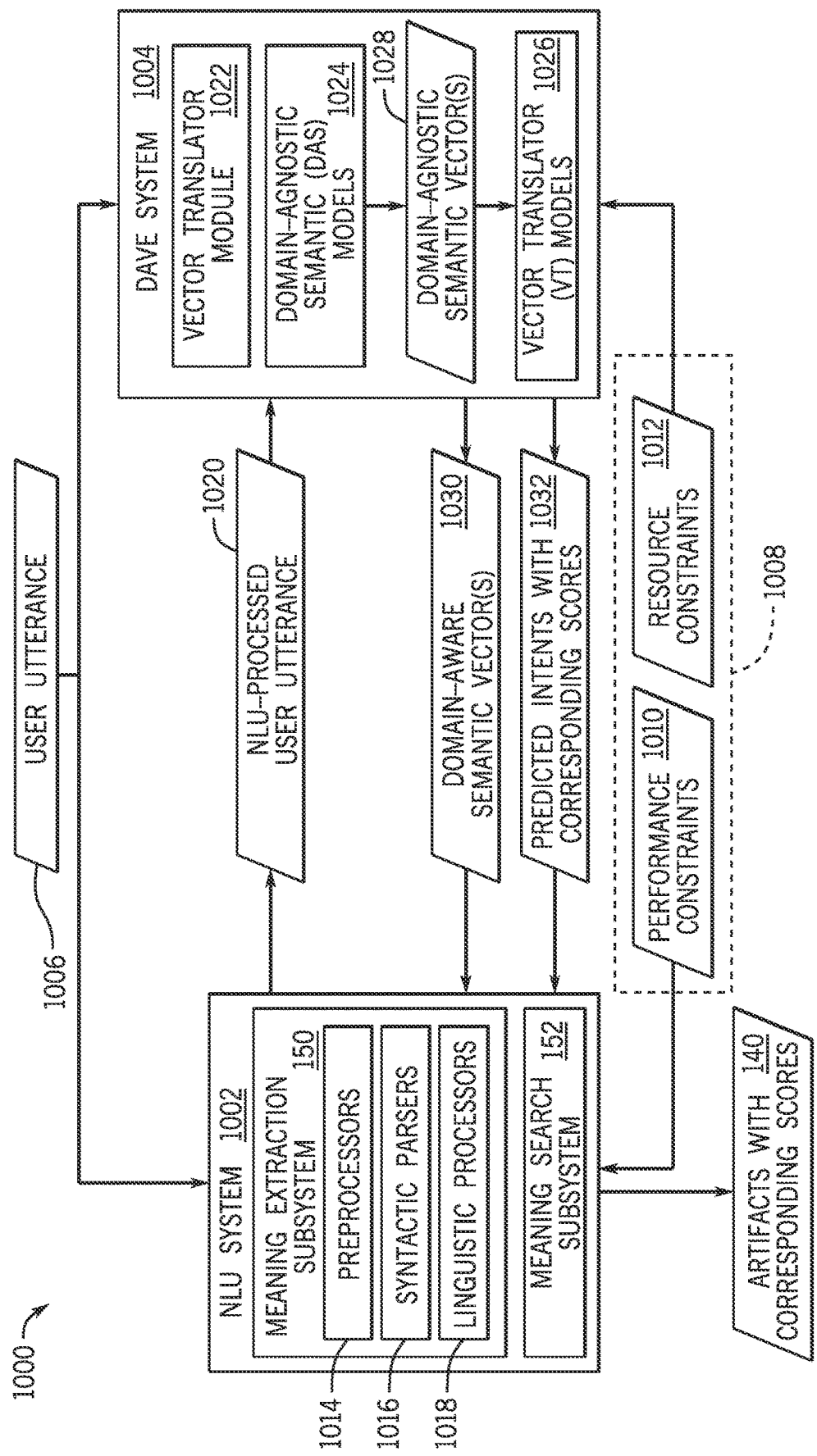
FIG. 35 is a flow diagram illustrating an embodiment of a NLU framework that includes a NLU system and a domain-aware vector encoding (DAVE) system processing a user utterance, in accordance with aspects of the present technique.

With this in mind, FIG. 35 is a flow diagram illustrating an embodiment of a NLU framework 1000 that includes a NLU system 1002 and a domain-aware vector encoding (DAVE) system 1004 processing a user utterance 1006. The NLU framework 1000 is discussed with reference to certain elements illustrated in FIGS. 5-7. For the embodiment illustrated in FIG. 35, the NLU framework 1000 includes a number of NLU constraints 1008, which may be stored in a suitable configuration of the NLU framework 1000 or provided by the user along with the user utterance 1006. These NLU constraints 1008 may include performance constraints 1010 (e.g., desired prediction latency, desired precision, desired recall, desired operational explainability, amount and quality of available training data, training data complexity) and resource constraints 1012 (e.g., processing time, memory usage, storage usage). As discussed below, the NLU constraints 1008 are considered by both the NLU system 1002 and the DAVE system 1004 when inferencing the user utterance 1006 to provide the desired level of performance to the NLU framework 1000 within a desired level of computational resource usage. Additionally, the NLU framework 1000 utilizes the NLU constraints 1008 when selecting and training components of the DAVE system 1004, as discussed below.

The NLU system 1002 illustrated in FIG. 35 includes a meaning extraction subsystem 150 and a meaning search subsystem 152, similar to those discussed above. The illustrated meaning extraction subsystem 150 includes one or more preprocessors 1014, which may be implemented as plugins in certain embodiments. Example preprocessors 1014 may include spell checkers, syntax checkers, de-lexicalization plugins, named entity recognition (NER) plugins, or any other suitable preprocessors that prepare the user utterance 1006 for parsing. The illustrated meaning extraction subsystem 150 also includes one or more syntactic parsers 1016 (e.g., a rules-based syntactic parser, a ML-based syntactic parser, or a combination thereof), which may also be implemented as plugins in certain embodiments. As discussed above, the syntactic parsers generate part-of-speech (POS) tags (e.g., verbs, adjectives, nouns) and relations (e.g., subject, object) for the tokens of an utterance, which are used to generate the syntactic structure of one or more annotated utterance trees that represent the user utterance 1006. In certain embodiments, the meaning extraction subsystem 150 may include one or more linguistic processors 1018 (e.g., rules-based linguistic processors), such as linguistic processors that extract particular linguistic forms (e.g., verb phrases, noun-phrases that are subjects or objects) as potential intents and entities of the user utterance 1006 after parsing.

For the embodiment illustrated in FIG. 35, the meaning extraction subsystem 150 transforms the user utterance 1006 into a NLU-processed user utterance 1020, which has been suitably preprocessed, syntactically parsed, and/or linguistically processed. For example, when the NLU constraints 1008 indicate that a moderate prediction time is sufficient, that a high precision is desired, that a high explainability of the NLU inference is desired (e.g., easy to determine and explain how and why the NLU system extracted a particular intent), and/or that a moderate amount of computing resources may be utilized, then the NLU system 1002 may determine that a NLU meaning search is appropriate. As such, the meaning extraction subsystem 150 of the NLU system 1002 may perform preprocessing, syntactic parsing, and/or linguistic processing to generate the NLU-processed user utterance 1020, which will eventually be converted into meaning representations 162 of the utterance meaning model 160 for one or more meaning search operations by the meaning search subsystem 152, as discussed above with respect to FIG. 6.

However, in some embodiments, the NLU system 1002 may decide, based on the NLU constraints 1008, that a NLU meaning search of the NLU-processed user utterance 1020 is not desirable. For example, when the NLU system 1002 determines that the NLU constraints 1008 indicate that an extremely low prediction latency is desired and/or extremely low resource usage is desired, then the NLU system 1002 may reduce computing resource usage of the NLU framework 1000 by avoiding the operation of the meaning extraction subsystem 150. For such embodiments, in alternative to the NLU meaning search, the meaning search subsystem 152 of the NLU system 1002 may perform an utterance meaning search by matching a semantic vector representing the entire user utterance 1006 to a search space populated with domain-aware semantic vectors representing entire sample utterances of the intent-entity model. It may be appreciated that, since the NLU-processed user utterance 1020 need not be generated for the utterance meaning search, the computing resource usage is reduced. However, since it is easy to determine the sample utterance to which the user utterance 1006 is matched during the utterance meaning search, the utterance meaning search still enables a high explainability. Additionally or alternatively to the NLU meaning search and the utterance meaning search, the DAVE system 1004 can perform an intent classification to extract predicted intents from the user utterance 1006. Since the intent classification of the DAVE system 1004 does not require the NLU-processed user utterance 1020, intent classification reduces the resource consumption of the NLU framework 1000. However, since it is difficult to determine or explain how or why the DAVE system 1004 classified a particular utterance as having a particular intent, this intent classification offers a lower explainability. As such, the NLU framework 1000 can operate in a number of different manners, performing a NLU meaning search, an utterance meaning search, intent classification, or any combination thereof, depending on the NLU constraints 1008 provided by the user or designer of the NLU framework 1000.

For the embodiments discussed above with respect to FIG. 7, the meaning extraction subsystem 150 uses the vocabulary subsystem 170 to generate semantic vectors for the NLU-processed user utterance 1020 in order to complete construction of meaning representations of the NLU-processed user utterance 1020. However, for the embodiment illustrated in FIG. 35, the DAVE system 1004 is instead used to generate semantic vectors for portions (e.g., tokens, phrases) of the NLU processed user utterance 1006 and/or the entire user utterance 1006. For example, in certain embodiments, the NLU system 1002 may use the DAVE system 1004 in place of the vocabulary subsystem 170 to determine domain-aware semantic vectors when generating meaning representations 162 of the utterance meaning model 160, and when generating sample utterances of the intent-entity model 1014 during compilation of the understanding model 157, as discussed above with respect to FIG. 6.

The DAVE system 1004 illustrated in FIG. 35 includes a vector translator module 1022, a set of domain-agnostic semantic (DAS) models 1024, and a set of trained vector translator (VT) models 1026. The vector translator module 1022 includes instructions defining how the DAVE system 1004 selects and applies the DAS models 1024 and the corresponding VT models 1026 during inference of the user utterance 1006, in accordance with the NLU constraints 1008. For the embodiment illustrated in FIG. 35, the DAS models 1024 are ML models (e.g., neural networks) that are each trained using generic corpora across a number of different languages to enable a general language understanding capability within each language. In certain embodiments, the DAS models 1024 may include publically-available DAS models, such as GOOGLE Universal Sentence Encoder (USE) convolutional neural network (CNN) models, GOOGLE Universal Sentence Encoder (USE) transformer models, Bidirectional Encoder Representations from Transformers (BERT) models, global vector (GloVe) models, XLM-RoBERTa models, DistillUSE models, or other suitable DAS models. The vector translator module 1022 of the DAVE system 1004 selects a suitable DAS model from the DAS models 1024 to process the user utterance 1006 and/or the NLU-processed user utterance 1020 based at least on the NLU constraints 1008.

In certain embodiments, the DAVE system 1004 may select and utilize multiple DAS models 1024, each with a corresponding VT model, to process the user utterance 1006 and/or the NLU-processed user utterance 1020. The vector translator module 1022 may select a particular DAS model that satisfies certain performance constraints 1010 (e.g., desired prediction latency) and the resource constraints 1012 (e.g., processing time, memory usage) of the NLU framework 1000. The vector translator module 1022 provides the user utterance 1006, and/or portions of the NLU-processed user utterance 1020, as inputs to the DAS models 1024 to first generate domain-agnostic semantic vectors 1028. For example, in response to the DAVE system 1004 receiving the user utterance 1006, the vector translator module 1022 provides the entire user utterance to the selected DAS model to generate a domain-agnostic semantic vector that represents the entire user utterance. In response to the DAVE system 1004 receiving the NLU-processed user utterance 1020, the vector translator module 1022 provides portions (e.g., tokens, phrases) of the NLU-processed user utterance 1020 to the selected DAS model to generate domain-agnostic semantic vectors 1028 that represent the portions of the NLU-processed user utterance 1020.

For the embodiment illustrated in FIG. 35, the DAVE system 1004 includes the set of VT models 1026. As discussed below, each of the VT models 1026 is a ML-based model (e.g., a multi-output neural network) trained to translate the domain-agnostic semantic vectors 1028 generated by a particular one of the DAS models 1024 into domain-aware semantic vectors 1030 of a domain-aware vector encoding (DAVE) space utilized by the NLU system 1002. As such, each of the VT models 1026 is trained to operate with, and therefore corresponds to, a particular DAS model of the DAS models 1024 of the DAVE system 1004. For the selected DAS model, the vector translator module 1022 selects an associated VT model that satisfies certain performance constraints 1010 (e.g., desired prediction latency, desired precision, desired recall) and the resource constraints 1012 (e.g., processing time, memory usage, storage usage) of the NLU framework 1000. Additionally, for the illustrated embodiment, the VT models 1026 perform intent classification of the user utterance 1006 to extract predicted intents 1032 of the user utterance 1006, along with corresponding probability scores for each predicted intent classification. After selecting a suitable corresponding VT model for the selected DAS model, the vector translator module 1022 provides the domain-agnostic semantic vectors 1028 generated by the DAS model as inputs to the corresponding selected VT model. For each domain-agnostic semantic vector provided by a selected DAS model, the corresponding selected VT model generates a domain-aware semantic vector and at least one predicted intent of the user utterance 1006. The domain-aware semantic vectors 1030 and the predicted intents 1032 generated by the VT models 1026 are provided to the NLU system 1002, as illustrated in FIG. 35.

The NLU system 1002 proceeds with inferencing the user utterance 1006 in accordance with the NLU constraints 1008. As such, for embodiments in which the NLU system 1002 determined that a NLU meaning search operation is desirable, the NLU system 1002 may proceed with constructing meaning representations 162 of the utterance meaning model 160 from the NLU-processed user utterance 1020 using the domain-aware semantic vectors 1030, and then the meaning search subsystem 152 may load one or more search spaces (e.g., an intent search space, an entity search space) based on the understanding model 157 and locate matching meaning representations 158 within these search spaces to identify and score artifacts 140 (e.g., intents and/or entities), as discussed above with respect to FIG. 6. For embodiments in which the NLU system 1002 determined that a utterance meaning search is additionally or alternatively desirable, the meaning search subsystem 152 may perform an utterance meaning search by loading a semantic search space populated with domain-aware semantic vectors representing entire sample utterances 155 of the intent-entity model 108 and then matching a domain-aware semantic vector representing the entire user utterance 1006 to the semantic vectors of the semantic search space to identify and score artifacts 140 (e.g., intents and/or entities). For embodiments in which the NLU system 1002 determines that a NLU meaning search is not desirable, or determines that the NLU constraints 1008 indicate a high level of recall, then the NLU system 1002 may include at least a portion of the received predicted intents 1032, as well as their corresponding probability scores, as part of the scored artifacts 140 generated by the NLU system 1002.

As such, during inference of the user utterance 1006, the DAVE system 1004 enhances the performance (e.g., precision and/or recall) of the NLU system within the specific domain of the client. Additionally, the DAVE system 1004 improves the quality of predictions of the NLU system 1002 for various tasks like intent recognition, entity recognition, and so forth. Since the NLU system 1002 and the DAVE system 1004 process the user utterance 1006 based on the NLU constraints 1008, the illustrated NLU framework 1000 enables enhanced robustness in different computational environments with different resource constraints 1012, and enables enhanced configurability to address the differing performance constraints 1010 of different clients. Additionally, in certain embodiments, the DAS models of the DAVE system 1004 may be multi-lingual and/or cross-lingual, and as such, the domain-aware semantic vectors 1030 generated by the DAVE system 1004 can also be multi-lingual and/or cross-lingual. Furthermore, in certain embodiments in which a DAS model is multi-lingual and/or cross-lingual, after the DAVE system 1004 is trained using data from a particular language, the DAVE system 1004 can generate domain-aware semantic vectors 1030 for multiple languages. Additionally, it may be appreciated that, in certain embodiments, the domain-agnostic semantic vectors 1028 may have a different number of dimensions than the domain-aware semantic vectors 1030 that are generated by the VT models 1026 of the DAVE system 1004, which gives the designer freedom in selecting and immediately leveraging best-of-breed DAS models 1024 as they become available, regardless of the dimensionality of these DAS models.

Figure 36:
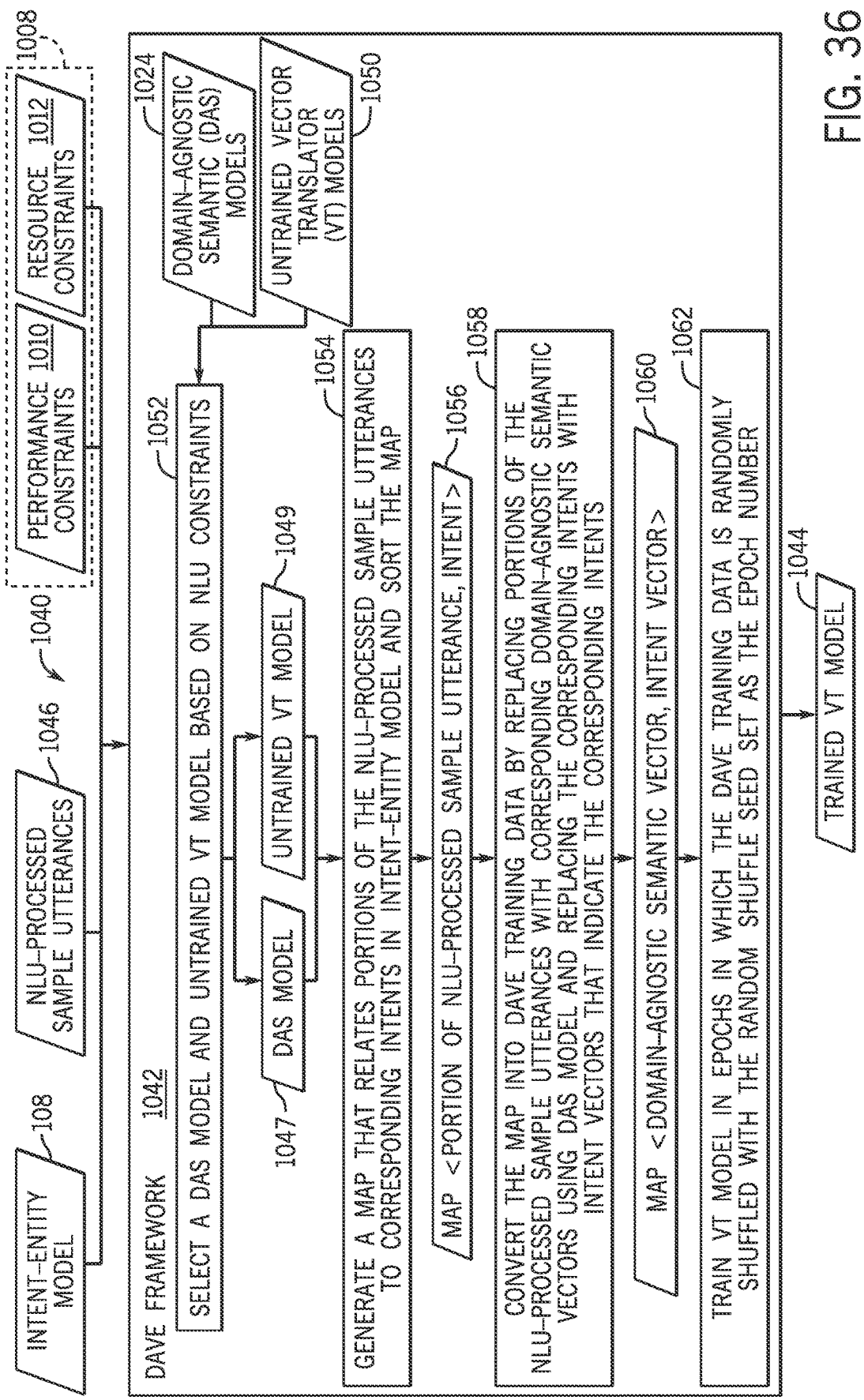
FIG. 36 is a flow diagram illustrating an embodiment of a process whereby a DAVE framework of the NLU framework generates a trained vector translator (VT) model for a domain-agnostic semantic (DAS) model of the DAVE system, in accordance with aspects of the present technique.

FIG. 36 is a flow diagram illustrating an embodiment of a process 1040 whereby a DAVE framework 1042 of the NLU framework 1000 generates a trained VT model 1044 of the DAVE system 1004. To perform the illustrated process 1040, the DAVE framework 1042 receives the intent-entity model 108, which includes sample utterances 155, as discussed above. The DAVE framework 1042 also receives NLU-processed sample utterances 1046, in which the sample utterances of the intent-entity model 108 have been preprocessed, parsed, and/or linguistically processed by the meaning extraction subsystem 150, as discussed above. The DAVE framework 1042 also receives the NLU constraints 1008, including the performance constraints 1010 and the resource constraints 1012 discussed above. The illustrated DAVE framework 1042 includes a set of DAS models 1048 that can be selected for inclusion in a particular implantation of the DAVE system 1004. The illustrated DAVE framework 1042 also includes a set of untrained VT models 1050 (e.g., neural network structures), each designed to be trained for a particular DAS model of the DAVE framework 1042. A non-limiting list of example VT models 1050 includes, but is not limited to: long short-term memory (LSTM) recurrent neural network (RNN) models, CNN models, transformer models, deep adaptation network (DAN) models, feed-forward neural network (FFN) models, and so forth.

The embodiment of the process 1040 illustrated in FIG. 36 begins with the DAVE framework 1042 selecting (block 1052) a DAS model 1047 from the DAS models 1024 and a corresponding untrained VT model 1049 from the untrained VT models 1050 of the DAVE framework 1042 based on the NLU constraints 1008. For example, the DAVE framework 1042 may consider one or more performance constraints 1010 (e.g., desired prediction latency, desired model explainability, amount and quality of sample utterances, sample utterance complexity) and resource constraints 1012 (e.g., processing time, memory usage, storage usage) when selecting the DAS model 1047, and when selecting the corresponding untrained VT model 1049 to be trained for the selected DAS model. For example, the DAVE framework 1042 may store values indicating measured aspects of the performance and resource usage of different DAS models 1024 in combination with different corresponding untrained VT models 1050, and may compare the NLU constraints 1008 to these values when selecting the DAS model 1047 and the corresponding untrained VT model 1049 to be trained.

The embodiment of the process 1040 illustrated in FIG. 36 continues with the DAVE framework 1042 generating (block 1054) a map data structure 1056 that relates portions of the NLU-processed sample utterances 1046 (e.g., tokens, phrases, entire utterances) to their corresponding intents of the intent-entity model 108. That is, the map data structure 1056 describes to which intents each of the NLU-processed sample utterances 1046, and portions thereof, belong within the intent-entity model 108. In certain embodiments, each entry in the map data structure 1056 includes two values: a first string value representing a portion of a NLU-processed sample utterance (e.g., a token, a phrase, the entire utterance), and a second string value representing the corresponding intent. For example, the map data structure 1056 may include an entry indicating a relationship between a particular intent sample utterance of the intent-entity model 108 (e.g., "I want to reset my password.") and the corresponding intent within the intent-entity model 108 (e.g., a "Reset Password" intent). Once the DAVE framework 1042 has generated the map data structure, the DAVE framework 1042 suitably sorts the map data structure (e.g., alphabetically) before proceeding.

The embodiment of the process 1040 illustrated in FIG. 36 continues with the DAVE framework 1042 converting (block 1057) the map data structure 1056 into DAVE training data 1060. For the illustrated embodiment, the DAVE framework 1042 provides the first string value of each entry in the map data structure 1056 (e.g., the portion of a NLU-processed sample utterance) as input to the selected DAS model, and then replaces the first string value with a domain-agnostic semantic vector generated by the DAS model to represent the first string value. Additionally, the DAVE framework 1042 replaces the second string value of each entry in the map data structure 1056, which represents the corresponding intent of the portion of a NLU-processed sample utterance, with intent vectors (e.g., one hot intent vectors) that instead represent the corresponding intent. For example, in certain embodiments, each intent vector may be a bit array having a size that corresponds to the number of intents in the intent-entity model 108. Each value in the intent vector is set to zero (e.g., null, false) for an intent that is not related, and set to a value of one (e.g., true) for an intent that is related, to the portion of the NLU-processed sample utterance now represented by the domain-agnostic semantic vector. As such, after conversion, each entry in the DAVE training data structure 1060 includes a first value that is a domain-agnostic semantic vector for at least a portion of a NLU-processed sample utterance, and a second value that is an intent vector that indicates which intent the underlying sample utterance corresponds to in the intent-entity model 108.

The embodiment of the process 1040 illustrated in FIG. 36 concludes with the DAVE framework 1042 training (block 1062) the selected untrained VT model 1049 using the DAVE training data 1060. For the illustrated embodiment, the VT model 1049 is trained in epochs, in which the DAVE training data 1060 is randomly shuffled based on a random shuffle seed, and the random shuffle seed is set as the epoch number. This ensures that the DAVE training data 1060 is suitably randomized to prevent the VT model 1049 from becoming overly biased to earlier entries in the DAVE training data 1060. During training, the DAVE framework 1042 may apply one or more suitable loss functions (e.g., categorical cross entropy, triplet margin) to enable the VT model 1049 to learn relationships between each domain-agnostic semantic vector and each corresponding intent vector for each entry in the DAVE training data 1060. Once training is complete, the trained VT model 1044, and the corresponding DAS model 1047, may be suitably stored such that the DAVE system 1004 may load and utilize these models when processing user utterances, as discussed with respect to FIG. 35. As such, the VT model 1044 learns (e.g., on the fly, using customer provided data) to map vectors from a domain-agnostic vector space associated with the DAS model to a DAVE space that is specific to the domain of the client.

Figure 37:
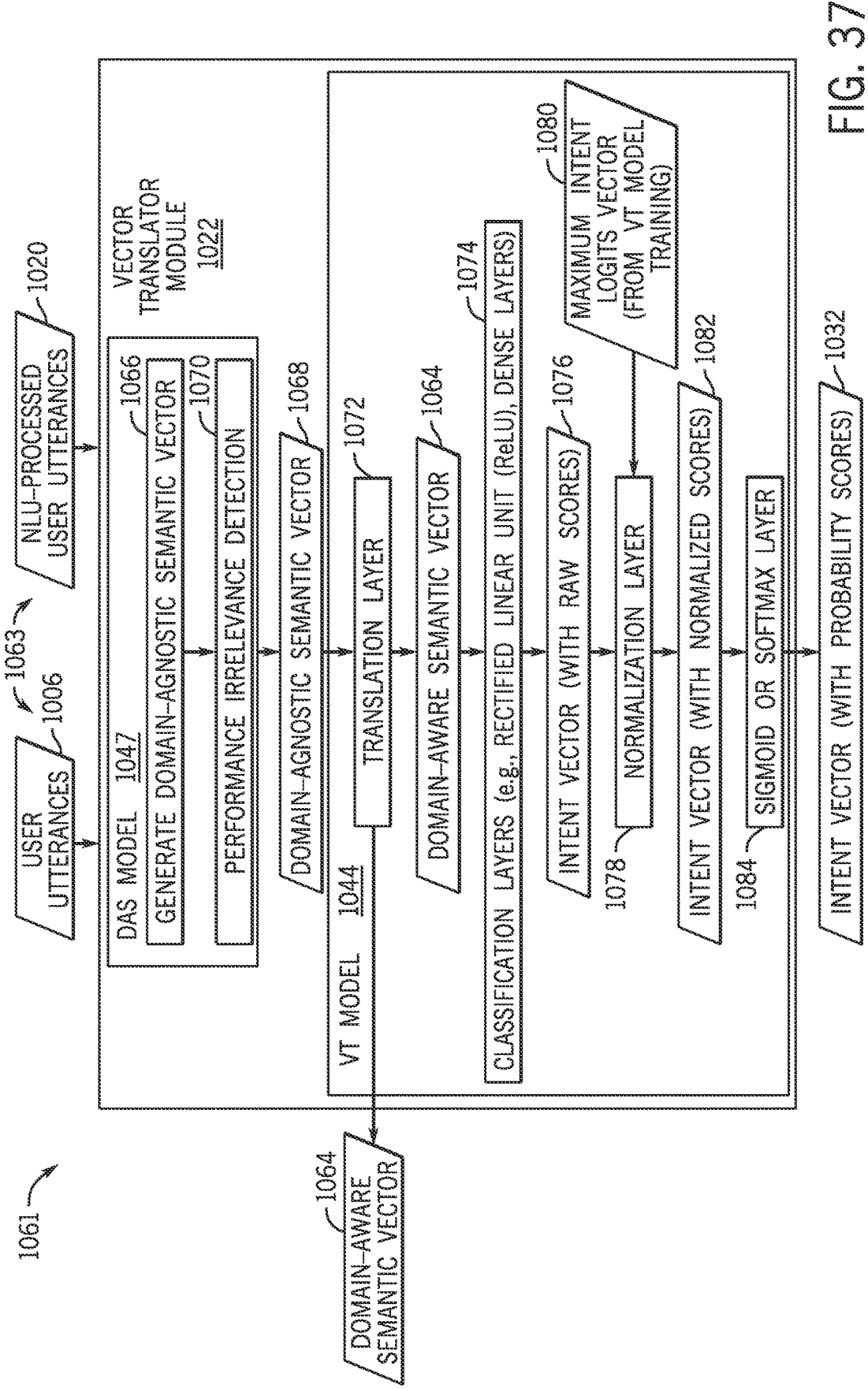
FIG. 37 is a flow diagram illustrating an embodiment of a process whereby the DAVE system uses the DAS model and the corresponding trained VT model to generate a suitable domain-aware semantic vector and a set of predicted intents from a received user utterance or a NLU-processed portion thereof, in accordance with aspects of the present technique.

FIG. 37 is a flow diagram illustrating an embodiment of a process 1061 whereby the vector translator module 1022 of the DAVE system 1004 uses the DAS model 1047 and a corresponding trained VT model 1044 to generate a suitable domain-aware semantic vector 1064 and a set of predicted intents 1032 from an input string 1063, which may be a received user utterance 1006 or a portion (e.g., a token, phrase, entire utterance) of the NLU-processed user utterance 1020. For embodiments in which multiple portions of the NLU-processed utterance 1020 are provided as input to the DAVE system 1004, the vector translator module 1022 may perform the repeat the illustrated process 1061 for each portion of the of the NLU-processed utterance 1020 (e.g., in series, or in parallel for reduced latency). In certain embodiments, the portions of the NLU-processed utterance 1020 may be received as input, along with information determined for the portion during the NLU processing (e.g., POS labeling, relation labeling, parsing information, linguistic processing information), and the vector translator module 1022 may utilize this information when performing the process 1061. For example, in certain embodiments, the vector translator module 1022 may select the DAS model 1047 and the corresponding trained VT model 1044 to be used within the process 1061, from the set of DAS models 1024 and the corresponding trained VT models 1026 of the DAVE system 1004, based on this information from NLU processing (e.g., a language of the portion of the utterance, a POS label associated with the portion of the utterance, a relation label associated with the portion of the utterance).

For the embodiment illustrated in FIG. 37, the vector translator module 1022 of the DAVE system 1004 generates (block 1066) a domain-agnostic semantic vector 1068 for the input string 1063. In certain embodiments, the vector translator module 1022 may utilize one or more features of the DAS model 1047 to perform irrelevance detection (block 1070). For example, certain DAS models 1047 may be capable of providing an indication to the vector translator module 1022 when the input string 1063 is unrelated to (e.g., orthogonal to) the DAS model 1047. When the DAS model 1047 provides an indication of irrelevance, then the vector translator module 1022 may discontinue further processing of the input string using the DAS model 1047.

For the embodiment illustrated in FIG. 37, the vector translator module 1022 provides the domain-agnostic semantic vector 1068 generated by the DAS model 1047 as an input to the VT model 1044. The VT model 1044 includes a number of layers, which may be implemented as layers of the neural model, as procedural steps or calculations, or as a combination thereof. For the illustrated embodiment, the VT model 1044 includes a translation layer 1072 (e.g., a dense neural layer with a dropout), which is designed to receive the domain-agnostic semantic vector 1068 as an input, and to provide the domain-aware semantic vector 1064 as an output. It may be appreciated that the translation layer 1072 may be suitably sized and configured to receive the domain-agnostic semantic vector 1068 provided by the DAS model 1047, which may have a number of dimensions, and to output the domain-aware semantic vector 1064, which may have a different number of dimensions.

The remaining layers of the embodiment of the vector translator model 1044 illustrated in FIG. 37 cooperate to enable intent classification within the VT model 1044. For example, the domain-aware semantic vector 1064 generated by the translation layer 1072 may be provided to other layers of the VT model 1044, which may be referred to herein as intent classification layers 1072. In certain embodiments, these intent classification layers 1074 may include one or more rectified linear unit (ReLU) layers, one or more dense neural layers, or any combination thereof. The output of the intent classification layers 1074 is a raw intent vector 1076 storing a respective floating point value (e.g., a raw score or logit) for each intent of the intent-entity model 108, wherein each floating point value provides an indication of how strongly the intent classification layers 1072 of the VT model 1044 relate the domain-aware semantic vector 1064 to a particular intent. However, in certain embodiments, these raw scores in the raw intent vector 1076 represent absolute measures of the response of the intent classification layers 1074, which are not directly comparable. As such, in certain embodiments, the VT model 1044 includes a normalization layer 1078 that receives, as an additional input, a maximum intent logits vector 1080 that is determined when training the VT model 1044. For example, when the DAVE framework 1042 is training the VT model 1044, the DAVE framework 1042 may construct the maximum intent logits vector 1080 that stores a respective floating point value determined by the intent classification layers 1074 for each intent of the intent-entity model 108, wherein each floating point value provides an indication of the maximum response (e.g., highest raw scores) of the other layers 1074 of the VT model 1044 when processing the sample utterances of the intent-entity model 108. As such, the normalization layer 1078 may normalize the floating point values of the raw intent vector 1076 based on (e.g., relative to) the corresponding floating point values of the maximum intent logits vector 1080 to yield a normalized intent vector 1082 with normalized scores.

For the embodiment illustrated in FIG. 37, the VT model 1044 includes a sigmoid or softmax layer 1084 (also referred to herein as a final layer) that receives the normalized intent vector with the normalized scores from the normalization layer 1078 and further adjusts the floating point value associated with each intent based on a suitable sigmoid or softmax function to generate the intent vector 1032. The sigmoid or softmax function converts each of the normalized floating point values into a floating point value (e.g., between 0 and 1) that represents a probability that the corresponding intent is related to the domain-aware semantic vector 1064 and the underlying input string 1063. In certain embodiments, a standard sigmoid function may be used in accordance with the following equation:

$$y = \frac{e^x}{1 + e^x} \qquad \text{Eq. 1}$$

in which x is the current, normalized floating point value of an intent of the intent vector 1082, and y is the probability value for the intent in the predicted intents vector. In other embodiments, a custom sigmoid function may be applied in accordance with the following equation:

$$y = \frac{z^x}{C + z^x} \qquad \text{Eq. 2}$$

in which x is the current, normalized floating point value of an intent of the intent vector 1082, y is the probability value for the intent in the predicted intents vector, z is a base value (e.g., 3) and C is a constant (e.g., 2). It may be appreciated that, while these functions may provide similar results beyond a certain threshold value (e.g., x>3.5), the custom sigmoid function of Eq. 2 may desirably suppress the resulting probabilities at lower values (e.g., x<3.5) when a high precision is indicated as desirable within the NLU constraints 1008 discussed above.

As such, at the conclusion of the process 1061, the output of the sigmoid or softmax layer 1084 is the intent vector 1032 having a respective floating point value for each intent of the intent-entity model, wherein each floating point value represents a probability the input string (e.g., the user utterance 1006 or the portion of the NLU-processed user utterance 1020) is related to a particular intent.

Technical effects of the present disclosure include providing an agent automation framework that is capable of extracting meaning from user utterances, such as requests received by a virtual agent (e.g., a chat agent), and suitably responding to these user utterances. The disclosed NLU framework includes a domain-aware vector encoding (DAVE) framework. The DAVE framework enables a designer to create a DAVE system having a domain-agnostic semantic (DAS) model and a corresponding trained vector translator (VT) model. The DAVE system uses the DAS model to generate a domain-agnostic semantic vector for a user utterance or a portion of a NLU-processed user utterance, and then uses the VT model to translate the domain-agnostic semantic vector into a domain-aware semantic vector to be used by a NLU system of the NLU framework during a meaning search operation. The VT model is also designed to provide one or more predicted intent classifications for the user utterance or the portion of a NLU-processed user utterance. Both the NLU system and the DAVE system of the NLU framework are highly configurable and refer to various NLU constraints during operation, including performance constraints and resource constraints provided by a designer or user of the NLU framework. As such, the disclosed designs ensure the NLU framework provides the desired level of performance (e.g., desired prediction latency, desired precision, desired recall, desired operational explainability) without exceeding a desired level of computational resource usage (e.g., processing time, memory usage, storage usage). The disclosed DAVE system enhances the performance (e.g., precision and/or recall) of the NLU system within the specific domain of the client, improves the quality of predictions of the NLU system for various tasks, such as intent recognition, entity recognition, and so forth. Additionally, since the DAVE system enables the use of existing DAS models in the NLU framework regardless of dimensionality, the disclosed DAVE system gives the designer freedom in selecting and immediately leveraging best-of-breed DAS models as they become available.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A natural language understanding (NLU) framework, comprising:

at least one memory configured to store a domain-aware vector encoding (DAVE) system that includes a plurality of domain-agnostic semantic (DAS) models and a plurality of vector translator (VT) models; and at least one processor configured to execute stored instructions to cause the NLU framework to perform actions comprising:

selecting a DAS model from the plurality of DAS models that satisfies one or more constraints of the NLU framework;

selecting a VT model from the plurality of VT models that corresponds to the DAS model and satisfies the one or more constraints of the NLU framework;

providing, via the DAVE system, one or more portions of an utterance as input to the DAS model and, in response, receiving, as output from the DAS model, one or more domain-agnostic semantic vectors respectively representing the one or more portions of the utterance in a domain-agnostic vector space of the DAS model;

providing, via the DAVE system, the one or more domain-agnostic semantic vectors as input to the corresponding VT model and, in response, receiving, as output from the corresponding VT model, one or more domain-aware semantic vectors respectively representing the one or more portions of the utterance in a domain-aware vector space of the corresponding VT model; and performing an utterance meaning search to extract one or more artifacts of the utterance based at least in part on the one or more domain-aware semantic vectors.

2. The NLU framework of claim 1, wherein the DAS model comprises a Universal Sentence Encoder (USE) convolutional neural network (CNN) model, a Universal Sentence Encoder (USE) transformer model, a Bidirectional Encoder Representations from Transformers (BERT) model, a global vector (GloVe) model, a XLM-ROBERTa model, or a DistillUSE model, and wherein the corresponding VT model comprises a long short-term memory (LSTM) recurrent neural network (RNN) model, a CNN model, a transformer model, a deep adaptation network (DAN) model, or a feed-forward neural network (FFN) model.

3. The NLU framework of claim 1, wherein, to provide the one or more portions of the utterance as input to the DAS model, the at least one processor is configured to execute the stored instructions to cause the NLU framework to perform actions comprising:

for each portion of the one or more portions of the utterance:

providing the portion of the utterance as input to the DAS model; and in response to determining that the portion of the utterance is not orthogonal to the DAS model, determining a domain-agnostic semantic vector that represents the portion of the utterance in the domain-agnostic vector space of the DAS model.

4. The NLU framework of claim 1, wherein the at least one memory is configured to store an intent-entity model that defines intents, and wherein the at least one processor is configured to execute the stored instructions to cause the NLU framework to perform actions comprising:

in response to providing the one or more domain-agnostic semantic vectors as input to the corresponding VT model, receiving one or more intent vectors respectively associated with the one or more portions of the utterance, wherein each intent vector comprises a respective probability score for each of the intents of the intent-entity model indicating a respective probability that the portion of the utterance associated with the intent vector corresponds to each of the intents, and wherein the NLU framework is configured to extract the one or more artifacts of the utterance based at least in part on the intent vector.

5. The NLU framework of claim 1, wherein the at least one memory is configured to store a NLU system, and wherein the at least one processor is configured to execute the stored instructions to cause the NLU framework to perform actions comprising:
before providing the one or more portions of the utterance as input to the DAS model, performing NLU processing of the utterance to preprocess, syntactically parse, and linguistically process the utterance; and
after receiving the one or more domain-aware semantic vectors, performing, via the NLU system, a NLU meaning search based at least in part on the one or more domain-aware semantic vectors to extract the one or more artifacts of the utterance.

6. The NLU framework of claim 1, wherein the one or more portions of the utterance comprises an entirety of the utterance, wherein the one or more domain-aware semantic vectors comprise a domain-aware semantic vector representing the entirety of the utterance, and wherein the NLU framework is configured to perform the utterance meaning search using the domain-aware semantic vector to extract the one or more artifacts of the utterance.

7. The NLU framework of claim 1, wherein the domain-agnostic vector space of the DAS model and the domain-aware vector space of the corresponding VT model have different dimensionality, and wherein one or more domain-agnostic semantic vectors and the one or more domain-aware semantic vectors have a different number of dimensions.

8. The NLU framework of claim 1, wherein the at least one memory is configured to store an intent-entity model that defines intents and includes sample utterances associated with each of the intents, and wherein the plurality of VT models comprises a plurality of untrained VT models, and wherein, before providing the one or more portions of the utterance as input to the DAS model, the at least one processor is configured to execute the stored instructions to cause the NLU framework to perform actions comprising:
selecting an untrained VT model that corresponds to the DAS model from the plurality of untrained VT models based on the one or more constraints of the NLU framework;
generating DAVE training data based on the sample utterances of the intent-entity model; and
training the untrained VT model using the DAVE training data to yield the corresponding VT model.

9. The NLU framework of claim 8, wherein the one or more constraints of the NLU framework comprise prediction latency, precision, recall, operational explainability, amount and quality of available training data, training data complexity, processing time, memory usage, storage usage, or any combination thereof.

10. The NLU framework of claim 8, wherein, to generate the DAVE training data, the at least one processor is configured to execute the stored instructions to cause the NLU framework to perform actions comprising:
performing NLU processing of the sample utterances to preprocess, syntactically parse, and linguistically process the sample utterances;
generating a map data structure from the sample utterances, wherein each entry in the map data structure stores a portion of a sample utterance and stores one or more intents that are associated with the portion of the sample utterance within the intent-entity model; and
generating the DAVE training data from the map data structure by replacing, within each entry of the map data structure, the portion of the sample utterance with a respective domain-agnostic semantic vector generated by the DAS model to represent the portion of the sample utterance, and by replacing, within each entry of the map data structure, the one or more intents with a respective intent vector representing the one or more intents.

11. The NLU framework of claim 8, wherein, to train the untrained VT model, the at least one processor is configured to execute the stored instructions to cause the NLU framework to perform actions comprising:
training the untrained VT model over a plurality of epochs, wherein, within each epoch, the DAVE training data is randomly shuffled using a random shuffle seed that corresponds to an epoch number of the epoch.

12. A method of operating a natural language understanding (NLU) framework that comprises a domain-aware vector encoding (DAVE) system having a plurality of domain-agnostic semantic (DAS) models and a plurality of vector translator (VT) models, the method comprising:
selecting a DAS model from the plurality of DAS models that satisfies one or more constraints of the NLU framework;
selecting a VT model from the plurality of VT models that corresponds to the DAS model and satisfies the one or more constraints of the NLU framework;
providing one or more portions of an utterance as input to the DAS model and, in response, receiving, as output from the DAS model, one or more domain-agnostic semantic vectors respectively representing the one or more portions of the utterance in a domain-agnostic vector space of the DAS model;
providing the one or more domain-agnostic semantic vectors as input to the corresponding VT model and, in response, receiving, as output from the corresponding VT model, one or more domain-aware semantic vectors respectively representing the one or more portions of the utterance in a domain-aware vector space of the corresponding VT model; and
performing a NLU meaning search to extract one or more artifacts of the utterance based at least in part on the one or more domain-aware semantic vectors.

13. The method of claim 12, comprising:
in response to providing the one or more domain-agnostic semantic vectors as input to the corresponding VT model, receiving one or more intent vectors respectively associated with the one or more portions of the utterance, wherein each intent vector comprises a respective probability score for each intent of an intent-entity model of the NLU framework indicating a respective probability that the portion of the utterance associated with the intent vector corresponds to each intent, and wherein the NLU framework is configured to extract the one or more artifacts of the utterance based at least in part on the intent vector.

14. The method of claim 12, wherein the plurality of VT models comprises a plurality of untrained VT models, and wherein, before providing the one or more portions of the utterance as input to the DAS model, the method comprises:

selecting an untrained VT model that corresponds to the DAS model from a plurality of untrained VT models based on the one or more constraints of the NLU framework;

generating DAVE training data based on sample utterances of an intent-entity model of the NLU framework; and training the untrained VT model using the DAVE training data over a plurality of epochs, wherein, within each epoch, the DAVE training data is randomly shuffled using a random shuffle seed that corresponds to an epoch number of the epoch.

15. The method of claim 14, wherein generating the DAVE training data comprises:

performing NLU processing of the sample utterances to preprocess, syntactically parse, and linguistically process the sample utterances;

generating a map data structure from the sample utterances, wherein each entry in the map data structure stores a portion of a sample utterance and stores one or more intents that are associated with the portion of the sample utterance within the intent-entity model; and generating the DAVE training data from the map data structure by replacing, within each entry of the map data structure, the portion of the sample utterance with a respective domain-agnostic semantic vector generated by the DAS model to represent the portion of the sample utterance, and by replacing, within each entry of the map data structure, the one or more intents with a respective intent vector representing the one or more intents.

16. A non-transitory, computer-readable medium storing instructions executable by a processor of a natural language understanding (NLU) framework that comprises a domain-aware vector encoding (DAVE) system having plurality of domain-agnostic semantic (DAS) models and a plurality of vector translator (VT) models, the instructions comprising instructions to:

select a DAS model from the plurality of DAS models that satisfies one or more constraints of the NLU framework;

select a VT model from the plurality of VT models that corresponds to the DAS model and satisfies the one or more constraints of the NLU framework;

provide a portion of an utterance as input to the DAS model and, in response, receiving, as output from the DAS model, a domain-agnostic semantic vector representing the portion of the utterance in a domain-agnostic vector space of the DAS model;

provide the domain-agnostic semantic vector as input to the corresponding VT model and, in response, receiving, as output from the corresponding VT model, a domain-aware semantic vector representing the portion of the utterance in a domain-aware vector space of the corresponding VT model; and performing an utterance meaning search to extract one or more artifacts of the utterance based at least in part on the domain-aware semantic vector.

17. The medium of claim 16, wherein the instructions comprise instructions to:

provide a second portion of the utterance as input to the DAS model and, in response, receiving, as output from the DAS model, a second domain-agnostic semantic vector representing the second portion of the utterance in the domain-agnostic vector space of the DAS model;

provide the second domain-agnostic semantic vector as input to the corresponding VT model and, in response, receiving, as output from the corresponding VT model, a second domain-aware semantic vector representing the second portion of the utterance in the domain-aware vector space of the corresponding VT model; and extract the one or more artifacts of the utterance based at least in part on the second domain-aware semantic vector.

18. The medium of claim 16, wherein the instructions comprise instructions to:

in response to providing the domain-agnostic semantic vector as input to the corresponding VT model, receive an intent vectors for the portion of the utterance, wherein the intent vector comprises a respective probability score for each intent of an intent-entity model of the NLU framework indicating a respective probability that the portion of the utterance corresponds to each intent, and wherein the NLU framework is configured to extract the one or more artifacts of the utterance based at least in part on the intent vector.

19. The medium of claim 18, wherein the instructions to provide the domain-agnostic semantic vector as input to the corresponding VT model comprise instructions to:

provide the domain-agnostic semantic vector as input to a translation layer of the corresponding VT model, wherein the translation layer is configured to output the domain-aware semantic vector that represents the portion of the utterance;

provide the domain-aware semantic vector as input to a intent classification layer of the corresponding VT model, wherein the intent classification layer is configured to output a raw intent vector that includes a respective raw score for each intent of the intent-entity model;

provide the raw intent vector as input to a normalization layer of the corresponding VT model, wherein the normalization layer is configured to output a normalized intent vector that includes a respective normalized score for each intent of the intent-entity model; and provide the normalized intent vector as input to a final layer of the corresponding VT model, wherein the final layer is configured to apply a softmax function or a sigmoid function to the normalized intent vector to generate the intent vector for the portion of the utterance.

20. The medium of claim 16, wherein the plurality of VT models comprises a plurality of untrained VT models, wherein the instructions comprise instructions to:

before providing the one or more portions of the utterance as input to the DAS model:

select an untrained VT model that corresponds to the DAS model from a plurality of untrained VT models based on the one or more constraints of the NLU framework;

perform NLU processing of sample utterances of an intent-entity model of the NLU framework to preprocess, syntactically parse, and linguistically process the sample utterances;

generate a map data structure from the sample utterances, wherein each entry in the map data structure stores a portion of a sample utterance and stores one or more intents that are associated with the portion of the sample utterance within the intent-entity model; and generate DAVE training data from the map data structure by replacing, within each entry of the map data structure, the portion of the sample utterance with a respective domain-agnostic semantic vector generated by the DAS model to represent the portion of the sample utterance, and by replacing, within each entry of the map data structure, the one or more intents with a respective intent vector representing the one or more intents; and train the untrained VT model using the DAVE training data over a plurality of epochs to yield the corresponding VT model, wherein, within each epoch, the DAVE training data is randomly shuffled using a random shuffle seed that corresponds to an epoch number of the epoch.

* * * * *